United States Patent
D'Amico

(10) Patent No.: US 10,950,110 B2
(45) Date of Patent: Mar. 16, 2021

(54) LOCATION BASED SECURITY ALERT SYSTEM

(71) Applicant: SECURITY SERVICES NORTHWEST, INC., Sequim, WA (US)

(72) Inventor: Joseph N. D'Amico, Port Townsend, WA (US)

(73) Assignee: SECURITY SERVICES NORTHWEST, INC., Sequim, WA (US)

( * ) Notice: Subject to any disclaimer, the term of this patent is extended or adjusted under 35 U.S.C. 154(b) by 127 days.

(21) Appl. No.: 16/076,657

(22) PCT Filed: Feb. 7, 2017

(86) PCT No.: PCT/US2017/016859
§ 371 (c)(1),
(2) Date: Aug. 8, 2018

(87) PCT Pub. No.: WO2017/139281
PCT Pub. Date: Aug. 17, 2017

(65) Prior Publication Data
US 2019/0130719 A1    May 2, 2019

Related U.S. Application Data

(60) Provisional application No. 62/292,548, filed on Feb. 8, 2016.

(51) Int. Cl.
*G08B 21/02* (2006.01)
*G06F 9/451* (2018.01)
(Continued)

(52) U.S. Cl.
CPC .............. *G08B 21/02* (2013.01); *G06F 9/44* (2013.01); *G06F 9/451* (2018.02); *G06F 9/542* (2013.01);
(Continued)

(58) Field of Classification Search
CPC ......... G08B 21/02; G08B 25/10; G06F 9/451; G06F 9/44; G06F 9/542; G06Q 50/26; G06Q 50/265; G06Q 50/10
See application file for complete search history.

(56) References Cited

U.S. PATENT DOCUMENTS 7,312,712 B1    12/2007  Worrall
9,898,912 B1 *   2/2018  Jordan, II .............. G05B 15/02
(Continued)

FOREIGN PATENT DOCUMENTS

JP    2008-59251 A    3/2008

OTHER PUBLICATIONS

International Preliminary Report on Patentability and Written Opinion of the International Searching Authority, dated Aug. 14, 2018, for International Application No. PCT/US2017/016859, 10 pages.
(Continued)

*Primary Examiner* — Rufus C Point
(74) *Attorney, Agent, or Firm* — Seed Intellectual Property Law Group LLP

(57) ABSTRACT

Systems and methods for managing threats at target locations of networked subscriber devices. The system may include a server connected to a network such that the server manages threats at the target locations and at threat locations. Networked subscriber devices alert respective users when the respective target locations coincide with a given threat location. The server notifies the users of respective solutions to threats and respective solution providers.

28 Claims, 34 Drawing Sheets

(51) Int. Cl.
*G06Q 50/26* (2012.01)
*G06F 9/44* (2018.01)
*G08B 25/10* (2006.01)
*G06F 9/54* (2006.01)
*G06Q 50/10* (2012.01)

(52) U.S. Cl.
CPC ........... *G06Q 50/26* (2013.01); *G06Q 50/265* (2013.01); *G08B 25/10* (2013.01); *G06Q 50/10* (2013.01)

(56) References Cited

U.S. PATENT DOCUMENTS

| | | | | |
|---|---|---|---|---|
| 2004/0135685 | A1* | 7/2004 | Hane | G08B 25/10 340/539.17 |
| 2007/0044539 | A1* | 3/2007 | Sabol | G06Q 10/06 73/19.01 |
| 2008/0077474 | A1 | 3/2008 | Dumas et al. | |
| 2011/0034147 | A1* | 2/2011 | Issa | H04M 1/72572 455/410 |
| 2011/0046920 | A1 | 2/2011 | Amis | |
| 2011/0095881 | A1* | 4/2011 | Rosentel | H04L 12/1895 340/501 |
| 2012/0123822 | A1* | 5/2012 | Hnatio | G06Q 50/26 705/7.28 |
| 2013/0214939 | A1* | 8/2013 | Washlow | B60Q 9/00 340/901 |
| 2014/0221016 | A1* | 8/2014 | Lee | G08B 21/0269 455/456.3 |
| 2014/0365390 | A1* | 12/2014 | Braun | G16H 40/20 705/325 |
| 2014/0368337 | A1* | 12/2014 | Venkatachari | G08B 27/008 340/539.13 |
| 2014/0368601 | A1 | 12/2014 | deCharms | |
| 2015/0091941 | A1* | 4/2015 | Das | G06F 3/017 345/633 |
| 2015/0230072 | A1 | 8/2015 | Saigh et al. | |
| 2016/0012560 | A1 | 1/2016 | Johnson et al. | |
| 2016/0232774 | A1* | 8/2016 | Noland | G08B 21/0438 |
| 2016/0335879 | A1* | 11/2016 | Carr | G08B 25/005 |
| 2017/0134214 | A1* | 5/2017 | Sethuraman | H04L 41/0609 |
| 2017/0372593 | A1* | 12/2017 | Chadwick | G08B 25/14 |
| 2018/0012323 | A1* | 1/2018 | Oyenan | G06Q 50/265 |

OTHER PUBLICATIONS

International Search Report, dated Apr. 20, 2017, for International Application No. PCT/US2017/016859, 3 pages.
Extended European Search Report, dated Jun. 3, 2019 for European Application No. 17750641.7, 8 pages.

* cited by examiner

SHEPHERD SHIELD — JOHN DOE

MENU
DASHBOARD
ALERT MANAGEMENT
  ADD BULK ALERT
MOBILE USER MANAGEMENT
JURISDICTION
USER MANAGEMENT
ALERT TYPE MANAGEMENT
SALES MENU
CONTENT MANAGEMENT
INCIDENT MANAGEMENT

ALERTS – CONFIGURE API

NAME
METHOD        API WEB LINK
              ALERT TYPE

| PARAMETERS | VALUE |
|---|---|
| NAME | |
| ZIP CODE | |

ADD PARAMS

| HEADER | VALUE |
|---|---|
| oAuth | |
| API KEY | |

ADD HEADER DETAILS

GET SCHEMA

| NO: | APPLICATION FIELD | RULES |
|---|---|---|
| 1 | NAME | FIRST NAME +**+ LAST NAME |
| 2 | ADDRESS | ADDRESS |

IMPORTED FIELDS
FIRST NAME

SHEPHERD SHIELD  JOHN DOE

ALERTS – CONFIGURE LIVE FEED

NAME: [ ]

ALERT TYPE: [ ▸ ]

LIVE FEED WEB LINK: [ ]

| PARAMETERS | VALUE |
|---|---|
| NAME | |
| ZIP CODE | |

[ADD PARAMS]

| HEADER | VALUE |
|---|---|
| oAuth | |
| API KEY | |

[ADD HEADER DETAILS]

[GET SCHEMA]

| NO: | APPLICATION FIELD | RULES |
|---|---|---|
| 1 | NAME | FIRST NAME +**+ LAST NAME |
| 2 | ADDRESS | ADDRESS |

IMPORTED FIELDS

FIRST NAME

MENU
YOUR LOGO HERE
DASHBOARD
ALERT MANAGEMENT
ADD BULK ALERT
MOBILE USER MANAGEMENT
JURISDICTION
USER MANAGEMENT
ALERT TYPE MANAGEMENT
SALES MENU
CONTENT MANAGEMENT
INCIDENT MANAGEMENT

FIG. 24

SHEPHERD SHIELD

JOHN DOE

MENU
- DASHBOARD
- SOCIAL MEDIA MONITORING
- ALERT MANAGEMENT
- MOBILE USER MANAGEMENT
- JURISDICTION
- USER MANAGEMENT
- ALERT TYPE MANAGEMENT
- SECURITY TOOLS
- CONTENT MANAGEMENT
- INCIDENT MANAGEMENT

SALES – SECURITY TOOLS

SECURITY TOOLS [ADD ITEM]

| POSITION | DISPLAY NAME | VENDOR LISTS | ICONS | ACTION |
|---|---|---|---|---|
| 1 | SECURITY OFFICER | ABC, EFG | | |
| 2 | ALARM SYSTEMS & CAMERA | ABC, EFG | | |

VENDORS [ADD VENDER]

| NAME | ADDRESS | ACTION |
|---|---|---|
| ABC | ADAMS STREET, NY | |
| EFG | JP STREET, NY | |

DISPLAY ORDER [SECURITY OFFICER ▽]

| POSITION | VENDOR NAME | PREMIUM | PREMIUM START DATE | PREMIUM START DATE |
|---|---|---|---|---|
| 1 | ABC | YES ▽ | 12/07/2016 | 12/30/2016 |
| 0 | EFG | NO ▽ | | |

LOCATION BASED SECURITY ALERT SYSTEM

BACKGROUND

Technical Field

The present disclosure generally relates to methods, systems, and devices for threat management at one or more threat locations and target locations.

Description of the Related Art

Threats exist in many locations or situations. Often, an individual is unaware of a threat until it is too late. In the case of a foreign location, an individual is often unaware of what areas are safe. Even when an individual is familiar with a given location, the individual may be unsure as to whether a route provides a safe escape from a threat. When faced with a threat, seeking a solution wastes valuable time that could be spent executing the solution.

BRIEF SUMMARY

A method of operation for a threat management system having at least one network connectivity device and at least one application server may be summarized as including generating, by the at least one application server of the threat management system, at least one threat characteristic indicator; generating, by the at least one application server of the threat management system, at least one threat location indicator; responsive to the generating of one or more of the at least one threat characteristic indicator or the at least one threat location indicator, creating, by the at least one application server of the threat management system, at least one threat alert; responsive to the creating of the at least one threat alert, converting, by the at least one network connectivity device of the threat management system, the at least one threat alert to at least one threat alert signal; and responsive to the at least one threat alert signal, pushing, by the at least one network connectivity device of the threat management system, the at least one threat alert signal to at least one networked subscriber device external to the threat management system, thereby causing the at least one networked subscriber device to: emit at least one humanly perceptible alarm that warns at least one respective user of the at least one networked subscriber device that at least one respective target location of the at least one networked subscriber device coincides with at least one threat location; and notify the at least one respective user of at least one threat characteristic.

The at least one threat alert signal to at least one networked subscriber device external to the threat management system may further include pushing, by the at least one network connectivity device of the threat management system, the at least one threat alert signal to at least one networked subscriber device external to the threat management system, thereby causing the at least one networked subscriber device to notify the at least one respective user of at least one respective threat solution.

Notifying the at least one respective user of at least one respective threat solution may further include notifying the at least one respective user of at least one opportunity to engage in one or more of purchasing, renting, subscribing, or hiring one or more of the following: at least one alarm system, at least one alarm monitoring subscription, at least one camera system, at least one person tracking subscription or system, at least one security officer, at least one unarmed security officer, at least one armed security officer, at least one counter assault team, at least one anti-terrorism team, at least one security patrol, at least one armored car service, at least one vault, at least one body guard, at least one private investigator, at least one self-defense training lesson, at least one firearm training session, or at least one firearm.

Notifying the at least one respective user of at least one respective threat solution may further include notifying the at least one respective user of at least one escape path to at least one rally point outside the at least one threat location.

Notifying the at least one respective user of at least one escape path to at least one rally point outside the at least one threat location may further include instructing the at least one respective user to travel at least one path having at least one reduced or minimized threat level as compared to at least one other escape path.

Notifying the at least one respective user of at least one respective threat solution may further include notifying the at least one respective user of at least one escape path to one or more of the following: at least one police station, at least one fire station, at least one hospital, at least one previously user selected rally point, or at least one previously user selected address.

Notifying the at least one respective user of at least one escape path may further include instructing the at least one respective user to travel at least one path having at least one reduced or minimized threat level as compared to at least one other escape path.

Emitting at least one humanly perceptible alarm that warns at least one respective user of the at least one networked subscriber device that at least one respective target location of the at least one networked subscriber device coincides with at least one threat location may further include warning the at least one respective user of the at least one networked subscriber device that the at least one threat location coincides with at least one respective target location that includes at least a first travel path that includes one or more of the following: at least one user selected or defined travel path or at least one travel path to a user selected or defined destination.

Pushing the at least one threat alert signal to at least one networked subscriber device external to the threat management system may further include pushing, by the at least one network connectivity device of the threat management system, the at least one threat alert signal to at least one networked subscriber device external to the threat management system, thereby causing the at least one networked subscriber device to notify the at least one respective user of at least one respective threat solution that includes at least one adjusted travel path having at least one reduced or minimized threat level as compared to at least the first travel path.

Pushing the at least one threat alert signal to at least one networked subscriber device may further include pushing, by the at least one network connectivity device of the threat management system, the at least one threat alert signal to at least one networked subscriber device external to the threat management system, thereby causing the at least one networked subscriber device to notify the at least one respective user of at least one threat solution provider.

The method may further include generating, by the at least one application server of the threat management system, at least one list of threat solution providers; identifying, by the at least one application server of the threat management system, respective prioritization indicators of the threat solution providers; and responsive to the identifying of the respective prioritization indicators, prioritizing, by the at least one application server of the threat management system, the threat solution providers.

Pushing the at least one threat alert signal to at least one networked subscriber device may further include pushing, by the at least one network connectivity device of the threat management system, the at least one threat alert signal to at least one networked subscriber device external to the threat management system, thereby causing the at least one networked subscriber device to notify the at least one respective user of at least one prioritized threat solution provider.

Identifying respective prioritization indicators of the threat solution providers may further include identifying, by the at least one application server of the threat management system, one or more of the following: at least one user review of at least one threat solution provider, at least one popularity rating of at least one threat solution provider, at least one result of vetting at least one threat solution provider, or at least one relevance indicator of at least one threat solution provider.

Identifying respective prioritization indicators of the threat solution providers may further include identifying, by the at least one application server of the threat management system, one or more of the following: at least one subscription by at least one threat solution provider or at least one bid by at least one threat solution provider.

Generating at least one threat characteristic indicator and at least one threat location indicator may further include obtaining, by the at least one network connectivity device of the threat management system, at least one threat report signal from at least one networked device external to the threat management system; responsive to the obtaining of the at least one threat report signal, converting, by the at least one network connectivity device of the threat management system, the at least one threat report signal to at least one threat report; responsive to the at least one threat report, generating, by the at least one application server of the threat management system, the at least one threat characteristic indicator; and responsive to the at least one threat report, generating, by the at least one application server of the threat management system, the at least one threat location indicator.

Obtaining at least one threat report signal from at least one networked device external to the threat management system may further include obtaining, by the at least one network connectivity device of the threat management system, at least one threat report signal from one or more of the following: at least one mobile device, at least one social media server, at least one news report server, at least one news broadcast device, at least one government server, at least one law enforcement server, at least one military server, or at least one law enforcement radio scanner.

Obtaining at least one threat report signal from at least one networked device external to the threat management system may further include obtaining, by the at least one network connectivity device of the threat management system, at least one threat report signal from at least one non-transitory computer readable medium that stores one or more of the following: at least one location of at least one reported crime, at least one location of at least one reported criminal, at least one location of at least one reported sex offender, at least one location of at least one reported terrorist, at least one location of at least one reported violent act, at least one location of at least one reported gang activity, at least one location of at least one reported act of sex solicitation, at least one location of at least one reported act of prostitution, at least one location of at least one reported act of sex trafficking, at least one location of at least one reported drug use, at least one location of at least one reported drug sale, at least one location of at least one reported drug trafficking, at least one location of at least one reported disease outbreak, at least one location of at least one reported gunshot, at least one location of at least one reported riot, at least one location of at least one reported act of police brutality, at least one location of at least one reported hate crime, or at least one location of at least one reported dangerous animal.

Obtaining at least one threat report signal from at least one networked device external to the threat management system may further include obtaining, by the at least one network connectivity device of the threat management system, at least one threat report signal from at least one non-transitory computer readable medium that stores at least one location of one or more of the following: at least one reported impending earthquake, at least one reported presently active earthquake, at least one reported impending tornado, at least one reported presently active tornado, at least one reported impending hurricane, at least one reported presently active hurricane, at least one reported impending flood, at least one reported presently active flood, at least one reported impending high tide, at least one reported presently active high tide, at least one reported impending low tide, at least one reported presently active low tide, at least one reported impending wildfire, at least one reported presently active wildfire, at least one reported impending tsunami, at least one reported presently active tsunami, at least one reported impending volcanic activity, at least one reported presently active volcanic activity, at least one reported geological fault line, at least one reported impending natural disaster, at least one reported presently active natural disaster, at least one reported impending power outage, at least one reported presently active power outage, at least one reported impending power shortage, at least one reported presently active power shortage, at least one reported impending fuel shortage, at least one reported presently active fuel shortage, at least one reported impending fresh water shortage, at least one reported presently active fresh water shortage, at least one reported impending food shortage, or at least one reported presently active food shortage.

Generating at least one threat characteristic indicator may further include generating, by the at least one application server of the threat management system, at least one threat assessment score of the at least one threat location; and responsive to the generating of the at least one threat assessment score, generating, by the at least one application server of the threat management system, the at least one threat characteristic indicator.

Generating at least one threat assessment score of the at least one threat location may further include generating, by the at least one application server of the threat management system, at least one threat assessment score that indicates at least one level of one or more of the following: crime, theft, vehicle prowling, automobile theft, burglary, murder, sex offense, sex trafficking, prostitution, hate crime, violent crime, non-violent crime, piracy, drug trafficking, drug sales, drug use, gang activity, gang members, injunctions against gangs, injunctions against individuals, terrorist activity, outstanding warrants, sex offenders, criminals, police brutality, injunctions against police, corrupt politicians, unemployment, education, per capita income, household income, disease, life-threatening disease, dangerous animals, or riots.

Generating at least one threat assessment score of the at least one threat location may further include generating, by the at least one application server of the threat management system, at least one threat assessment score that indicates at least one level of one or more of the following: earthquakes, tornados, hurricanes, floods, high tides, low tides, wildfires, tsunamis, volcanic activity, natural disasters, power outages, fuel shortages, power shortages, fresh water shortages, or food shortages.

Generating at least one threat assessment score of the at least one threat location may further include obtaining, by the at least one network connectivity device of the threat management system, at least one threat assessment data signal from at least one networked device external to the threat management system; responsive to the obtaining of the threat assessment data signal, converting, by the at least one network connectivity device of the threat management system, the at least one threat assessment data signal to at least one set of threat assessment data; and responsive to the at least one set of threat assessment data, generating, by the at least one application server of the threat management system, the at least one threat assessment score of the at least one threat location.

Obtaining at least one threat assessment data signal from at least one networked device external to the threat management system may further include obtaining, by the at least one network connectivity device of the threat management system, at least one threat assessment data signal from at least one non-transitory computer readable medium that stores one or more of the following: crime statistics, theft statistics, vehicle prowling statistics, automobile theft statistics, burglary statistics, murder statistics, at least one sex offense statistics, sex trafficking statistics, prostitution statistics, hate crime statistics, violent crime statistics, non-violent crime statistics, piracy statistics, drug trafficking statistics, drug sale statistics, drug use statistics, gang activity statistics, gang member statistics, injunction statistics, sex offender statistics, criminal statistics, police brutality statistics, corrupt politician statistics, unemployment statistics, education statistics, per capita income statistics, household income statistics, disease statistics, life-threatening disease statistics, terrorist activity statistics, outstanding warrant statistics, dangerous animal statistics, or riot statistics.

Obtaining at least one threat assessment data signal from at least one networked device external to the threat management system may further include obtaining, by the at least one network connectivity device of the threat management system, at least one threat assessment data signal from at least one non-transitory computer readable medium that stores one or more of the following: earthquake statistics, tornado statistics, hurricane statistics, flood statistics, high tide statistics, low tide statistics, wildfire statistics, tsunami statistics, volcanic activity statistics, natural disaster statistics, power outage statistics, fuel shortage statistics, power shortage statistics, fresh water shortage statistics, or food shortage statistics.

Emitting at least one humanly perceptible alarm that warns at least one respective user of the at least one networked subscriber device that at least one respective target location of the at least one networked subscriber device coincides with at least one threat location may further include warning the at least one respective user of the at least one networked subscriber device that the at least one threat location coincides with at least one respective target location that includes at least one respective user selected or defined location.

Emitting at least one humanly perceptible alarm that warns at least one respective user of the at least one networked subscriber device that at least one respective target location of the at least one networked subscriber device coincides with at least one threat location may further include warning the at least one respective user of the at least one networked subscriber device that the at least one threat location coincides with at least one respective target location that includes at least one respective present location of the at least one networked subscriber device.

Warning the at least one respective user of the at least one networked subscriber device that the at least one threat location coincides with at least one respective target location that includes at least one respective present location of the at least one networked subscriber device may further include warning the at least one respective user of the at least one networked subscriber device that at least a portion of the at least one threat location coincides with at least a portion of at least one respective geographical area that surrounds the respective present location of the at least one networked subscriber device, the at least one respective geographical area defined by at least one respective particular distance from the at least one networked subscriber device; or warning the at least one respective user of the at least one networked subscriber device that at least a portion of the respective present location of the at least one networked subscriber device coincides with at least a portion of at least one threat location defined by at least one particular dimension.

Warning the at least one respective user of the at least one networked subscriber device that the at least one threat location coincides with at least one respective target location that includes at least one respective present location of the at least one networked subscriber device may further include warning the at least one respective user of the at least one networked subscriber device that at least a portion of the at least one threat location coincides with at least a portion of at least one respective geographical area that surrounds the respective present location of the at least one networked subscriber device, the at least one respective geographical area defined by at least one respective user selected or defined distance from the at least one networked subscriber device; or warning the at least one respective user of the at least one networked subscriber device that at least a portion of the respective present location of the at least one networked subscriber device coincides with at least a portion of at least one threat location defined by at least one respective user selected or defined dimension.

Warning the at least one respective user of the at least one networked subscriber device that the at least one threat location coincides with at least one respective target location that includes at least one respective present location of the at least one networked subscriber device may further include warning the at least one respective user of the at least one networked subscriber device that at least a portion of the at least one threat location coincides with at least a portion of at least one respective geographical area that surrounds the respective present location of the at least one networked subscriber device, the at least one respective geographical area defined by at least one respective particular distance from the at least one networked subscriber device, the at least one respective particular distance varying responsive to the at least one threat characteristic; or warning the at least one respective user of the at least one networked subscriber device that at least a portion of the respective present location of the at least one networked subscriber device coincides with at least a portion of at least one threat location defined by at least one respective particular dimension, the at least one respective particular dimension varying responsive to the at least one threat characteristic.

Notifying the at least one respective user of at least one threat characteristic may further include notifying the at least one respective user of at least one particular threat type.

Notifying the at least one respective user of at least one threat characteristic may further include notifying the at least one respective user of at least one particular type of imminent threat.

Notifying the at least one respective user of at least one threat characteristic may further include notifying the at least one respective user of at least one particular type of presently active threat.

Notifying the at least one respective user of at least one threat characteristic may further include notifying the at least one respective user of at least one particular type of permanent or semi-permanent threat.

Notifying the at least one respective user of at least one threat characteristic may further include notifying the at least one respective user of at least one threat level that indicates at least one level of threat seriousness or that indicates at least one level of threat danger.

A threat management system may be summarized as including at least one application server; at least one non-transitory computer-readable medium communicably coupled to the at least one application server, the at least one nontransitory computer-readable medium stores processor-executable instructions that specifically program the at least one application server to: generate at least one threat characteristic indicator; generate at least one threat location indicator; and responsive to the generation of one or more of the at least one threat characteristic indicator or the at least one threat location indicator, create at least one threat alert; and at least one network connectivity device communicably coupled to the at least one application server, the at least one network connectivity device: responsive to the creation of the at least one threat alert, converts the at least one threat alert to at least one threat alert signal; and responsive to the at least one threat alert signal, pushes the at least one threat alert signal to at least one networked subscriber device external to the threat management system, thereby causing the at least one networked subscriber device to: emit at least one humanly perceptible alarm that warns at least one respective user of the at least one networked subscriber device that at least one respective target location of the at least one networked subscriber device coincides with at least one threat location; and notify the at least one respective user of at least one threat characteristic.

The threat alert signal may further cause the at least one networked subscriber device external to the threat management system to notify the at least one respective user of at least one respective threat solution.

The threat alert signal may further cause the at least one networked subscriber device external to the threat management system to notify the at least one respective user of at least one respective threat solution that may include at least one opportunity to engage in one or more of purchasing, renting, subscribing, or hiring one or more of the following: at least one alarm system, at least one alarm monitoring subscription, at least one camera system, at least one person tracking subscription or system, at least one security officer, at least one unarmed security officer, at least one armed security officer, at least one counter assault team, at least one anti-terrorism team, at least one security patrol, at least one armored car service, at least one vault, at least one body guard, at least one private investigator, at least one self-defense training lesson, at least one firearm training session, or at least one firearm.

The threat alert signal may further cause the at least one networked subscriber device external to the threat management system to notify the at least one respective user of at least one respective threat solution that may include at least one escape path to at least one rally point outside the at least one threat location.

The threat alert signal may further cause the at least one networked subscriber device external to the threat management system to instruct the at least one respective user to travel at least one path having at least one reduced or minimized threat level as compared to at least one other escape path.

The threat alert signal may further cause the at least one networked subscriber device external to the threat management system to notify the at least one respective user of at least one respective threat solution that may include at least one escape path to one or more of the following: at least one police station, at least one fire station, at least one hospital, at least one previously user selected rally point, or at least one previously user selected address.

The threat alert signal may further cause the at least one networked subscriber device external to the threat management system to instruct the at least one respective user to travel at least one path having at least one reduced or minimized threat level as compared to at least one other escape path.

The threat alert signal may further cause the at least one networked subscriber device external to the threat management system to warn the at least one respective user of the at least one networked subscriber device that the at least one threat location may coincide with at least one respective target location that may include at least a first travel path that includes one or more of the following: at least one user selected or defined travel path or at least one travel path to a user selected or defined destination.

The threat alert signal may further cause the at least one networked subscriber device external to the threat management system to notify the at least one respective user of at least one respective threat solution that may include at least one adjusted travel path having at least one reduced or minimized threat level as compared to at least the first travel path.

The threat alert signal may further cause the at least one networked subscriber device external to the threat management system to notify the at least one respective user of at least one threat solution provider.

The at least one nontransitory computer-readable medium may further store processor-executable instructions that may further specifically program the at least one application server to: generate at least one list of threat solution providers; identify respective prioritization indicators of the threat solution providers; and responsive to the identification of the respective prioritization indicators, prioritize the threat solution providers.

The threat alert signal may further cause the at least one networked subscriber device external to the threat management system to notify the at least one respective user of at least one prioritized threat solution provider.

The at least one nontransitory computer-readable medium may further store processor-executable instructions that may further specifically program the at least one application server to: identify respective prioritization indicators of the threat solution providers by identifying one or more of the following: at least one user review of at least one threat solution provider, at least one popularity rating of at least one threat solution provider, at least one result of vetting at least one threat solution provider, or at least one relevance indicator of at least one threat solution provider.

The at least one nontransitory computer-readable medium may further store processor-executable instructions that may further specifically program the at least one application server to: identify respective prioritization indicators of the threat solution providers by identifying one or more of the following: at least one subscription by at least one threat solution provider or at least one bid by at least one threat solution provider.

The at least one network connectivity device communicably coupled to the at least one application server may further: obtain at least one threat report signal from at least one networked device external to the threat management system; and responsive to the obtainment of the at least one threat report signal, convert the at least one threat report signal to at least one threat report; and the at least one nontransitory computer-readable medium may further store processor-executable instructions that further specifically program the at least one application server to: generate at least one threat characteristic indicator and at least one threat location indicator by: responsive to the at least one threat report, generating the at least one threat characteristic indicator; and responsive to the at least one threat report, generating the at least one threat location indicator.

The at least one network connectivity device communicably coupled to the at least one application server may obtain at least one threat report signal from at least one networked device external to the threat management system by: obtaining at least one threat report signal from one or more of the following: at least one mobile device, at least one social media server, at least one news report server, at least one news broadcast device, at least one government server, at least one law enforcement server, at least one military server, or at least one law enforcement radio scanner.

The at least one network connectivity device communicably coupled to the at least one application server may obtain at least one threat report signal from at least one networked device external to the threat management system by: obtaining at least one threat report signal from at least one non-transitory computer readable medium that stores one or more of the following: at least one location of at least one reported crime, at least one location of at least one reported criminal, at least one location of at least one reported sex offender, at least one location of at least one reported terrorist, at least one location of at least one reported violent act, at least one location of at least one reported gang activity, at least one location of at least one reported act of sex solicitation, at least one location of at least one reported act of prostitution, at least one location of at least one reported act of sex trafficking, at least one location of at least one reported drug use, at least one location of at least one reported drug sale, at least one location of at least one reported drug trafficking, at least one location of at least one reported disease outbreak, at least one location of at least one reported gunshot, at least one location of at least one reported riot, at least one location of at least one reported act of police brutality, at least one location of at least one reported hate crime, or at least one location of at least one reported dangerous animal.

The at least one network connectivity device communicably coupled to the at least one application server may obtain at least one threat report signal from at least one networked device external to the threat management system by: obtaining at least one threat report signal from at least one non-transitory computer readable medium that stores at least one location of one or more of the following: at least one reported impending earthquake, at least one reported presently active earthquake, at least one reported impending tornado, at least one reported presently active tornado, at least one reported impending hurricane, at least one reported presently active hurricane, at least one reported impending flood, at least one reported presently active flood, at least one reported impending high tide, at least one reported presently active high tide, at least one reported impending low tide, at least one reported presently active low tide, at least one reported impending wildfire, at least one reported presently active wildfire, at least one reported impending tsunami, at least one reported presently active tsunami, at least one reported impending volcanic activity, at least one reported presently active volcanic activity, at least one reported geological fault line, at least one reported impending natural disaster, at least one reported presently active natural disaster, at least one reported impending power outage, at least one reported presently active power outage, at least one reported impending power shortage, at least one reported presently active power shortage, at least one reported impending fuel shortage, at least one reported presently active fuel shortage, at least one reported impending fresh water shortage, at least one reported presently active fresh water shortage, at least one reported impending food shortage, or at least one reported presently active food shortage.

The at least one nontransitory computer-readable medium may further store processor-executable instructions that may further specifically program the at least one application server to: generate at least one threat characteristic indicator by: generating at least one threat assessment score of the at least one threat location; and responsive to the generating of the at least one threat assessment score, generating the at least one threat characteristic indicator.

The at least one nontransitory computer-readable medium may further store processor-executable instructions that may further specifically program the at least one application server to: generate at least one threat assessment score of the at least one threat location by: generating at least one threat assessment score that indicates at least one level of one or more of the following: crime, theft, vehicle prowling, automobile theft, burglary, murder, sex offense, sex trafficking, prostitution, hate crime, violent crime, non-violent crime, piracy, drug trafficking, drug sales, drug use, gang activity, gang members, injunctions against gangs, injunctions against individuals, terrorist activity, outstanding warrants, sex offenders, criminals, police brutality, injunctions against police, corrupt politicians, unemployment, education, per capita income, household income, disease, life-threatening disease, dangerous animals, or riots.

The at least one nontransitory computer-readable medium may further store processor-executable instructions that may further specifically program the at least one application server to: generate at least one threat assessment score of the at least one threat location by: generating at least one threat assessment score that indicates at least one level of one or more of the following: earthquakes, tornados, hurricanes, floods, high tides, low tides, wildfires, tsunamis, volcanic activity, natural disasters, power outages, fuel shortages, power shortages, fresh water shortages, or food shortages.

The at least one network connectivity device communicably coupled to the at least one application server may further: obtain at least one threat assessment data signal from at least one networked device external to the threat management system; and responsive to the obtainment of the threat assessment data signal, convert the at least one threat assessment data signal to at least one set of threat assessment data; and the at least one nontransitory computer-readable medium further stores processor-executable instructions that further specifically program the at least one application server to: generate at least one threat assessment score of the at least one threat location by: responsive to the at least one set of threat assessment data, generating the at least one threat assessment score of the at least one threat location.

The at least one network connectivity device communicably coupled to the at least one application server may obtain at least one threat assessment data signal from at least one networked device external to the threat management system by: obtaining at least one threat assessment data signal from at least one non-transitory computer readable medium that stores one or more of the following: crime statistics, theft statistics, vehicle prowling statistics, automobile theft statistics, burglary statistics, murder statistics, at least one sex offense statistics, sex trafficking statistics, prostitution statistics, hate crime statistics, violent crime statistics, non-violent crime statistics, piracy statistics, drug trafficking statistics, drug sale statistics, drug use statistics, gang activity statistics, gang member statistics, injunction statistics, sex offender statistics, criminal statistics, police brutality statistics, corrupt politician statistics, unemployment statistics, education statistics, per capita income statistics, household income statistics, disease statistics, life-threatening disease statistics, terrorist activity statistics, outstanding warrant statistics, dangerous animal statistics, or riot statistics.

The at least one network connectivity device communicably coupled to the at least one application server may obtain at least one threat assessment data signal from at least one networked device external to the threat management system by: obtaining at least one threat assessment data signal from at least one non-transitory computer readable medium that stores one or more of the following: earthquake statistics, tornado statistics, hurricane statistics, flood statistics, high tide statistics, low tide statistics, wildfire statistics, tsunami statistics, volcanic activity statistics, natural disaster statistics, power outage statistics, fuel shortage statistics, power shortage statistics, fresh water shortage statistics, or food shortage statistics.

The threat alert signal may further cause the at least one networked subscriber device external to the threat management system to warn the at least one respective user of the at least one networked subscriber device that the at least one threat location coincides with at least one respective target location that includes at least one respective user selected or defined location.

The threat alert signal may further cause the at least one networked subscriber device external to the threat management system to warn the at least one respective user of the at least one networked subscriber device that the at least one threat location coincides with at least one respective target location that includes at least one respective present location of the at least one networked subscriber device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 15 is a user interface for an alerts management listing page of a web application of an alert system, according to one illustrated implementation.

FIG. 19 is a user interface for an upload new comma separated values (CSV) file page of a web application of an alert system, according to one illustrated implementation.

FIG. 20 is a user interface for a configure application program interface (API) page of a web application of an alert system, according to one illustrated implementation.

FIG. 21 is a user interface for a configure live feed page of a web application of an alert system, according to one illustrated implementation.

FIG. 24 is a user interface for a security tool list page of a web application of an alert system, according to one illustrated implementation.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations. In other instances, well-known mathematical and statistical methods for performing statistical analyses and other well-known mathematical operation have not been described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" as in "one or more of" unless the content clearly dictates otherwise.

The headings and Abstract of the Disclosure provided herein are for convenience only and do not interpret the scope or meaning of the implementations.

Figure 1:
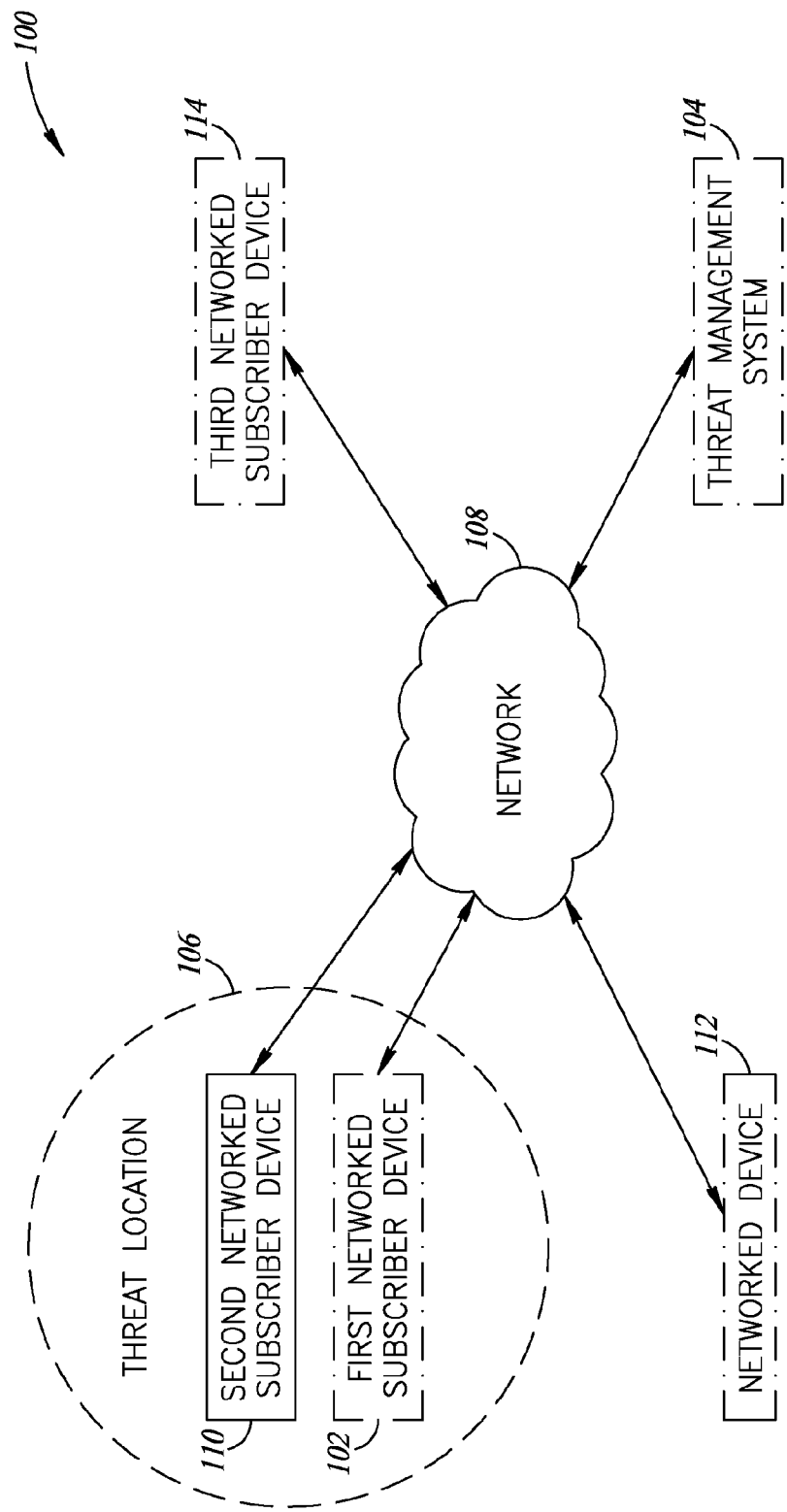
FIG. 1 is a high-level functional block diagram of an alert system, according to one illustrated implementation.
Figure 11:
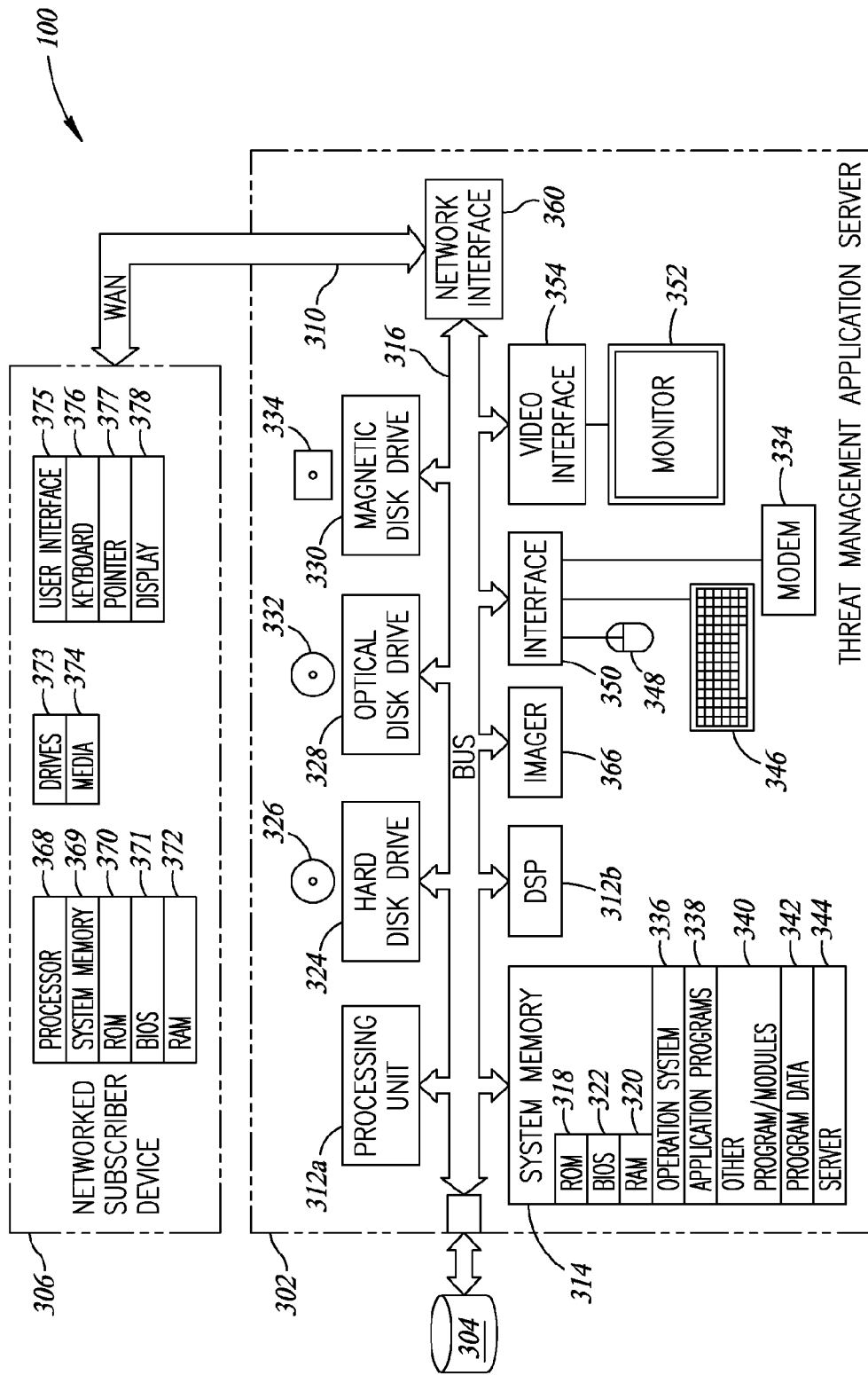
FIG. 11 is a functional block diagram of a threat management application server and a networked subscriber device, according to one illustrated implementation.

FIG. 1 shows a high-level functional block diagram of an alert system 100 for alerting a respective user associated with a first networked subscriber device 102. FIG. 11 shows a corresponding low-level functional block diagram of the alert system 100. The alert system 100 includes a threat management system 104 and the first networked subscriber device 102. The threat management system 104 communicates with the first networked subscriber device 102 via a network 108. The threat management system 104 causes the first networked subscriber device 102 to emit a humanly perceptible alarm that warns the user of the first networked subscriber device 102 that a target location of the first networked subscriber device 102 coincides with a threat location 106.

The target location of the first networked subscriber device 102 may include a present location of the first networked subscriber device 102 (i.e., the present location of the user associated with the first networked subscriber device 102). The present location of the first networked subscriber device 102 may be determined from positional data generated by positional tracking logic embedded in the first networked subscriber device 102. The positional tracking logic may include a geodesy system such as global positioning system ("GPS"), Galileo (European) or GLONASS (Russian) logic and wherein the first networked subscriber device 102 receives timing and geodesy information from one or more satellites. Additionally or alternatively, the present location of the first networked subscriber device 102 may be determined from a user checking in to a given location via social media. Additionally or alternatively, the present location of the first networked subscriber device 102 may be determined via radio frequency identification ("RFID") technology or other wireless technologies (e.g., Wi-Fi®), for example. Accordingly, when a present location of the user of the first networked subscriber device 102 coincides with the target location of the first networked subscriber device 102, the threat management system 104 effectively warns the user of the first networked subscriber device 102 that the present location of the user of the first networked subscriber device 102 coincides with the threat location 106. In this manner, the threat management system 104 improves awareness of the user of the first networked subscriber device 102 of surrounding threats that may pose danger to the user of the first networked subscriber device 102.

The threat management system 104 may determine that the threat exists at the threat location 106. The threat management system 104 may make the threat existence determination responsive to obtaining a communication from a given device external to the threat management system 104. The given device external to the threat management system 104 may include a second networked subscriber device 110 operated by a user different from the user of the first networked subscriber device 102 that is present in the threat location 106. Additionally or alternatively, the given device external to the threat management system 104 may include a networked device 112 external to the threat management system 104 and the threat location 106. For example, the networked device 112 external to the threat management system 104 may include one or more of the following: a mobile device, a social media server, a news report server, a news broadcast device, a government server, a law enforcement server, a military server, a law enforcement radio scanner, etc. As an additional example, the networked device 112 external to the threat management system 104 may include a non-transitory computer readable medium that stores one or more of the following: a location of a reported crime, a location of a reported criminal, a location of a reported sex offender, a location of a reported terrorist, a location of a reported violent act, a location of a reported gang activity, a location of a reported act of sex solicitation, a location of a reported act of prostitution, a location of a reported act of sex trafficking, a location of a reported drug use, a location of a reported drug sale, a location of a reported drug trafficking, a location of a reported disease outbreak, a location of a reported gunshot, a location of a reported riot, a location of a reported act of police brutality, a location of a reported hate crime, a location of a reported dangerous animal, etc. As another example, the networked device 112 external to the threat management system 104 may include a non-transitory computer readable medium that stores a location of one or more of the following: a reported impending earthquake, a reported presently active earthquake, a reported impending tornado, a reported presently active tornado, a reported impending hurricane, a reported presently active hurricane, a reported impending flood, a reported presently active flood, a reported impending high tide, a reported presently active high tide, a reported impending abnormal high tide, a reported presently active abnormal high tide, a reported impending low tide, a reported presently active low tide, a reported impending abnormal low tide, a reported presently active abnormal low tide, a reported impending wildfire, a reported presently active wildfire, a reported impending tsunami, a reported presently active tsunami, a reported impending volcanic activity, a reported presently active volcanic activity, a reported geological fault line, a reported impending natural disaster, a reported presently active natural disaster, a reported impending power outage, a reported presently active power outage, a reported impending power shortage, a reported presently active power shortage, a reported impending fuel shortage, a reported presently active fuel shortage, a reported impending fresh water shortage, a reported presently active fresh water shortage, a reported impending food shortage, a reported presently active food shortage, etc. As a further example, the networked device 112 external to the threat management system 104 may include a non-transitory computer readable medium that stores one or more of the following: crime statistics, theft statistics, vehicle prowling statistics, automobile theft statistics, burglary statistics, murder statistics, at least one sex offense statistics, sex trafficking statistics, prostitution statistics, hate crime statistics, violent crime statistics, non-violent crime statistics, piracy statistics, drug trafficking statistics, drug sale statistics, drug use statistics, gang activity statistics, gang member statistics, injunction statistics, sex offender statistics, criminal statistics, police brutality statistics, corrupt politician statistics, unemployment statistics, education statistics, per capita income statistics, household income statistics, disease statistics, life-threatening disease statistics, vehicle accident statistics, terrorist activity statistics, outstanding warrant statistics, dangerous animal statistics, riot statistics, earthquake statistics, tornado statistics, hurricane statistics, flood statistics, high tide statistics, low tide statistics, wildfire statistics, tsunami statistics, volcanic activity statistics, natural disaster statistics, power outage statistics, fuel shortage statistics, power shortage statistics, fresh water shortage statistics, food shortage statistics, etc.

The obtained communication from the given device external to the threat management system 104 may include a threat report signal. For example, a witness of the threat at the threat location 106 may report the threat to or via the given device external to the threat management system 104. As another example, an entity with knowledge of the threat at the threat location 106 may report the threat to or via the given device external to the threat management system 104. As a further example, responsive to a sensor that senses the threat at the threat location 106, the given device external to the threat management system 104 may report the threat. Accordingly, the threat management system 104 obtains a record of the threat at the threat location 106. In this manner, the threat management system 104 improves awareness of the user of the first networked subscriber device 102 of reportedly posed danger at the threat location 106.

Additionally or alternatively, the obtained communication from the given device external to the threat management system 104 may include a threat assessment data signal. Responsive to the threat assessment data signal, the threat management system 104 may generate a threat assessment score. The threat assessment score may include a value type of one or more of the following: a color, a number, text, an image, a graphic, a symbol, a shape, a graph, a diagram, etc. Additionally or alternatively, the threat assessment data signal may include the threat assessment score. Accordingly, the threat management system 104 obtains a record of threat propensity at the threat location 106. In this manner, the threat management system 104 improves awareness of the user of the first networked subscriber device 102 of typical posed danger at the threat location 106.

The threat location 106 includes a location of a threat. The threat may include a temporary threat. The temporary threat may include a presently active temporary threat at the threat location 106. For example, the presently active temporary threat may include a presently active shooter of a weapon at the threat location 106. As another example, the presently active temporary threat may include a presently active tornado at the threat location 106. As additional examples, the presently active temporary threat may include one or more of the following: a presently active crime, a presently active sex offense, a presently active act of terrorism, a presently active violent act, a presently active gang activity, presently active sex solicitation, presently active prostitution, presently active sex trafficking, presently active drug use, presently active drug sale, presently active drug trafficking, a presently active disease outbreak, a presently active gunshot, a presently active riot, a presently active act of police brutality, a presently active hate crime, a presently active dangerous animal, a presently active earthquake, a presently active tornado, a presently active hurricane, a presently active flood, a presently active high tide, a presently active low tide, a presently active wildfire, a presently active tsunami, presently active volcanic activity, a presently active natural disaster, a presently active power outage, a presently active power shortage, a presently active fuel shortage, a presently active fresh water shortage, a presently active food shortage, etc. Accordingly, the threat management system 104 warns the user of the first networked subscriber device 102 that the target location of the first networked subscriber device 102 coincides with the threat location 106 of the presently active temporary threat. In this manner, the threat management system 104 improves the likelihood that the user of the first networked subscriber device 102 avoids or escapes posed danger of the presently active temporary threat.

Additionally or alternatively, the temporary threat may include an imminent temporary threat. The imminent temporary threat may include a presently inactive temporary threat at the threat location 106. For example, the imminent temporary threat may include a forecasted hurricane at the threat location 106. As another example, the imminent temporary threat may include one or more of the following: an imminent disease outbreak, an imminent riot, an imminent earthquake, an imminent tornado, an imminent hurricane, an imminent flood, an imminent high tide, an imminent low tide, an imminent wildfire, an imminent tsunami, imminent volcanic activity, an imminent natural disaster, an imminent power outage, an imminent power shortage, an imminent active fuel shortage, an imminent fresh water shortage, an imminent food shortage, etc. Additionally or alternatively, the imminent temporary threat may include a presently active temporary threat outside of the threat location 106 and presently approaching the threat location 106. For example, the imminent temporary threat may include a high-speed vehicle chase that includes a fleeing vehicle that drives toward the threat location 106.

Accordingly, the threat management system 104 warns the user of the first networked subscriber device 102 that the target location of the first networked subscriber device 102 coincides with the threat location 106 of the imminent temporary threat. In this manner, the threat management system 104 improves the likelihood that the user of the first networked subscriber device 102 prepares for or avoids posed danger of the imminent temporary threat or has sufficient time to assist others at the threat location 106.

Additionally or alternatively, the threat may include a permanent or semi-permanent threat. For example, the permanent or semi-permanent threat may include a registered sex offender. As another example, the permanent or semi-permanent threat may include a known violent gang. As additional examples, the permanent or semi-permanent threat may include one or more of the following: a high crime rate, a high violence rate, a high rate of gang activity, a high rate of sexual solicitation, a high rate of sex trafficking, a high rate of drug use, a high rate of drug sales, a high rate of drug trafficking, a high rate of disease outbreak, a high rate of gunshots, a high rate of riots, a high rate of police brutality, a high rate of hate crimes, a high rate of dangerous animal encounters, a high rate of earthquakes, a high rate of tornados, a high rate of hurricanes, a high rate of floods, a high rate of high tides, a high rate of low tides, a high rate of wildfires, a high rate of tsunamis, a high rate of volcanic activity, a geological fault line, a high rate of natural disasters, a high rate of power outages, a high rate of power shortage, a high rate of fuel shortages, a high rate of fresh water shortages, a high rate of food shortage, a high rate of theft, a high rate of vehicle prowling, a high rate of automobile theft, a high rate of burglary, a high rate of murder, a high rate of sex offenses, a high rate of prostitution, a high rate of non-violent crime, a high rate of piracy, a high rate of gang members, a high rate of injunctions against gangs, a high rate of injunctions against individuals, a high rate of terrorist activity, a high rate of outstanding warrants, a high rate of sex offenders, a high rate of criminals, a high rate of car accidents a high rate of police brutality, a high rate of injunctions against police, a high rate of corrupt politicians, a high rate of unemployment, a high rate of low education, a high rate of low per capita income, a high rate of low household income, a high rate of disease, a high rate of life-threatening disease, etc. Additionally or alternatively, the permanent or semi-permanent threat may include one or more of the immediately above explained examples when a severity level of the threat is sufficiently high, even when the rate of the threat is low. Accordingly, the threat management system 104 warns the user of the first networked subscriber device 102 that the target location of the first networked subscriber device 102 coincides with the threat location 106 of the permanent or semi-permanent threat. In this manner, the threat management system 104 improves the likelihood that the user of the first networked subscriber device 102 prepares for or avoids the permanent or semi-permanent threat or takes action to improve a condition of the threat location 106.

Figure 3:
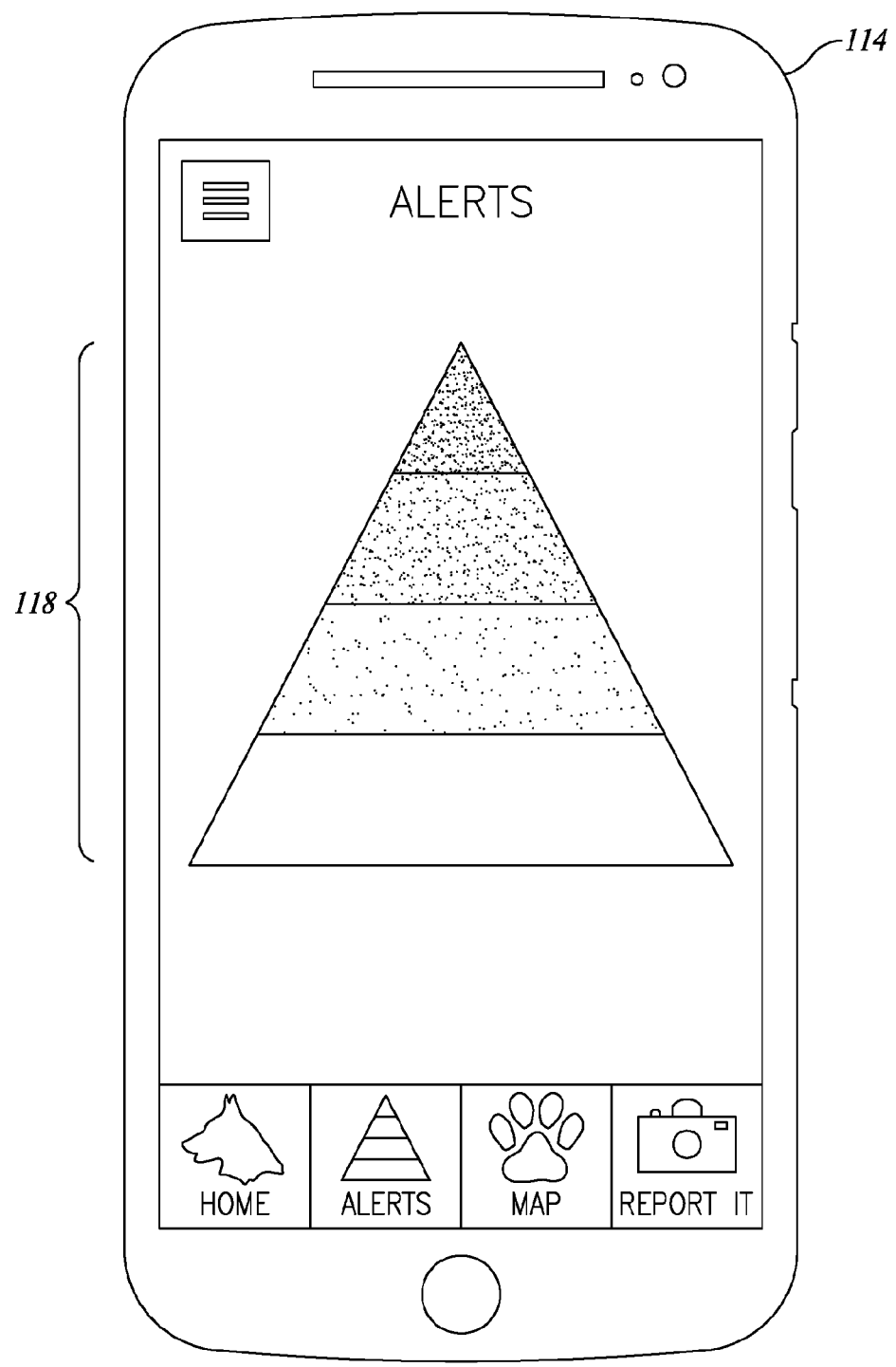
FIG. 3 shows a visual alert of a networked subscriber device, according to one illustrated implementation.
Figure 4:
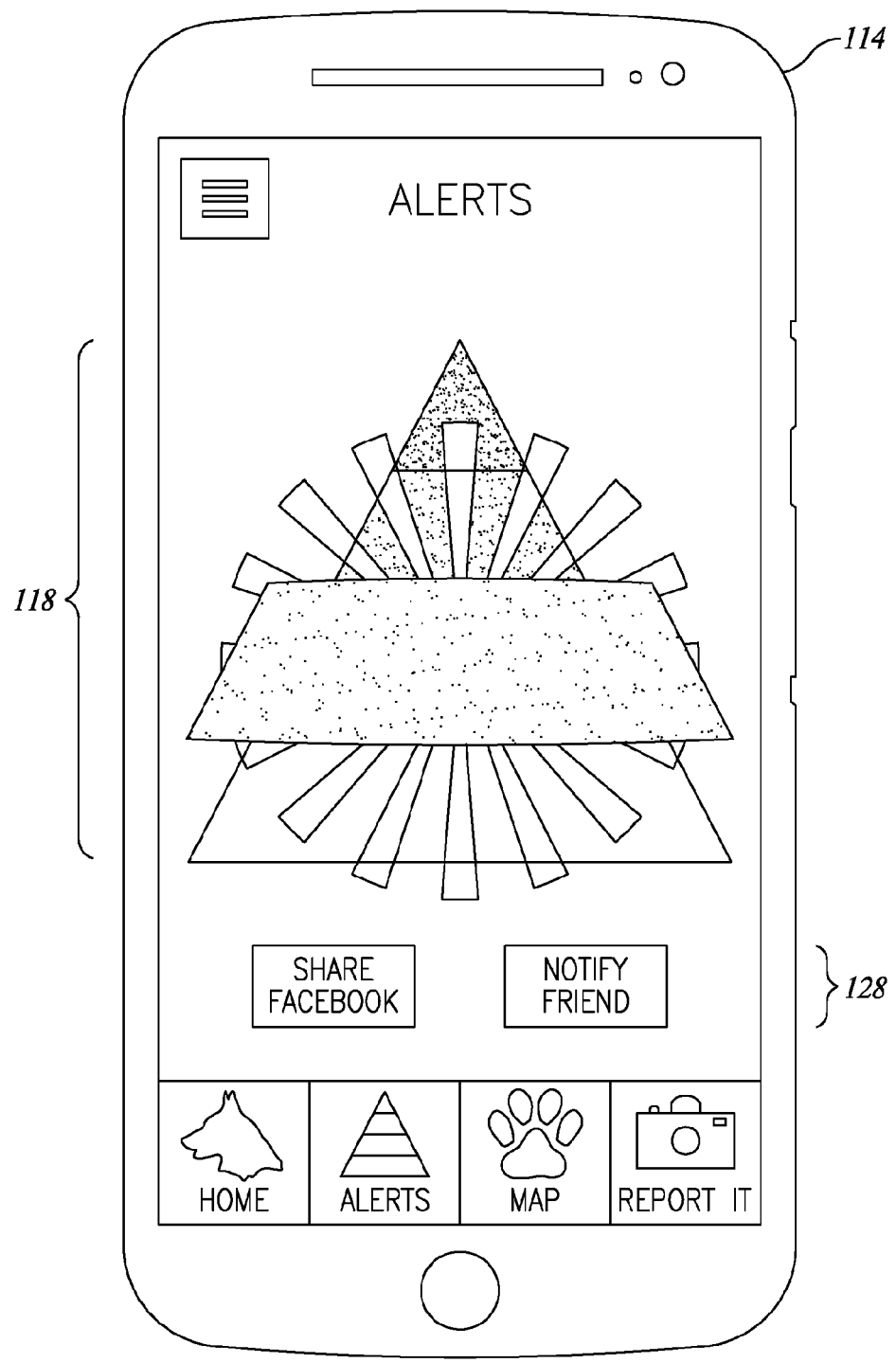
FIG. 4 shows a visual alert of a networked subscriber device and options to notify emergency contacts, according to one illustrated implementation.

In addition or alternative to the first networked subscriber device 102, the alert system 100 may include a third networked subscriber device 114. The threat management system 104 communicates with the third networked subscriber device 114 via the network 108. As shown in FIG. 3 and FIG. 4, the threat management system 104 causes the third networked subscriber device 114 to emit a humanly perceptible alarm 118 that warns a user of the third networked subscriber device 114 that a target location of the third networked subscriber device 114 coincides with the threat location 106.

The target location of the third networked subscriber device 114 may include a present location of the third networked subscriber device 114. Accordingly, when a present location of the user of the third networked subscriber device 114 coincides with the target location of the third networked subscriber device 114, the threat management system 104 effectively warns the user of the third networked subscriber device 114 that the present location of the user of the third networked subscriber device 114 coincides with the threat location 106. In this manner, the threat management system 104 permits the user of the third networked subscriber device 114 to monitor threats that may pose danger to the user of the third networked subscriber device 114.

Additionally or alternatively, the target location of the third networked subscriber device 114 may include a location that is different from the present location of the third networked subscriber device 114. The target location of the third networked subscriber device 114 may include the present location of the first networked subscriber device 102. Accordingly, when the present location of the user of the first networked subscriber device 102 coincides with the target location of the third networked subscriber device 114, the threat management system 104 effectively warns the user of the third networked subscriber device 114 that the present location of the user of the first networked subscriber device 102 coincides with the threat location 106. In this manner, the threat management system 104 improves awareness of the user of the third networked subscriber device 114 of surrounding threats that may pose danger to the user of the first networked subscriber device 102.

Additionally or alternatively, the target location of the third networked subscriber device 114 may include a location that is different from the present location of the third networked subscriber device 114 and different from the present location of the first networked subscriber device 102. For example, the user of the third networked subscriber device 114 may select or define the target location of the third networked subscriber device 114. Accordingly, the threat management system 104 warns the user of the third networked subscriber device 114 that the user defined or selected location coincides with the threat location 106. In this manner, the threat management system 104 permits the user of the third networked subscriber device 114 to monitor threats that may pose danger to remotely located property or a loved one at a known location.

Additionally or alternatively, the target location of the third networked subscriber device 114 may include a user selected or defined travel path from a start position to a destination. The start position of the user selected or defined travel path may include the present location of the third networked subscriber device 114. Additionally or alternatively, the start position of the user selected or defined travel path may include the present location of the first networked subscriber device 102. Additionally or alternatively, the start position of the user selected or defined travel path may include a user selected or defined start position. The destination of the user selected or defined travel path may include a user selected or defined destination. Accordingly, the threat management system 104 warns the user of the third networked subscriber device 114 when the user selected or defined travel path coincides with the threat location 106. In this manner, the threat management system 104 improves awareness of the user of the third networked subscriber device 114 of posed dangers in, along, adjacent, or near the user selected or defined travel path, including paths commonly traversed by the user (e.g., commute, errands, vacation spots).

In addition or alternative to the humanly perceptible alarm 118 that warns the user of the third networked subscriber device 114 that the target location of the third networked subscriber device 114 coincides with the threat location 106, the threat management system 104 may cause the third networked subscriber device 114 to notify the user of the third networked subscriber device 114 of a threat characteristic of the threat at the threat location 106. The threat management system 104 may determine the threat characteristic. Additionally or alternatively, the threat management system 104 may calculate the threat characteristic. Additionally or alternatively, the threat management system 104 may generate the threat characteristic. Additionally or alternatively, the threat management system 104 may create the threat characteristic. Additionally or alternatively, the threat management system 104 may obtain the threat characteristic.

The threat characteristic may include a particular threat type of the threat at the threat location 106. For example, the threat management system 104 may cause the third networked subscriber device 114 to notify the user of the third networked subscriber device 114 that the threat at the threat location 106 is a temporary threat. As another example, the threat management system 104 may cause the third networked subscriber device 114 to notify the user of the third networked subscriber device 114 that the threat at the threat location 106 is a presently active temporary threat. As a further example, the threat management system 104 may cause the third networked subscriber device 114 to notify the user of the third networked subscriber device 114 that the threat at the threat location 106 is a presently active shooter of a weapon. In this manner, the threat management system 104 notifies the user of the third networked subscriber device 114 to be aware of the particular threat type, thereby improving the speed user of the third networked subscriber device 114 in terms of determining or recognizing subsequent acts.

Additionally or alternatively, the threat characteristic may include a threat level of the threat at the threat location 106. The threat level may indicate a level of threat seriousness. Additionally or alternatively, the threat level may indicate a level of threat danger. The threat level may vary responsive to distance between the target location of the third networked subscriber device 114 and the threat at the threat location 106. Additionally or alternatively, the threat level may vary responsive to time until the threat at the threat location 106 becomes a presently active threat. Additionally or alternatively, the threat level may vary responsive to expected remaining existence duration of the threat at the threat location 106. Additionally or alternatively, the threat level may vary responsive to a level of preparedness of the threat location 106 for the threat at the threat location 106. Additionally or alternatively, the threat level may vary responsive to number of reports of the threat at the threat location 106. Additionally or alternatively, the threat level may vary responsive to whether the threat at the threat location 106 includes a rare event. Additionally or alternatively, the threat level may vary responsive to velocity of the threat at the threat location 106. Additionally or alternatively, the threat level may vary responsive to velocity of the target location of the third networked subscriber device 114. Additionally or alternatively, the threat level may vary responsive to acceleration of the threat at the threat location 106. Additionally or alternatively, the threat level may vary responsive to acceleration of the target location of the third networked subscriber device 114. Additionally or alternatively, the threat level may vary responsive to each user's particular comfort level, as expressed by the user or as detected by the threat management system 104.

Additionally or alternatively, a dimension of the target location of the third networked subscriber device 114 may vary responsive to the threat characteristic. Additionally or alternatively, a dimension of the threat location 106 may vary responsive to the threat characteristic. Accordingly, the threat management system 104 warns the user of the third networked subscriber device 114 only responsive to the threat at the threat location 106 being of situational significance to the user of the third networked subscriber device 114. In this manner, the threat management system 104 improves the likelihood that the user of the third networked subscriber device 114 seriously considers the threat at the threat location 106.

Figure 2:
FIG. 2 shows interfaces of a networked subscriber device, according to one illustrated implementation.

The threat management system 104 may permit the third networked subscriber device 114 to subscribe to one or more particular threat characteristics. As shown in FIG. 2, the user of the third networked subscriber device 114 may select a particular threat characteristic for subscription by interacting with a threat characteristic interface 116 of the third networked subscriber device 114. Additionally or alternatively, the user of the third networked subscriber device 114 may define the particular threat characteristic for subscription by interacting with the threat characteristic interface 116 of the third networked subscriber device 114. The threat characteristic interface 116 of the third networked subscriber device 114 may include one or more of a slide bar, a checkbox, a menu, a button, a dialog box, etc., for example. As an example, the threat management system 104 may cause the third networked subscriber device 114 to emit the humanly perceptible alarm 118 that warns the user of the third networked subscriber device 114 that the target location of the third networked subscriber device 114 coincides with the threat location 106 only responsive to the threat characteristic of the threat at the threat location 106 matching the user selected or defined threat characteristic. As another example, the threat management system 104 may cause the third networked subscriber device 114 to emit the humanly perceptible alarm 118 that warns the user of the third networked subscriber device 114 that the target location of the third networked subscriber device 114 coincides with the threat location 106 only responsive to the threat characteristic of the threat at the threat location 106 falling within a range of the user selected or defined threat characteristic. As a further example, the threat management system 104 may cause the third networked subscriber device 114 to emit the humanly perceptible alarm 118 that warns the user of the third networked subscriber device 114 that the target location of the third networked subscriber device 114 coincides with the threat location 106 only responsive to the threat characteristic of the threat at the threat location 106 exceeding the user selected or defined threat characteristic. Accordingly, the threat management system 104 warns the user of the third networked subscriber device 114 only responsive to the threat at the threat location 106 being of interest or concern to the user of the third networked subscriber device 114. In this manner, the threat management system 104 improves the likelihood that the user of the third networked subscriber device 114 seriously considers the threat at the threat location 106.

The humanly perceptible alarm 118 that warns the user of the third networked subscriber device 114 may include a visual alarm. The visual alarm may include a pyramid and/or triangle. Additionally or alternatively, the visual alarm may include a radar chart. Additionally or alternatively, the visual alarm may include Harvey Balls. Additionally or alternatively, the visual alarm may include gauges. Additionally or alternatively, the visual alarm may include a wind rose diagram.

Additionally or alternatively, the humanly perceptible alarm 118 that warns the user of the third networked subscriber device 114 may include a haptic alarm. Additionally or alternatively, the humanly perceptible alarm 118 that warns the user of the third networked subscriber device 114 may include an audible alarm. Additionally or alternatively, the user of the third networked subscriber device 114 may choose whether the humanly perceptible alarm 118 that warns the user of the third networked subscriber device 114 includes a particular combination of visual, haptic, or audible alarms. Additionally or alternatively, whether the humanly perceptible alarm 118 that warns the user of the third networked subscriber device 114 includes a particular combination of visual, haptic, or audible alarms varies responsive to the threat characteristic of the threat at the threat location 106. For example, the threat characteristic of the threat at the threat location 106 may indicate that a visual or audible alarm may attract unwanted attention to the third networked subscriber device 114. As another example, the threat characteristic of the threat at the threat location 106 may indicate that an audible or haptic alarm may not sufficiently warn the user of the third networked subscriber device 114. As a further example, the threat characteristic of the threat at the threat location 106 may indicate that the user of the third networked subscriber device 114 may not perceive a visual or haptic alarm. Accordingly, the threat management system 104 may cause the third networked subscriber device 114 to emit the humanly perceptible alarm 118 that warns the user of the third networked subscriber device 114 that most appropriately warns the user of the third networked subscriber device 114 that the target location of the third networked subscriber device 114 coincides with the threat location 106. In this manner, the threat management system 104 increases the likelihood that user becomes aware or safely aware of the threat at the threat location 106.

Additionally or alternatively, the humanly perceptible alarm 118 that warns the user of the third networked subscriber device 114 may notify the user of the third networked subscriber device 114 of the threat characteristic of the threat at the threat location 106. For example, an intensity of the humanly perceptible alarm 118 that warns the user of the third networked subscriber device 114 may vary responsive to the threat characteristic. As another example, a pattern of the humanly perceptible alarm 118 that warns the user of the third networked subscriber device 114 may vary responsive to the threat characteristic. As a further example, a color of the humanly perceptible alarm 118 that warns the user of the third networked subscriber device 114 may vary responsive to the threat characteristic. As an additional example, a graphic of the humanly perceptible alarm 118 that warns the user of the third networked subscriber device 114 may vary responsive to the threat characteristic. As yet another example, a sound of the humanly perceptible alarm 118 that warns the user of the third networked subscriber device 114 may vary responsive to the threat characteristic. As yet a further example, text of the humanly perceptible alarm 118 that warns the user of the third networked subscriber device 114 may vary responsive to the threat characteristic.

Figure 5:
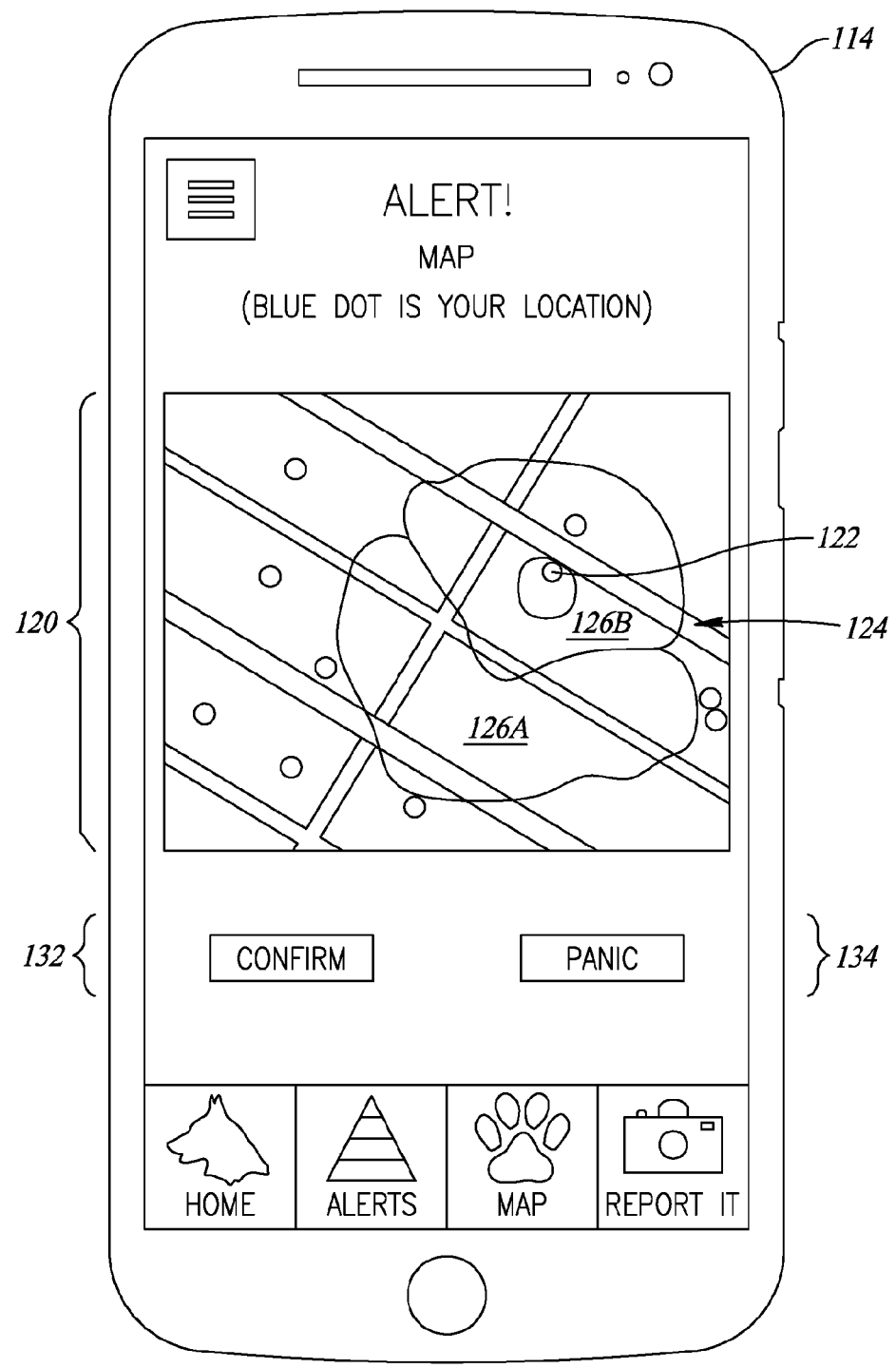
FIG. 5 shows a networked subscriber device that displays a map of a threat location having multiple zones, according to one illustrated implementation.
Figure 6:
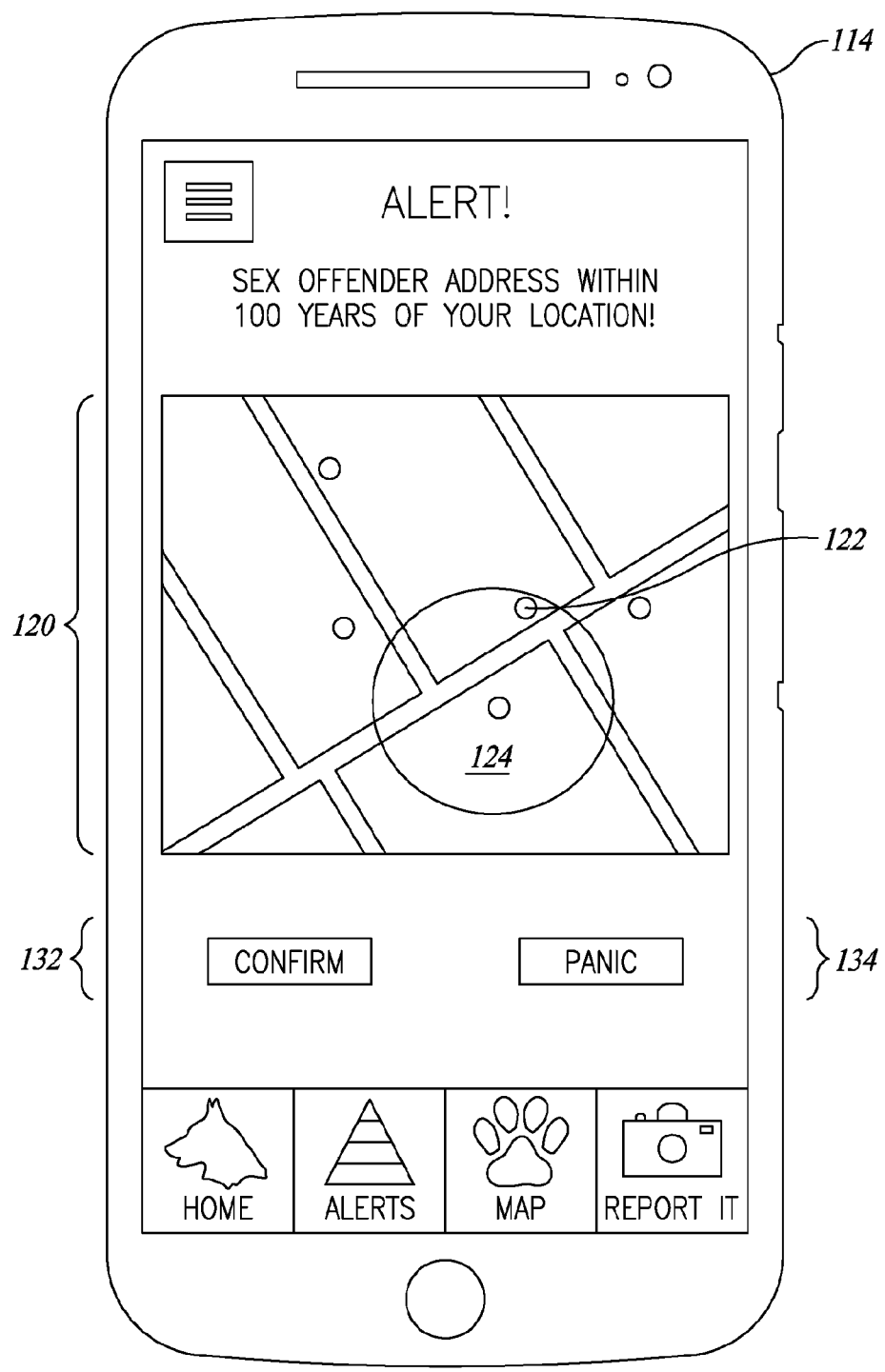
FIG. 6 shows a networked subscriber device that displays a map of a threat location having multiple zones, according to one illustrated implementation.

Additionally or alternatively, the humanly perceptible alarm 118 that warns the user of the third networked subscriber device 114 may include a map 120 as shown in FIG. 5 and FIG. 6. The map 120 may include a target location indicator 122 of the target location of the third networked subscriber device 114. Additionally or alternatively, the map 120 may include a threat location indicator 124 of the threat location 106. The threat location indicator 124 may include multiple zones 126A, 126B as shown in FIG. 5. The zones 126A, 126B may correspond to respective threat characteristics of respective areas at the threat location 106. Additionally or alternatively, a dimension of the threat location indicator 124 may vary responsive to the dimension of the threat location 106. Additionally alternatively, the dimension the threat location indicator 124 may vary responsive to the dimension of the target location of the third networked subscriber device 114. Additionally or alternatively, a visual characteristic of the threat location indicator 124 may vary responsive to the threat characteristic. The visual characteristic of the threat location indicator 124 may include one or more of color, intensity, opacity, pattern, border, etc., for example. Additionally or alternatively, respective dimensions of one of, some of, or each of the zones 126A, 126B may vary responsive to the dimension of the threat location 106. Additionally or alternatively, the respective dimensions of one of, some of, or each of, the zones 126A, 126B may vary responsive to the dimension of the target location of the third networked subscriber device 114. Additionally or alternatively, respective visual characteristics of the zones 126A, 126B may vary responsive to the threat characteristic. The respective visual characteristics of the zones 126A, 126B may include one or more of color, intensity, opacity, pattern, border, etc., for example.

Additionally or alternatively, the threat management system 104 may cause the third networked subscriber device 114 to provide the user of the third networked subscriber device 114 an option 128 to automatically notify emergency contacts of the user of the third networked subscriber device 114 as shown in FIG. 4. For example, the notification may occur via social media, phone call, email, short message service, posting on a website, etc. Selecting the option 128 to automatically notify the emergency contacts of the user of the third networked subscriber device 114 may automatically notify the emergency contacts of a position of the target location of the third networked subscriber device 114. Additionally or alternately, selecting the option 128 to automatically notify the emergency contacts of the user of the third networked subscriber device 114 may automatically notify the emergency contacts of a status of the target location of the third networked subscriber device 114. Additionally or alternatively, selecting the option 128 to automatically notify the emergency contacts of the user of the third networked subscriber device 114 may automatically notify the emergency contacts of the threat characteristic of the threat at the threat location 106. Accordingly, the threat management system 104 keeps important entities aware of developing situations. In this manner, the threat management system 104 permits the important entities to make informed decisions when reacting to the developing situations.

Additionally or alternatively, the user of the third networked subscriber device 114 may select or define the emergency contacts via a contact interface 130 of the third networked subscriber device 114 as shown in FIG. 2. For example, the user of the third networked subscriber device 114 may select the emergency contacts via the contact interface 130 from a contact list associated with the user of the third networked subscriber device 114. As another example, the user of the third networked subscriber device 114 may enter contact information of the emergency contacts into the contact interface 130.

Additionally or alternatively, the threat management system 104 may cause the third networked subscriber device 114 to provide the user of the third networked subscriber device 114 an option 132 to indicate confirmation as shown in FIG. 5 and FIG. 6. For example, the confirmation may indicate that the user of the third networked subscriber device 114 is safe. As another example, the confirmation may indicate the target location of the third networked subscriber device 114 is safe. Additionally or alternatively, the threat management system 104 may track confirmations. Responsive to tracking the confirmations, the threat management system 104 may vary the threat characteristic of the threat at the threat location 106.

Additionally or alternatively, the threat management system 104 may cause the third networked subscriber device 114 to provide the user of the third networked subscriber device 114 an option 134 to indicate panic. For example, the panic may indicate that the user of the third networked subscriber device 114 is unsafe. As another example, the panic may indicate that the target location of the third networked subscriber device 114 is unsafe. As a further example, the panic may indicate that someone else is unsafe. Additionally or alternatively, responsive to the panic, the threat management system 104 may cause automatic performance of the procedure explained above with regard to the option 128 to automatically notify the emergency contacts of the user of the third networked subscriber device 114. Additionally or alternatively, responsive to the panic, the threat management system 104 may automatically contact an authority. The contacted authority may vary responsive to the threat characteristic of the threat at the threat location 106. For example, responsive to panic during a fire, the authority may include a fire department. Additionally or alternatively, the contacted authority may vary responsive to the threat location 106. For example, responsive to the threat location 106 including an ocean, the contacted authority may include a coast guard. Additionally or alternatively, the threat management system 104 may track panics. Responsive to tracking the panics, the threat management system 104 may vary the threat characteristic of the threat at the threat location 106.

Figure 7:
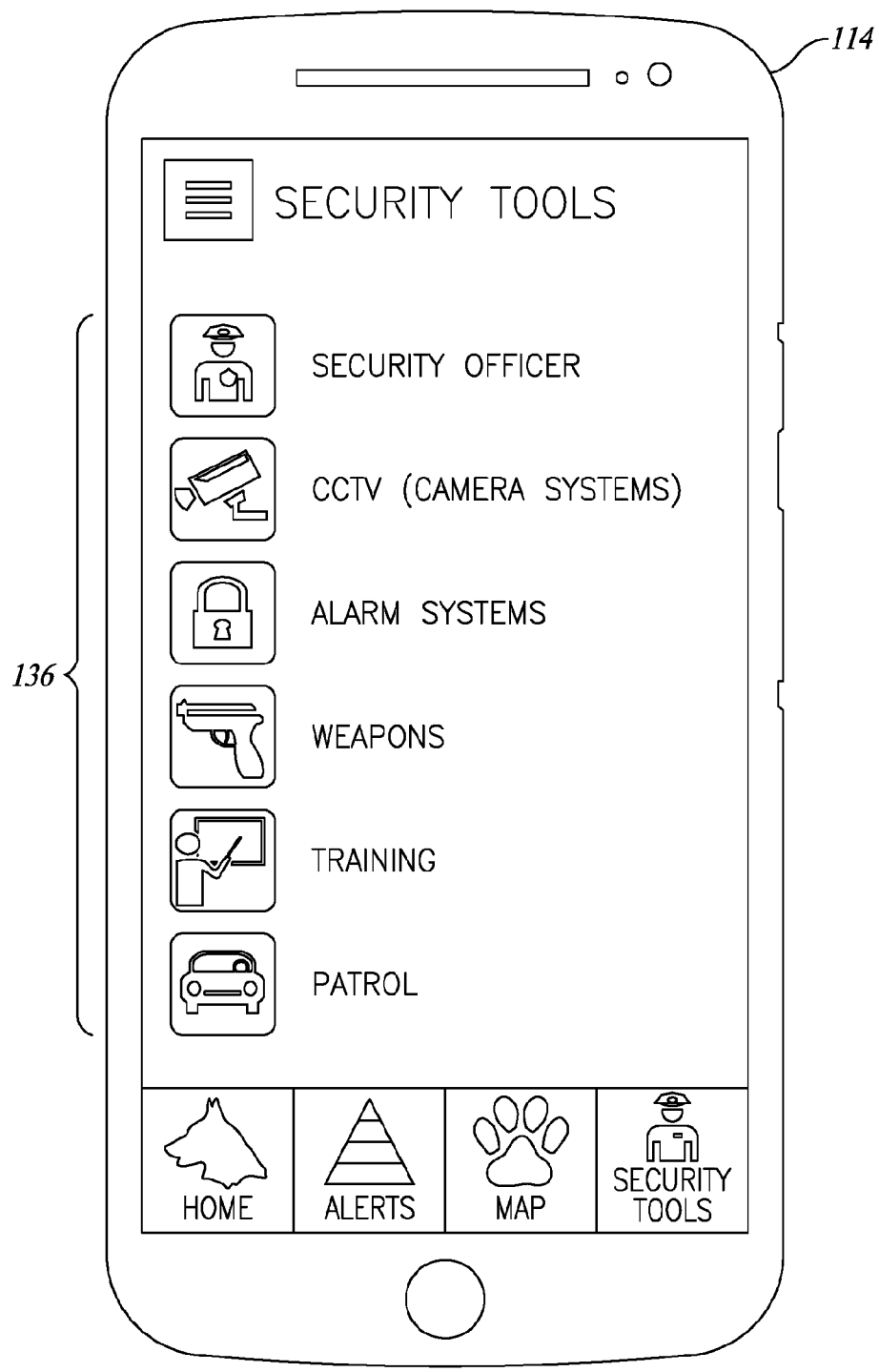
FIG. 7 shows a networked subscriber device that displays a list of threat solutions, according to one illustrated implementation.

Additionally or alternatively, the threat management system 104 may cause the third networked subscriber device 114 to notify the user of the third networked subscriber device 114 of a threat solution 136 (FIG. 7). The threat management system 104 may determine, generate, create, or identify the threat solution 136 responsive to the threat characteristic of the threat at the threat location 106. Additionally or alternatively, the threat solution 136 may vary responsive to the threat characteristic of the threat at the threat location 106.

The threat solution 136 includes a solution to the threat at the threat location 106. The solution to the threat at the threat location 106 may include a category of solutions as shown in FIG. 7. For example, solution to the threat at the threat location 106 may include a security system or security device. As another example, the solution to the threat at the threat location 106 may include a training course. As an additional example, the solution to the threat at the threat location 106 may include a security service. As further examples, the solution to the threat at the threat location 106 may include one or more of the following: an alarm system, an alarm monitoring subscription, a camera system, a person tracking subscription or system, a security officer, an unarmed security officer, an armed security officer, a counter assault team, an anti-terrorism team, a security patrol, an armored car service, a vault, a body guard, a private investigator, a self-defense training lesson, a firearm training session, a firearm, etc. Additionally or alternatively, the solution to the threat at the threat location 106 may include particular solutions within a category of solutions or across multiple categories of solutions. For example, the solution to the threat at the threat location 106 may include a particular weapon. As another example, the solution to the threat at the threat location 106 may include a particular security service or team. As an additional example, the solution to the threat at the threat location 106 may include a particular investigator. The solution to the threat at the threat location 106 may include a solution to end the threat at the threat location 106. For example, the threat solution 136 may include step-by-step instructions to disconnect a power supply to a building or piece of equipment. As another example, the threat solution 136 may include a command to shoot a presently active terrorist. Additionally or alternatively, the threat solution 136 may include a solution to thwart the threat at the threat location 106. For example, the threat solution 136 may include a vehicle alarm system to deter automobile theft. Additionally or alternatively, the threat solution 136 may include a solution to reduce the level of threat danger or the level of threat seriousness of the threat at the threat location 106. For example, the threat solution 136 may include donating time, supplies, or money to a charity, health, school, or community program at the threat location 106. Additionally or alternatively, the threat solution 136 may include a solution to prepare for a possible occurrence of a future threat having a threat characteristic that is similar to the threat characteristic of the threat at the threat location 106. For example, the threat solution 136 may include purchasing canned food supplies. Additionally or alternatively, the threat solution 136 may include purchasing, renting, subscribing, or hiring the solution to the threat at the threat location 106. In this manner, the threat management system 104 improves an ability of user of the third networked subscriber device 114 to focus on carrying out the solution to the threat at the threat location 106 without wasting time brainstorming potential solutions to the threat at the threat location 106.

Figure 9:
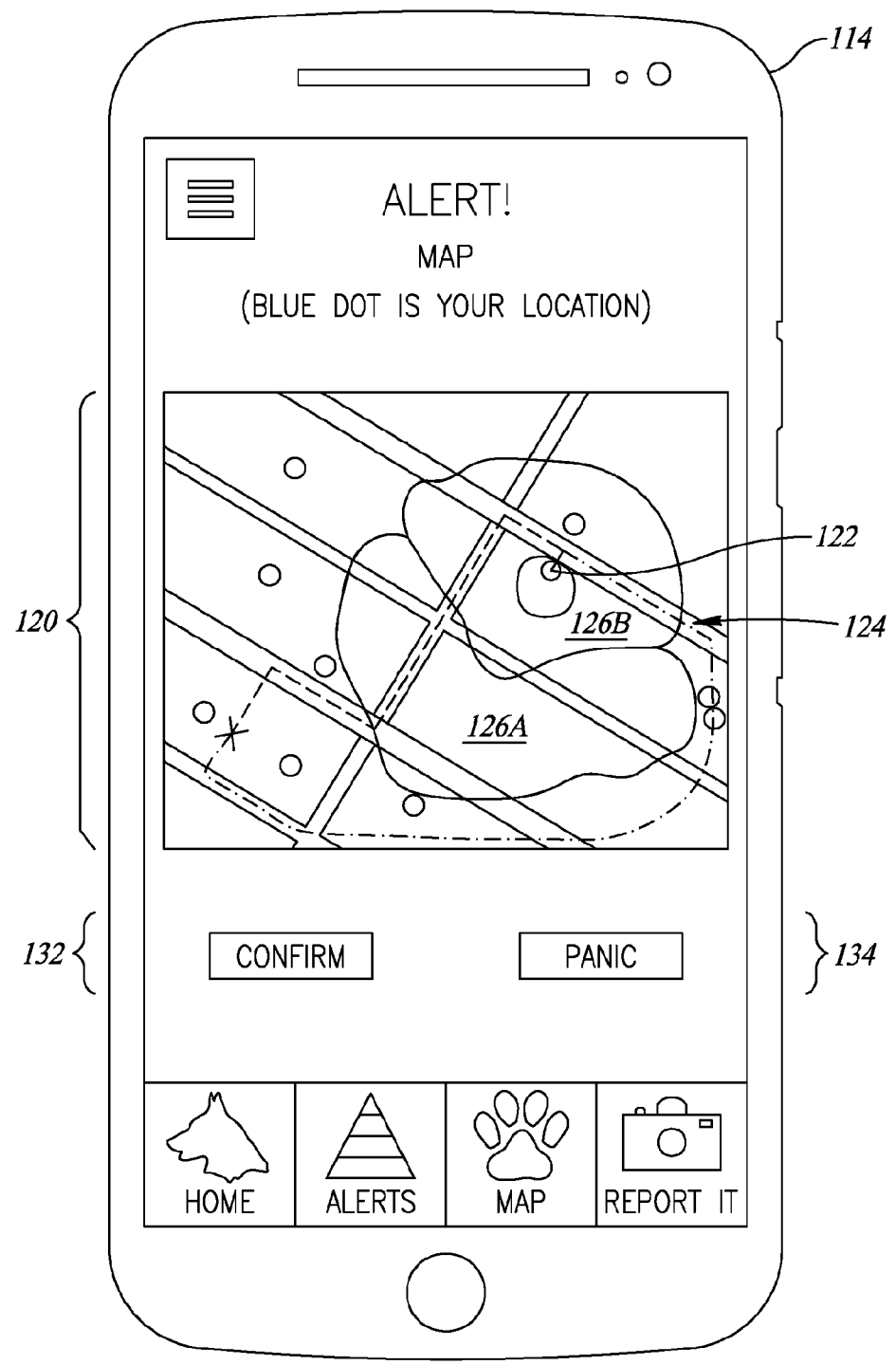
FIG. 9 shows a networked subscriber device that displays two alternate escape paths, according to one illustrated implementation.

Additionally or alternatively, the threat solution 136 may include a solution to improve a likelihood of escaping or avoiding the threat at the threat location 106. For example, the threat solution 136 may include an escape path. The escape path may include a travel path to a "rally point" as shown in FIG. 9. The rally point may include a nearby location outside the threat location 106. Additionally or alternatively, the rally point may include a nearby location inside the threat location 106. For example, the rally point may include a nearby police station. The rally point may include a previously user selected or defined rally point. For example, the user of the third networked subscriber device 114 may select or define a particular rally point via a rally point interface 138 of the third networked subscriber device 114 as shown in FIG. 2. Additionally or alternatively, the threat management system 104 may determine or identify the rally point. The rally point may vary responsive to the threat characteristic of the threat at the threat location 106. For example, the rally point may include a position nearest to the target location and outside the threat location 106. Additionally or alternatively, the escape path may vary responsive to the target location of the third networked subscriber device 114. The escape path may vary responsive to the threat characteristic of the threat at the threat location 106. For example, the escape path may vary to minimize a travel distance to the rally point that includes the nearby location outside the threat location 106 (FIG. 9—escape path having long dashes). As another example, the escape path may vary to reduce or minimize the threat characteristic in, along, adjacent, or near the escape path as compared to the threat characteristic in, along, adjacent, or near another escape path (FIG. 9—escape path having medium and short dashes). Additionally or alternatively, the escape path may vary responsive to a characteristic of the user of the third networked subscriber device 114. For example, responsive to the user of the third networked subscriber device 114 including a 25-year-old, single, male, professional athlete having no children or the user of the third networked subscriber device 114 not subscribing to sex offender threats, the escape path may vary unresponsive to any threat characteristic pertaining to such a threat. Additionally or alternatively, the escape path may vary responsive to a characteristic of the third networked subscriber device 114. For example, responsive to the third networked subscriber device 114 including a networked subscriber device installed in an all-terrain reconnaissance armored vehicle, the escape path may include rugged terrain. In this manner, the threat management system 104 permits the user of the third networked subscriber device 114 to escape or avoid the threat at the threat location 106 regardless of whether the user of the third networked subscriber device 114 has knowledge of the threat location 106 or the threat at the threat location 106.

Figure 8:
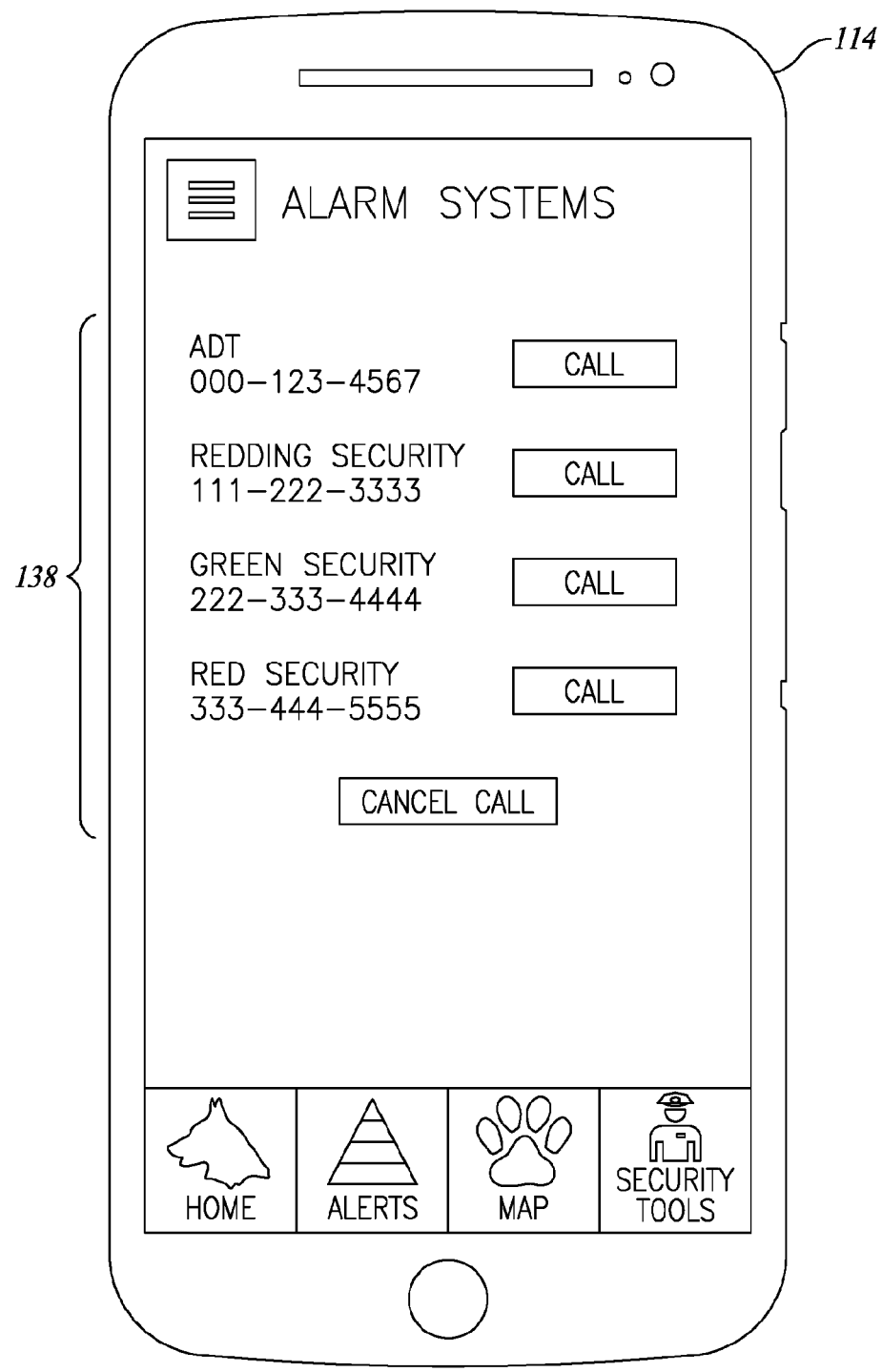
FIG. 8 shows a networked subscriber device that displays a list of threat solution providers, according to one illustrated implementation.

Additionally or alternatively, the threat management system 104 may cause the third networked subscriber device 114 to notify the user of the third networked subscriber device 114 of a threat solution provider 140 or a list of threat solution providers 140 as shown in FIG. 8. The threat solution providers 140 may provide the threat solution 136. For example, the threat solution providers 140 may sell, rent, lease or otherwise offer the threat solution 136. The threat management system 104 may determine or identify the threat solution providers 140 responsive to the threat characteristic of the threat at the threat location 106. Additionally or alternatively, the threat management system 104 may determine or identify the threat solution providers 140 responsive to a prioritization indicator. Additionally or alternatively, prioritization of the threat solution providers 140 may vary responsive to the prioritization indicator. The prioritization indicator may include a user review. Additionally or alternatively, the prioritization indicator may include a popularity rating. Additionally or alternatively, the prioritization indicator may include a result of a vetting. Additionally or alternatively, the prioritization indicator may include a relevance indicator that indicates a respective relevance of the threat solution provider 140 to the threat at the threat location 106. Additionally or alternatively, the prioritization indicator may include a result of a respective subscription by the threat solution provider 140. Additionally or alternatively, the prioritization indicator may include a respective bid by the threat solution provider 140. In this manner, the threat management system 104 permits the user of the third networked subscriber device 114 to contact reputable solution providers 140 without wasting time to search and review solution providers 140.

Figure 10:
FIG. 10 shows a threat report interface of a networked subscriber device, according to one illustrated implementation.

Additionally or alternatively, the third networked subscriber device 114 may permit the user of the third networked subscriber device 114 to report the threat at the threat location 106 in a manner similar to the manner explained above with regard to the given device external to the threat management system 104. The third networked subscriber device 114 may permit the user of the third networked subscriber device 114 to report the threat at the threat location 106 via a threat report interface 142 of the third networked subscriber device 114 as shown in FIG. 10. The threat report interface 142 may permit the user of the third networked subscriber device 114 to anonymously report the threat at the threat location 106. The threat report interface 142 may permit the user to include a photograph, video (live or recorded), or audio (live or recorded) when reporting the threat at the threat location 106.

FIG. 11 shows an alert system 300 comprising one or more threat management application servers 302 (only one illustrated) and one or more networked devices 304 external to the threat management application server 302 (only one illustrated). For example, the threat management application server 302 may be a component of the threat management system 104 of FIG. 1. Also for example, the networked device 304 external to the threat management application server 302 may be representative of the networked device 112 external to the threat management system 104 of FIG. 1. The networked device 304 is communicatively coupled to the threat management application server 302 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The alert system 300 also includes one or more networked subscriber devices 306 (only one illustrated). For example, the networked subscriber device 306 may be representative of the first networked subscriber device 102, the second networked subscriber device 110, the third networked subscriber device 114 of FIG. 1, or any of the numerous (e.g., millions) networked subscriber devices which may be used with the alert system 300. The networked subscriber devices 306 are communicatively coupled to the threat management application server(s) 302 by one or more communications channels, for example, one or more wide area networks (WANs) 310, for instance the Internet or Worldwide Web portion thereof.

In operation, the networked subscriber devices 306 typically function as a client to the threat management application server 302. In operation, the threat management application server 302 typically functions as a server to receive requests or information from the networked subscriber devices 306.

The alert system 300 may employ other computer systems and network equipment, for example, additional servers, proxy servers, firewalls, routers and/or bridges. The threat management application servers 302 will at times be referred to in the singular herein, but this is not intended to limit the implementations to a single device since in typical implementations there may be more than one threat management application server 302 involved.

The threat management application servers 302 may include one or more processing units 312a, 312b (collectively 312), a system memory 314 and a system bus 316 that couples various system components, including the system memory 314 to the processing units 312. The processing units 312 may be any logic processing unit, such as one or more central processing units (CPUs) 312a, digital signal processors (DSPs) 312b, application-specific integrated circuits (ASICs), field programmable gate arrays (FPGAs), etc. The system bus 316 can employ any known bus structures or architectures, including a memory bus with memory controller, a peripheral bus, and/or a local bus. The system memory 314 includes read-only memory ("ROM") 318 and random access memory ("RAM") 320. A basic input/output system ("BIOS") 322, which can form part of the ROM 318, contains basic routines that help transfer information between elements within the threat management application server(s) 302, such as during start-up.

The threat management application servers 302 may include a hard disk drive 324 for reading from and writing to a hard disk 326, an optical disk drive 328 for reading from and writing to removable optical disks 332, and/or a magnetic disk drive 330 for reading from and writing to magnetic disks 334. The optical disk 332 can be a CD-ROM, while the magnetic disk 334 can be a magnetic floppy disk or diskette. The hard disk drive 324, optical disk drive 328 and magnetic disk drive 330 may communicate with the processing unit 312 via the system bus 316. The hard disk drive 324, optical disk drive 328 and magnetic disk drive 330 may include interfaces or controllers (not shown) coupled between such drives and the system bus 316, as is known by those skilled in the relevant art. The drives 324, 328 and 330, and their associated computer-readable media 326, 332, 334, provide nonvolatile storage of computer-readable instructions, data structures, program modules and other data for the threat management application server 302. Although the depicted threat management application server 302 is illustrated employing a hard disk 324, optical disk 328 and magnetic disk 330, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 314, such as an operating system 336, one or more application programs 338, other programs or modules 340 and program data 342. The system memory 314 may also include communications programs, for example, a server 344 that causes the threat management application server 302 to serve electronic information or files via the Internet, intranets, extranets, telecommunications networks, or other networks as described below via a network connectivity device such as network interface 360. The server 344 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers that may be specifically programmed to operate, act, perform, function, or achieve as a special purpose computer that operates, acts, performs, functions, or achieves any result(s) explained herein with regard to, for example, any combination of the first networked subscriber device 102, the second networked subscriber device 110, the third networked subscriber device 114, the networked device 112 external to the threat management system 104, the threat management system 104, etc. may be commercially available such as those from entities such as Mozilla, Google, Microsoft and Apple Computer.

While shown in FIG. 11 as being stored in the system memory 314, the operating system 336, application programs 338, other programs/modules 340, program data 342 and server 344 can be stored on the hard disk 326 of the hard disk drive 324, the optical disk 332 of the optical disk drive 328 and/or the magnetic disk 334 of the magnetic disk drive 330.

An operator can enter commands and information into the threat management application server(s) 302 through input devices such as a touch screen or keyboard 346 and/or a pointing device such as a mouse 348, and/or via a graphical user interface. Other input devices can include a microphone, joystick, game pad, tablet, scanner, etc. These and other input devices are connected to one or more of the processing units 312 through an interface 350 such as a serial port interface that couples to the system bus 316, although other interfaces such as a parallel port, a game port or a wireless interface or a universal serial bus ("USB") can be used. A monitor 352 or other display device is coupled to the system bus 316 via a video interface 354, such as a video adapter. The threat management application server(s) 302 can include other output devices, such as speakers, printers, etc.

The threat management application servers 302 can operate in the alert system 300 using logical connections to one or more remote computers and/or devices. For example, the threat management application servers 302 can operate in the alert system 300 using logical connections to one or more networked subscriber devices 306. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the threat management application servers 302, the networked subscriber devices 306.

The networked subscriber devices 306 will typically take the form of specifically programmed end user processor-based devices, for instance, personal computers (e.g., desktop or laptop computers), net book computers, tablet computers, smart phones, personal digital assistants, vehicle head units, wearable computers, workstation computers and/or mainframe computers, and the like, executing appropriate instructions that specifically program the networked subscriber devices 306 to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. These networked subscriber devices 306 may be communicatively coupled to one or more server computers. For instance, networked subscriber devices 306 may be communicatively coupled externally via one or more end user client entity server computers (not shown), which may implement a firewall. The threat management application servers 302 may execute a set of server instructions that specifically program the threat management application servers 302 to operate, act, perform, achieve, or function as a special purpose computer that is specifically programmed to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. The threat management application servers 302 may execute a set of server instructions to function as a special purpose server for a number of networked subscriber devices 306 (e.g., clients) communicatively coupled via a LAN at a facility or site that act as intermediaries between the networked subscriber devices 306 and the threat management application server(s) 302. The networked subscriber devices 306 may execute a set of client instructions that specifically program the networked subscriber devices 306 to operate, act, perform, function, or achieve as a special purpose client of the threat management application servers(s) 302, which are communicatively coupled via a WAN.

The networked subscriber devices 306 may include one or more processing units 368, system memories 369 and a system bus (not shown) that couples various system components including the system memory 369 to the processing unit 368. The networked subscriber devices 306 will at times each be referred to in the singular herein, but this is not intended to limit the implementations to a single networked subscriber device 306. In typical implementations, there may be more than one networked subscriber device 306 and there will likely be a large number of networked subscriber devices 306.

The processing unit 368 may be any specifically programmed logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems that may be specifically programmed to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, a Snapdragon processor from Qualcomm, an Exynos processor from Samsung, or an Ax processor from Apple.

The system bus can employ any known bus structures or architectures, including a memory bus with memory controller, a peripheral bus, and a local bus. The system memory 369 includes read-only memory ("ROM") 370 and random access memory ("RAM") 372. A basic input/output system ("BIOS") 371, which can form part of the ROM 370, contains basic routines that help transfer information between elements within the networked subscriber devices 306, such as during start-up.

The networked subscriber devices 306 may also include one or more media drives 373, e.g., a hard disk drive, magnetic disk drive, WORM drive, and/or optical disk drive, for reading from and writing to computer-readable storage media 374, e.g., hard disk, optical disks, and/or magnetic disks. The nontransitory computer-readable storage media 374 may, for example, take the form of removable media. For example, hard disks may take the form of a Winchester drive, and optical disks can take the form of CD-ROMs, while magnetic disks can take the form of magnetic floppy disks or diskettes. The media drive(s) 373 communicate with the processing unit 368 via one or more system buses. The media drives 373 may include interfaces or controllers (not shown) coupled between such drives and the system bus, as is known by those skilled in the relevant art. The media drives 373, and their associated nontransitory computer-readable storage media 374, provide nonvolatile storage of computer readable instructions, data structures, program modules and other data for the networked subscriber devices 306. Although described as employing computer-readable storage media 374 such as hard disks, optical disks and magnetic disks, those skilled in the relevant art will appreciate that networked subscriber devices 306 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 374.

Program modules, such as an operating system, one or more application programs, other programs or modules and program data, can be stored in the system memory 369. Program modules may include specific instructions that specifically program the networked subscriber device 302 to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. including accessing a Website, extranet site or other site or services (e.g., Web services) and associated WebPages, other pages, screens or services hosted by the threat management application server 302.

In particular, the system memory 369 may include communications programs that permit the networked subscriber devices 306 to exchange electronic or digital information or files or data or metadata with the threat management application server 302. The communications programs may, for example, be a Web client or browser that permits the networked subscriber devices 306 to access and exchange information, files, data and/or metadata with sources such as Web sites of the Internet, corporate intranets, extranets, or other networks. Such may require that the networked subscriber devices 306 have sufficient right, permission, privilege or authority for accessing a given Website, for example, one hosted by the service provider sever computer system(s) 302. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 369, the operating system, application programs, other programs/modules, program data and/or browser can be stored on the computer-readable storage media 374 of the media drive(s) 373. An operator can enter commands and information into the networked subscriber devices 306 via a user interface 375 through input devices such as a touch screen or keyboard 376 and/or a pointing device 377 such as a mouse. Other input devices can include a microphone, joystick, game pad, tablet, imager, scanner, etc. These and other input devices are connected to the processing unit 368 through an interface such as a serial port interface that couples to the system bus, although other interfaces such as a parallel port, a game port or a wireless interface or a universal serial bus ("USB") can be used. A display or monitor 378 may be coupled to the system bus via a video interface, such as a video adapter. The networked subscriber devices 306 can include other output devices, such as speakers, printers, etc.

Figure 12A:
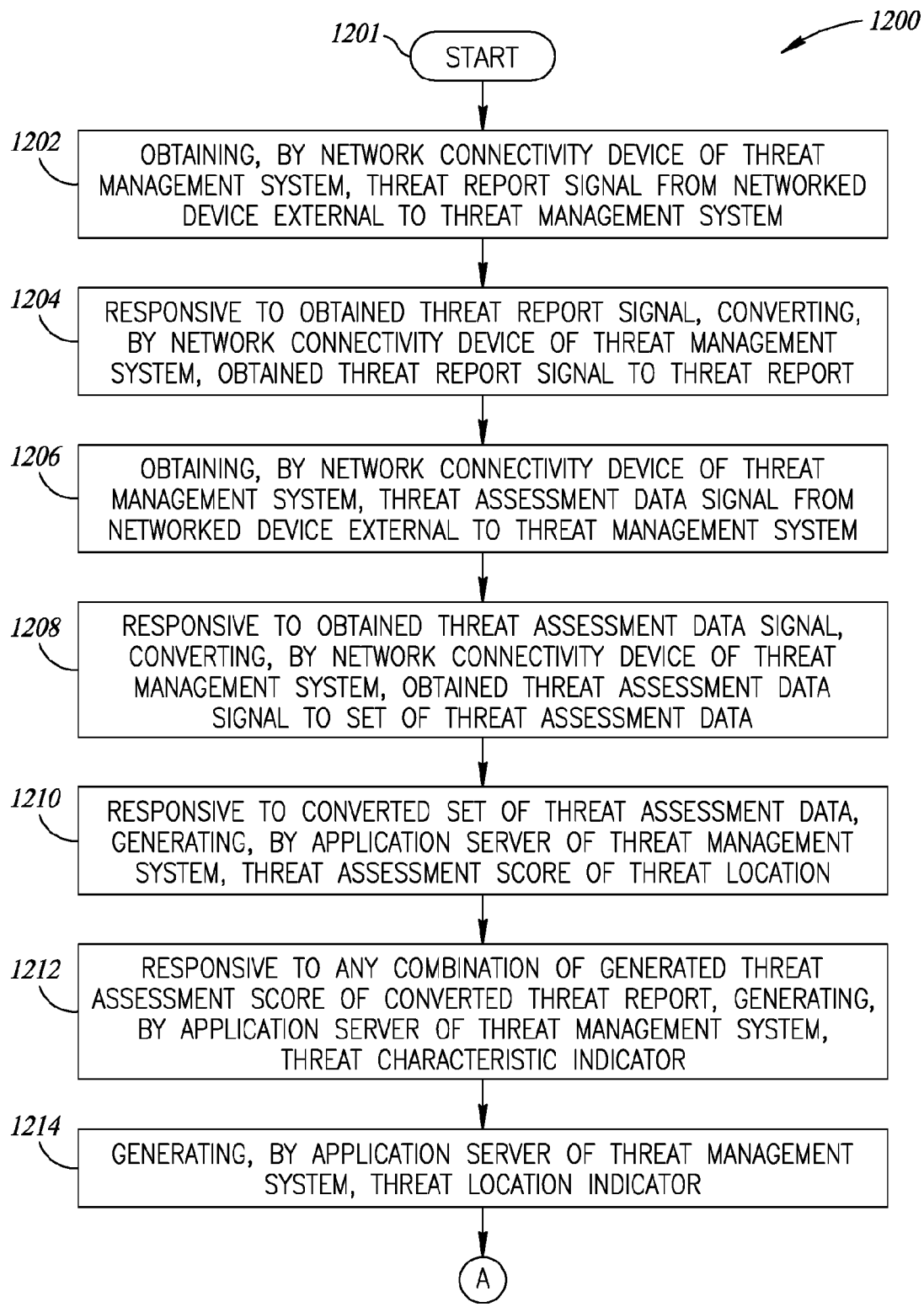
FIGS. 12A-12C are a flow diagram showing a method of operation for a threat management system, according to one illustrated implementation.
Figure 12B:
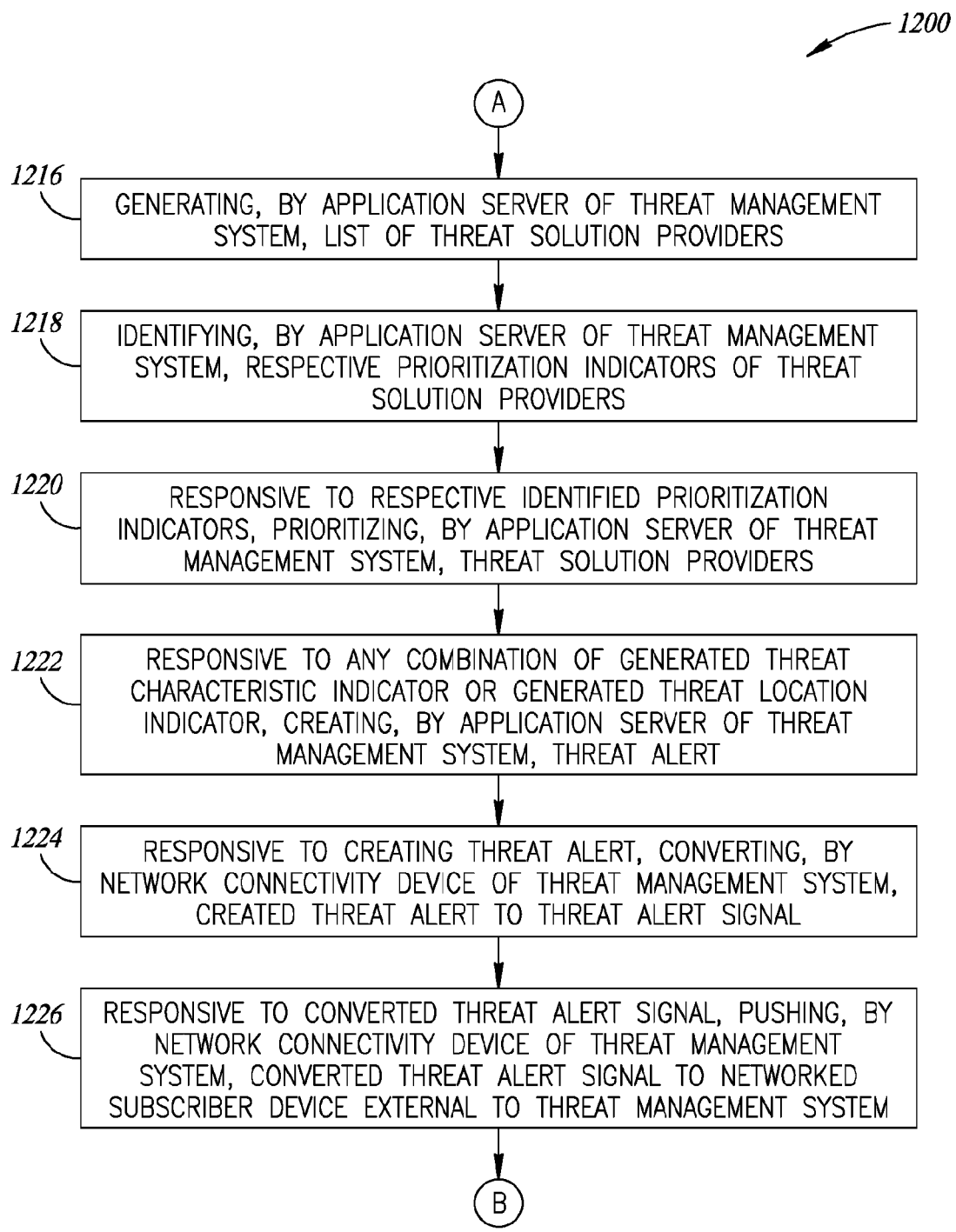
Figure 12C:
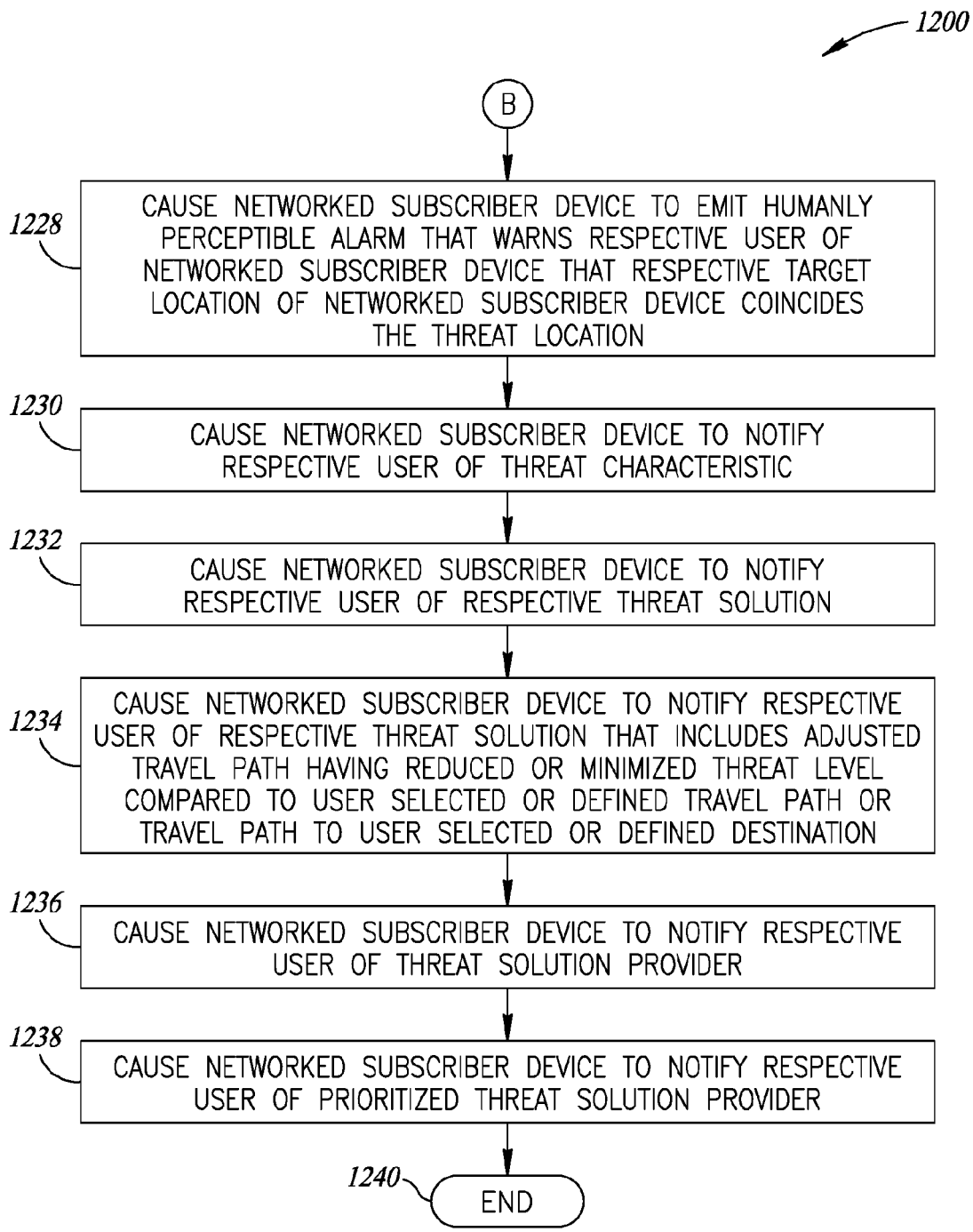

As shown in FIG. 12, the alert system 300 may implement a method 1200 of operation for the threat management system 104 having the networked connectivity device 360 and the threat management application server 302. While the following disclosure explains the method 1200 in a particular order and as having particular operations, acts, performances, functions, achievements, or elements, the alert system 300 may implement the method 1200 in any order. Additionally or alternatively, the alert system 300 may implement the method 1200 with more or fewer operations, acts, performances, functions, achievements, or elements and with one or more of operations, acts, performances, functions, achievements, elements, etc. Additionally or alternatively, the alert system 300 may implement the method 1200 of operation for one or more of the first networked subscriber device 102, second networked subscriber device 110, third networked subscriber device 114, networked device 112 external to the threat management system 104, threat management system 104, networked subscriber device 306, networked device 304 external to the threat management application server 302, etc.

The method 1200 may start at 1201. At 1202, the network connectivity device 360 of the threat management system 104 obtains a threat report signal from the given networked device external to the threat management system 104. At 1204, responsive to the obtainment of the threat report signal, the network connectivity device 360 of the threat management system 104 may convert the obtained threat report signal to a threat report. At 1206, the network connectivity device 360 of the threat management system 104 may obtain a threat assessment data signal from the given networked device external to the threat management system 104. At 1208, responsive to the obtainment of the threat assessment data signal, the network connectivity device 360 of the threat management system 104 may convert the obtained threat assessment data signal to a set of threat assessment data. For example, the set of threat assessment data may include one or more of the following: statistical data for the threat location 106, statistical data for a location outside the threat location 106, historical data for the threat location 106, historical data for a location outside the threat location 106, etc. At 1210, responsive to the set of threat assessment data, the application server 302 of the threat management system 104 may generate a threat assessment score of the threat location 106. For example, the threat management system 104 may include one or more of a neural network, other learning machine that learns from the set of threat assessment data, etc. As another example, the threat management system 104 may compare historical or statistical data of the threat location 106 to historical or statistical data of a location outside the threat location 106.

At 1212, responsive to the threat assessment score or the threat report, the application server 302 of the threat management system 104 may generate a threat characteristic indicator. At 1214, responsive to the threat assessment score or the threat report, the application server 302 of the threat management system 104 may generate a threat location indicator.

At 1216, the application server 302 of the threat management system 104 may generate a list of threat solution providers. At 1218, the application server 302 of the threat management system 104 may identify respective prioritization indicators of the threat solution providers. At 2120, responsive to the respective identified prioritization indicators, the application server 302 of the threat management system 104 may prioritize the threat solution providers.

At 1222, responsive to the generating of one or more of the threat characteristic indicator or the threat location indicator, the application server 302 of the threat management system 104 may create a threat alert. At 1224, responsive to the creation of the threat alert, the network connectivity device 360 of the threat management system 104 may convert the threat alert to a threat alert signal. At 1226, responsive to the threat alert signal, the network connectivity device 360 of the threat management system 104 may push the threat alert signal to a networked subscriber device 306 external to the threat management system 104.

At 1228, the method 1200 may include causing the networked subscriber device 306 to emit a humanly perceptible alarm that warns a respective user of the networked subscriber device 306 that a respective target location of the networked subscriber device 302 coincides with the threat location 106. At 1230, the method 1200 may include may include causing the networked subscriber device 306 to notify the respective user of a threat characteristic of a reported or assessed threat at the threat location 106.

At 1232, the method 1200 may include causing the networked subscriber device 306 to notify the respective user of a respective threat solution to the threat at the threat location 106. At 1234, the method 1200 may include causing the networked subscriber device 306 to notify the respective user of a respective threat solution that includes an adjusted travel path having a reduced or minimized threat level as compared to a user selected or defined travel path or a travel path to a user selected or defined destination.

At 1236, the method 1200 may include causing the networked subscriber device 306 to notify the respective user of a threat solution provider. At 1238, the method 1200 may include causing the networked subscriber device 306 to notify the respective user of a prioritized threat solution provider.

The method 1200 may end at 1240.

The following discussion describes the high level features provided in the backend web application to support the objective of the alert system mobile application, which is a consumer threat & risk notification mobile application, as discussed above. This will include managing different admins and their jurisdictions, users, alerts, contents and security tools. The features discussed below include, application login, dashboard, social media monitoring, alert management, alerts—data collection configuration, mobile app user management, jurisdiction, web application user management, sales management, content management, and incident management.

In at least some implementations, the user logs in using a registered email address. A super admin or admin creates another user by specifying his email address. An auto-generated email may be sent to this email address which has a link by which the user can create his user account. The web application may provide the email address which will be used for the super admin login at the time of the application development, for example. The user can also change the password, once the user logs into the application.

Figure 14:
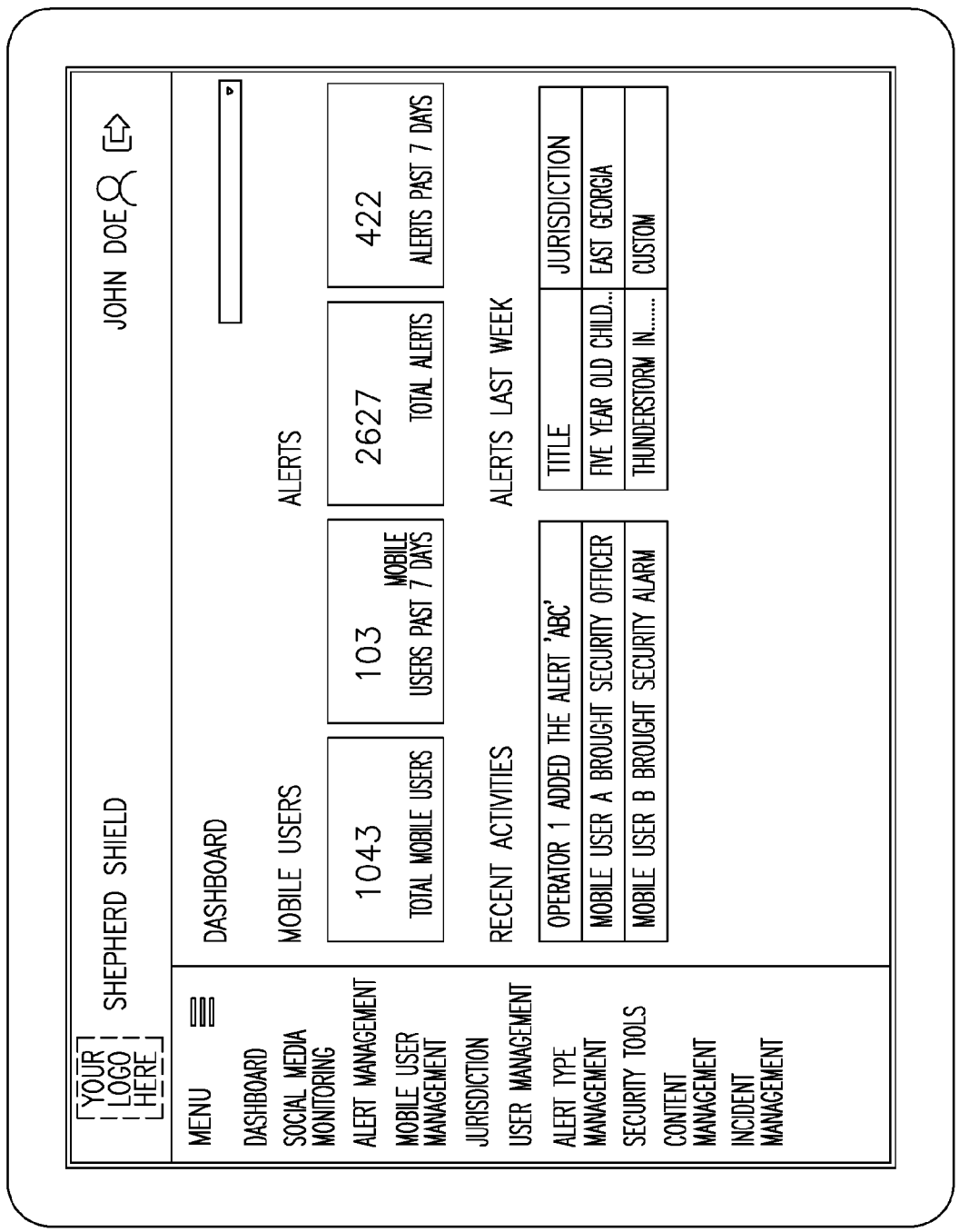
FIG. 14 is a user interface for a dashboard page of a web application of an alert system, according to one illustrated implementation.

As shown in FIG. 14, a dashboard may also be provided, which may be the landing page when the user logs in. The dashboard shows an overview of the information relevant to every user. This information may include the latest updates, notifications, or graphical representation of the information of the data history, for example.

In at least some implementations, the web application may provide social media monitoring. For example, the user can monitor Twitter®, Facebook®, other social media applications, and/or news feeds from the application. The user can also add a Twitter® handle along with hash tags for monitoring Twitter® accounts. For Facebook®, the user can add the user name along with filters to filter out the posts. The user can also provide the news feed link.

The web application also provides web application user management, which provides different user roles and access privileges provided to different users of the application. A super admin user may have all the privileges and create any users with any other roles. The application may have only one super admin who will be the owner of the application, for example. The web application may also have admin users. Based on territory or jurisdiction, the web application may have multiple admin users. The admin user(s) may be created also based on organizational structure. The admin user may have the privilege to create their own jurisdiction, manage the alerts and its types, users such as content editors, mobile users and operators. The web application may also have content editors, which are users that are responsible for editing the contents in the data, location, etc. The web application may also have operators, which may be responsible for creating and managing the alerts and providing the SOS support.

The web application may also provide alert management. The alert management section of the web application allows the user to manage the different alert types and alerts which are tagged under the respective alert types. The user may also be able to assign an icon for every alert type. Non-limiting examples of some of the alert types include: sex offenders nearby, active crimes, Amber alerts, security alerts, and weather alerts (e.g., earthquakes).

In at least some implementations, users can create different alerts with details such as alert title and alert message, can upload an image, the validity of the alert (e.g., expiry date), and can set a priority for the alert. While creating an alert, the jurisdiction can be selected and these alerts will be received by mobile users who are currently in the selected jurisdiction or have saved any of places in that jurisdiction as their location(s).

The web application may also include an alerts—Data Collection Configuration section, which provides various methods for creating alerts, including generating manual content, uploading formatted data, using APIs, or using live feeds.

In at least some implementations, the user can directly create an alert and configure when the alert need to be triggered. The created alert can be an active alert or a static alert. After choosing the alert type, the title of the alert along with the detailed message is to be provided. The user can upload any pictures and set the validity along with the priority of the alert. The jurisdiction of the alert may also be provided so that all the mobile users with that jurisdiction may receive this alert message. In at least some implementations, a user can only set a jurisdiction to an alert to which the user belongs.

In at least some implementations, the user can upload an spreadsheet file or comma separated values (CSV) file with the list of alerts. This could be a list of sex offenders or a file that contain the daily alert updates, for example. The user could either download the spreadsheet template from the web application and fill in the sheet with the data or use the sheet with any data format. In the latter format, the user may be required to manually map the fields.

The steps to upload a spreadsheet or CSF file may be as follow. Initially, the user may upload a spreadsheet file or a CSV file to the web application and the data may be uploaded to the alert system. Once configured, the uploading file (e.g., spreadsheet) may be reused. Once uploaded, the fields in the document may be mapped with the fields in the web application. Once this mapping is done, the values in the document may be displayed based on the mapping and user may manually edit any values as needed. The values may be converted to an alert format which can be reviewed and published as alert.

In at least some implementations, the alerts can be integrated with different APIs available. There may be a first time configuration that has to be done for integrating the APIs. A list of all APIs that need to be integrated may be identified and the web application may handle the data provided by the alert. The steps to be followed to configure an API are as follows. Initially, an HTTP restful method and the API web link is to be provided along with the API parameters and header details to get the API schema. The fields retrieved from the schema may be mapped to the fields in the web application and previewed to check for compatibility. The time interval to trigger the API may also be set to retrieve as desired.

In at least some implementations, the live feeds from different sources may be integrated with the web application. There may be a manual interaction in identifying and converting the live feed to an alert, for example. In at least some implementations, there may be a first time configuration that for integrating the Live Feeds. Example steps to be followed to configure a Live Feed are as follows. The Live Feed web link is provided along with API parameters and header details to get the API schema. The fields retrieved from the schema are mapped to the fields in the web application and previewed to check for compatibility.

The web application may also provide mobile app user Management. A mobile user may be a guest user, a registered user, or a premium user. Guest users are those users who want to interact with the mobile application without any registration. This type of user may not need any user credentials to access the application and may have limited access to the application. Registered users are those users who have registered with the alert system through the mobile application. These users can login from any device and the users can access their profile data. Premium users are registered users who have subscribed as a "Pro" user by paying a small fee. These users may receive more information regarding alerts and may receive SOS support.

The technical details of the mobile device used by the user may be stored in the web application such as the OS, OS version, app version, etc. The profile details of the registered and premium users may also be stored in the application along with saved location, alert preference and alert reception logs.

The web application may also provide a jurisdiction section. Jurisdiction is a concept used in the application that helps to manage the delivery of alerts to a particular region (e.g., neighborhood, city, state, region of a country, country). The super admin user or the admin may be able to add jurisdictions in the limit defined to them. The admin user may have one or more jurisdictions if required where they will be able to manage the alerts. An alert can be triggered to a combination of jurisdictions or subset of a jurisdiction.

The web application also provides security tools management. In at least some implementations, the admin user will be able to configure the list of items that will be displayed in the mobile application. The admin user can also add the companies who sell this item along with its location. These companies may be plotted in a map viewable in the mobile application according to the proximity. Also, the admin user may mark a vendor as premium so that the vendor may always be displayed as the first item in a company listing.

The web application also provides content management, which allows users to manage the contents which can be done in the web backend and, the mobile users may be able to view this information on their mobile devices. Content management may have content categories to which the different contents will be tagged. This may include important information for the mobile users, such as details regarding hospitals, police and fire departments, etc., which the mobile user can search by location.

The web application also provides incident management, which provides methods by which the incidents originated from the mobile application can be handled by the control center. Any mobile user may send information to the server. The information sent could be a reported incident or a call for help incident. Also, this feature can be restricted to registered users in order to reduce the number of false incidents. In at least some implementations, this module can be made to handle and provide early warning alerts specifying the users that this message is not yet verified. Early warning messages could be based on incidents reported from mobile devices which are not yet verified.

The discussion below describes the high level features of creating a consumer threat and risk notification mobile application with an incident reporting tool for the user to send and receive information relating to known or perceived threats in the geographic area around their location. Particular features discussed below include application access, my alerts, map, alert preference, my locations, security tools, create report or "report it," emergency numbers/call 911, SOS, and register and premium users.

The mobile application may be available for download by an application provider, such as Google Play Store, Apple store, etc. Users can access the mobile application as a guest user without registration. As discussed above, guest users may have limited access to the features of the application.

Users can create an account by filling in a registration form via their mobile device. User can login from any device and they can access their profile data. Premium users are those registered users who have paid a fee. These users may get more information regarding the alerts and may get SOS support.

All of the live alerts received by the users based on their alert preference and location may be displayed promptly and the alerts which are expired will be displayed in an alert history. Alerts may be received on the users' mobile devices as push notifications. Each alert may have a detail page where additional information of the particular alert may be displayed. The additional alert information may include alert type, alert title, alert description, issued date and time, expiry date and time, option to mute the alert, option the share the alert, etc. Additionally, the alert location may be displayed in a map viewable by the user. In at least some implementations, an image associated with the alert may also be displayed.

The user may be able to mute the alert for a period of time (e.g., 1 week, 30 days, always). The user may also share the alert through various channels, including email, social media, text message, etc. In at least some implementations, the mobile application provides an option for viewing information regarding police departments, hospitals and fire departments, in case the user needs to view or contact the nearest department for help.

Since alerts may be triggered from the server to those devices in one or more specific locations, the current location of the user may be pinged from the device when the user's location is changed by certain distance.

The map section of the mobile application displays a geographical map of the region in which the user accesses the application. In at least some implementations, a map provided by Google may be used to display the map. Alerts in the region viewed by the user may be plotted in the map. Also, upon zooming out, the alerts may be combined and displayed using a Marker Clustering technique. This feature may help the user to evaluate the relative security of a particular locality. In at least some implementations, the user may also have an option to view hospitals, fire departments, police department and other categories that are uploaded from the web application.

The alert preference section of the mobile application allows the user to choose the alert types that the user receives from the application. Different alert types may include, for example, sex offenders nearby, active crimes, Amber alerts, security alerts, and weather alerts (e.g., earthquakes).

In at least some implementations, the user can also select the priority of the alert. The priority may be listed as High, Medium, Low, Safe, for example. A user who selects a particular issue will only receive those alert types and priority alerts.

The my location section of the mobile application allows the user to provide the application with a number (e.g., three, five, ten) desired locations, so that the user can receive alerts for those locations. Apart from the locations saved for the particular user, alerts may also be sent based on the current location of the user, assuming the application is able to retrieve the location of the mobile device. The user can also choose the preferred alert type for each location saved under their account, so that the user may only receive those types of alerts for that particular location.

The security tools section of the mobile application provides an option for the user to buy security tools from the application. There may be an option to obtain information about Security Officers, Alarm Systems, Camera systems, Firearms, etc. There may also be a detail screen, where the locations of companies that sell the item or service may be displayed based on the user's location proximity. If there are any sponsored companies, then they may be listed initially in the list of companies.

Users can use the create report or "report it" feature to report an incident. Here, the user can upload a picture by capturing it from the camera of their mobile device and can also add comments related to the incident. Other details such as the date and time, priority of the incident, and alert type may also be provided by the user. The location of the user will also be sent by the mobile device from the map. The user may be able to enter the address of the incident which will be plotted on the map and displayed. An operator of the alert system can view this information and take appropriate actions.

In at least some implementations, the mobile application may allow the user to easily dial one or more emergency contacts (e.g., 3 contacts, 5 contacts) or to contact emergency response personnel (e.g., make a "911 call").

In at least some implementations, the mobile application may also include a user selectable button or icon which causes the mobile device to rapidly contact the control center of the alert system. For example, the button or icon may cause the mobile device to automatically place a call to the control center, or may cause the mobile device to send a text-based message (e.g., email, text message) to the control center.

A user can register with the alert system by completing a form and by validating an email address. A registered user may get additional features as compared to the guest user, such as adding emergency contacts and using the application in different devices. A registered user may also have the provision to pay a small subscription amount and become a premium user. The payment of the premium service may be made as "in-app purchases" through one or more application stores.

The following discussion provides technical information for a web application and mobile application for an example implementation of an alert system of the present disclosure. It should be appreciated that the information provided as a non-limiting example for explanatory purposes. In at least some implementations, Node.js programming language may be used for backend programming and AngularJS programming language may be used for frontend programming. The framework may be implemented using LoopBack framework, the database system may be implemented using MongoDB, and the geospatial indexes and queries may be implemented using 2dsphere Indexes. Various browsers may be supported (e.g., Firefox Version (41.0.2 to 49.0.2), Chrome Version (47.0.2526.73 to 54.0.2840.99), Safari Version (9.0 to 10.0), IE Version 11.0).

Node.js® may be used for backend or server side programming. Node.js uses an event-driven, non-blocking I/O model that makes it lightweight and efficient. Node.js package ecosystem, npm, is the largest ecosystem of open source libraries in the world. Node.js® is a JavaScript runtime language built on Chrome's V8 JavaScript engine. Node.js may be an advantageous choice for event (call-back) based and real-time systems. The excellent performance and scalability characteristics of Node.js allow faster development times.

AngularJS may used for frontend programming. AngularJS enables extension of HTML, making it extraordinarily expressive, readable, and quick to develop. AngularJS is a toolset for building the framework and it is fully extensible and works well with other libraries. Every feature can be modified or replaced to suit the unique development workflow and feature needs. Angular is becoming the de facto JavaScript framework for front-end development. It allows for DOM manipulations without writing spaghetti code. Data bindings is another excellent feature, alongside declarative nature, modularity, etc., driving Angular adaption.

LoopBack framework is a highly-extensible, open-source Node.js framework. LoopBack allows fast turnaround times for rapid development and deployment. LoopBack has the ability to generate end-to-end REST APIs, saving a huge chunk of development cost.

MongoDB is a free and open-source cross-platform document-oriented database program. Classified as a NoSQL database program, MongoDB uses JSON-like documents with schemas. MongoDB is developed by MongoDB Inc., and is free and open-source, published under a combination of the GNU Affero General Public License and the Apache License. MongoDB offers excellent performance and scalability for systems that do not require relational databases' ACID properties or transactions. It also has built-in support for storing and processing geo-spatial objects.

2dsphere index is a technology for geospatial indexes and queries and supports all MongoDB geospatial queries: queries for inclusion, intersection and proximity. 2dsphere index helps to calculate geometry over an Earth-like sphere. Location data can be stored as GeoJSON objects with this coordinate-axis order: longitude, latitude.

The mobile application may be implemented as a native application for various operating systems, such as Android and/or iOS. In at least some implementations, Java is used as the programming language for the Android version of the application and SWIFT 3.0 is used as the programming language for the iOS version of the application. RESTful JSON may be used for the API/Web Services, for example. The database may be SQLite, for example.

Generally, a native application (or "native app") is an application program that has been developed for use on a particular platform or device. Because native apps are written for a specific platform, they can interact with and take advantage of operating system features and other software that is typically installed on that platform. In at least some implementations, the mobile applications may be developed as native applications instead of a cross platform application. This provides better performance of the mobile app and increases the probability that users are able to receive the alert messages as push notifications.

Swift is a general-purpose, multi-paradigm, compiled programming language developed by Apple Inc. for iOS, macOS, watchOS, tvOS, and Linux. Swift is intended to be more resilient to erroneous code ("safer") than Objective-C, and more concise.

RESTful web services are one way of providing interoperability between computer systems on the Internet. REST-compliant web services allow requesting systems to access and manipulate textual representations of web resources using a uniform and predefined set of stateless operations.

SQLite is a relational database management system contained in a C programming library which is embedded into the end program. SQLite is ACID-compliant and implements most of the SQL standard, using a dynamically and weakly typed SQL syntax that does not guarantee the domain integrity.

As discussed above, the alert system may need to account for the current location of a user of the system. This is to send the alerts that are applicable to that particular location. To accomplish such, the mobile app may periodically (e.g., constantly) ping the web server with the current geo coordinates of the user. Hence, a background service may be enabled in the mobile device that may send the current geo location of the user when the user has moved a certain distance (e.g., at least 500 meters). The alert may be sent to the user's device as push notification, as discussed above. But since the push notification is seen as "Sent and Forget", in at least some implementations a workflow is provided by which the system ensures the receipt of alert messages in the user's device. Also, silent pushes may not be preferred due to the low assurance of notification reaching the mobile device. For sending images as part of alerts to mobile device in large number, Content Delivery Network (CDN) technology may be utilized.

Figure 13:
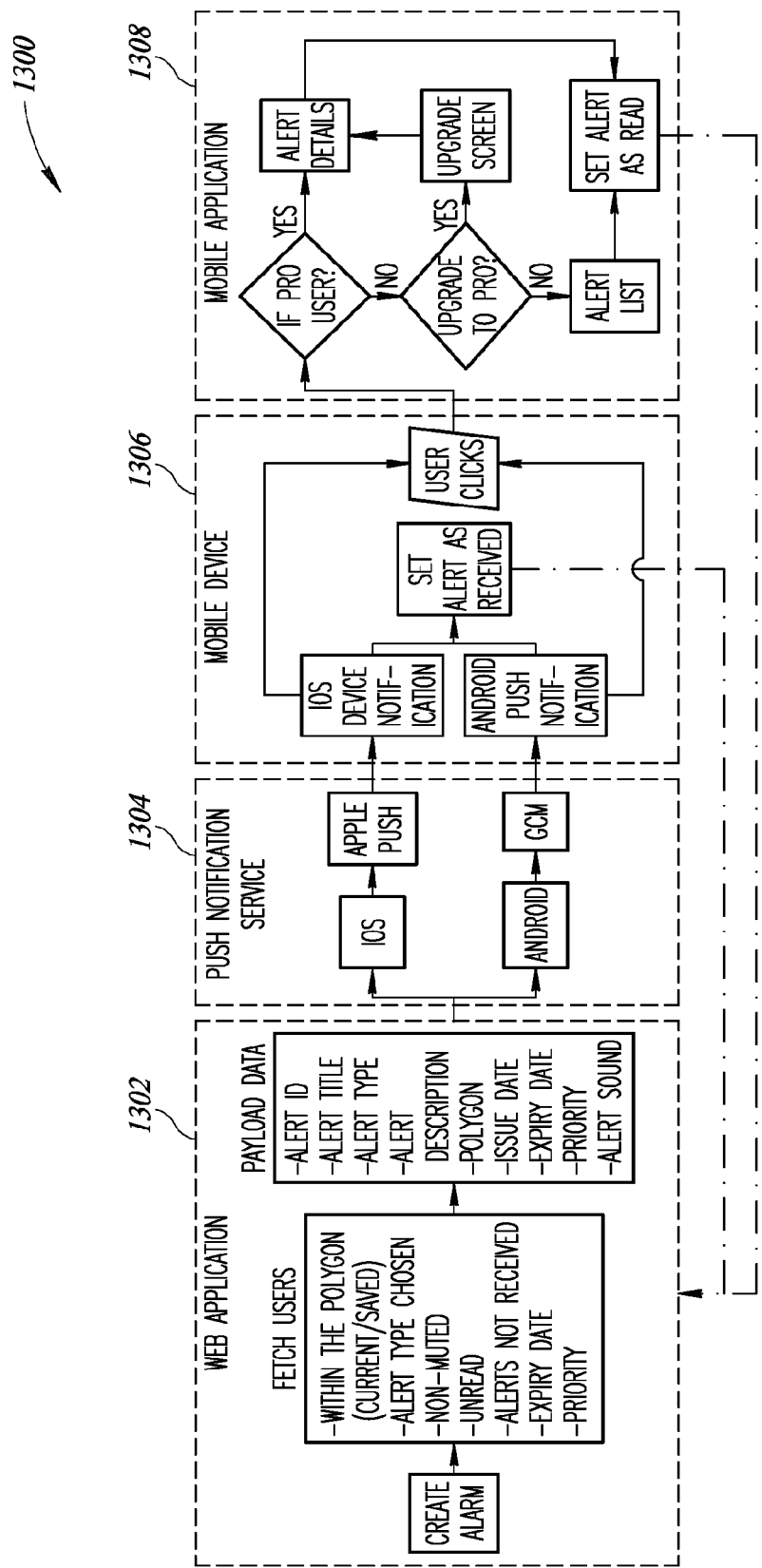
FIG. 13 is a flow diagram of a workflow for generating and pushing an alert, according to one illustrated implementation.

FIG. 13 shows a flow diagram 1300 of a workflow for sending an alert to a user. A web application 1302 may create one or more alerts. These alerts may be sent to the users who may be fetched on the basis of few parameters. Later, the information to be send to the mobile device may be pulled which may be sent using the APIs. A Push Notification module 1304 may be provided, which uses the APIs information regarding the alerts to send alerts from the web application to a mobile device 1306 as a push notification to the iOS device or Android device utilizing one of Apple Push or GCM, respectively. The mobile device 1306 may receive a push notification of the alerts for which the user thereof has opted to receive. The status of an alert having been received on the mobile device 1306 or not may be captured in the web server 1302.

Once the user has received the alert message, a mobile application 1308 executing on the mobile device 1306 may check if the user is registered user or Pro user. If the user is a Pro user, a detailed alert may be provided. If the user is not a registered user, the application may prompt the user to upgrade the user's account to become a Pro user and then display a detailed alert. In at least some implementations, if the user does not decide to become a Pro user, the mobile application may display less detail about the alert than is available to Pro users.

FIGS. 14-25 show various user interfaces for a backend web application of an alert system, according to one illustrated implementation.

In particular, FIG. 14 is a user interface for a dashboard page 1400 of a web application of an alert system, according to one illustrated implementation. The dashboard displays the Key Process Indicator that is relevant to the user. For an admin user the relevant KPIs that may be displayed include: total mobile users using the application (both android and iOS); mobile users for the past 7, 14 or 30 days (the option to select this duration may also be provided); total Alerts sent from the application; and alerts sent from the application for the past 7, 14 or 30 days (the option to select this duration may also be provided).

The recent activities that have occurred in the web application may also be displayed in the dashboard page 1400. Further, a list of latest alerts (e.g., within the last week) that were triggered from the web application may be displayed on the dashboard page 1400.

Figure 15:
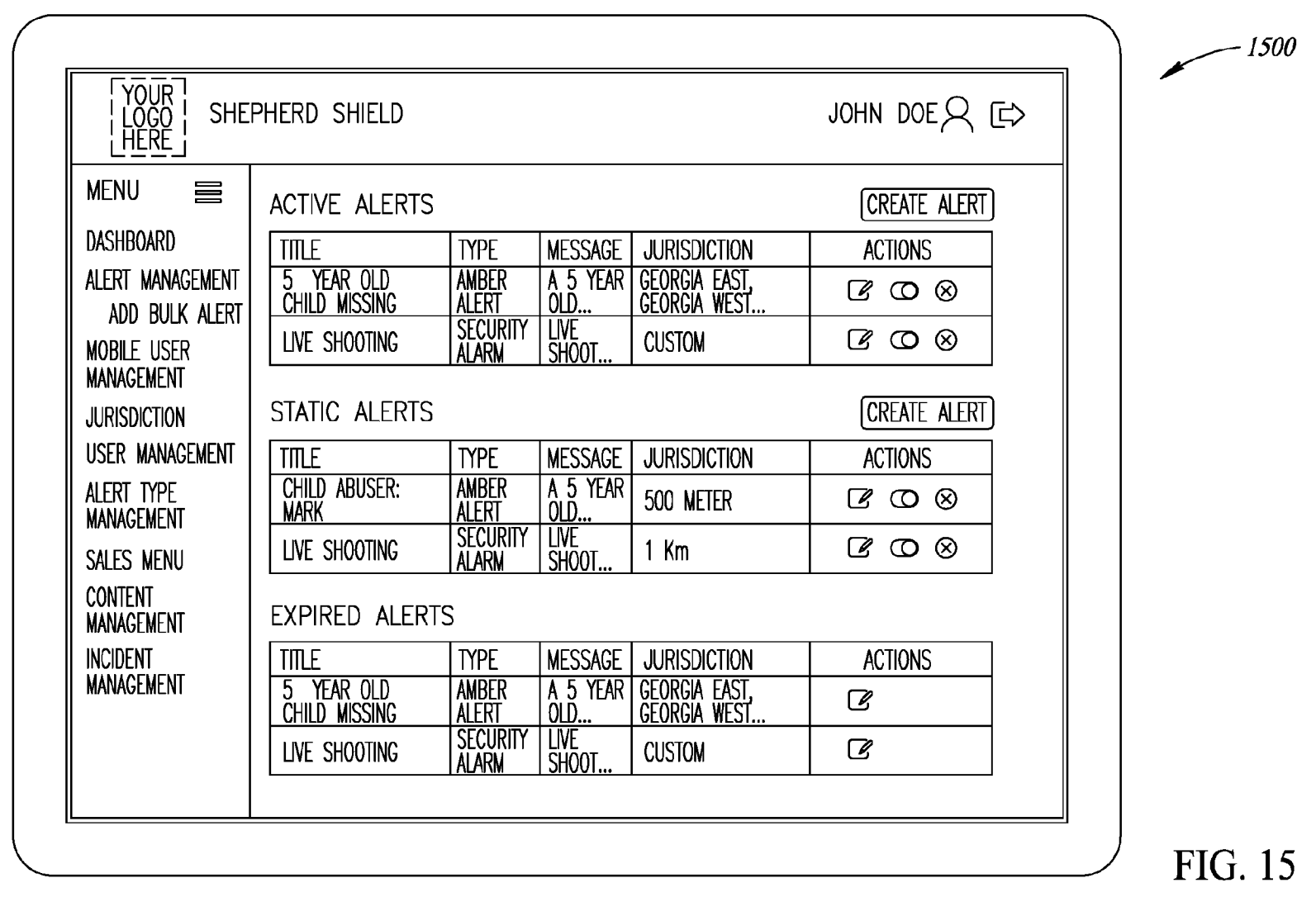

FIG. 15 is a user interface for an alerts management listing page 1500 of a web application of an alert system, according to one illustrated implementation. All of the alerts may be listed in the page 1500. The active alerts may be those with an expiry period and may be expired at some point in the future. Examples of active alerts are those such as a live shooting, an Amber alert, etc. Static alerts are those alerts that may be present in a location for a considerable period of the time. For example, the residence location of a sex abuser, child molester, etc. Some or all of the alerts that are expired may also be shown in the last list on the page 1600.

Figure 16:
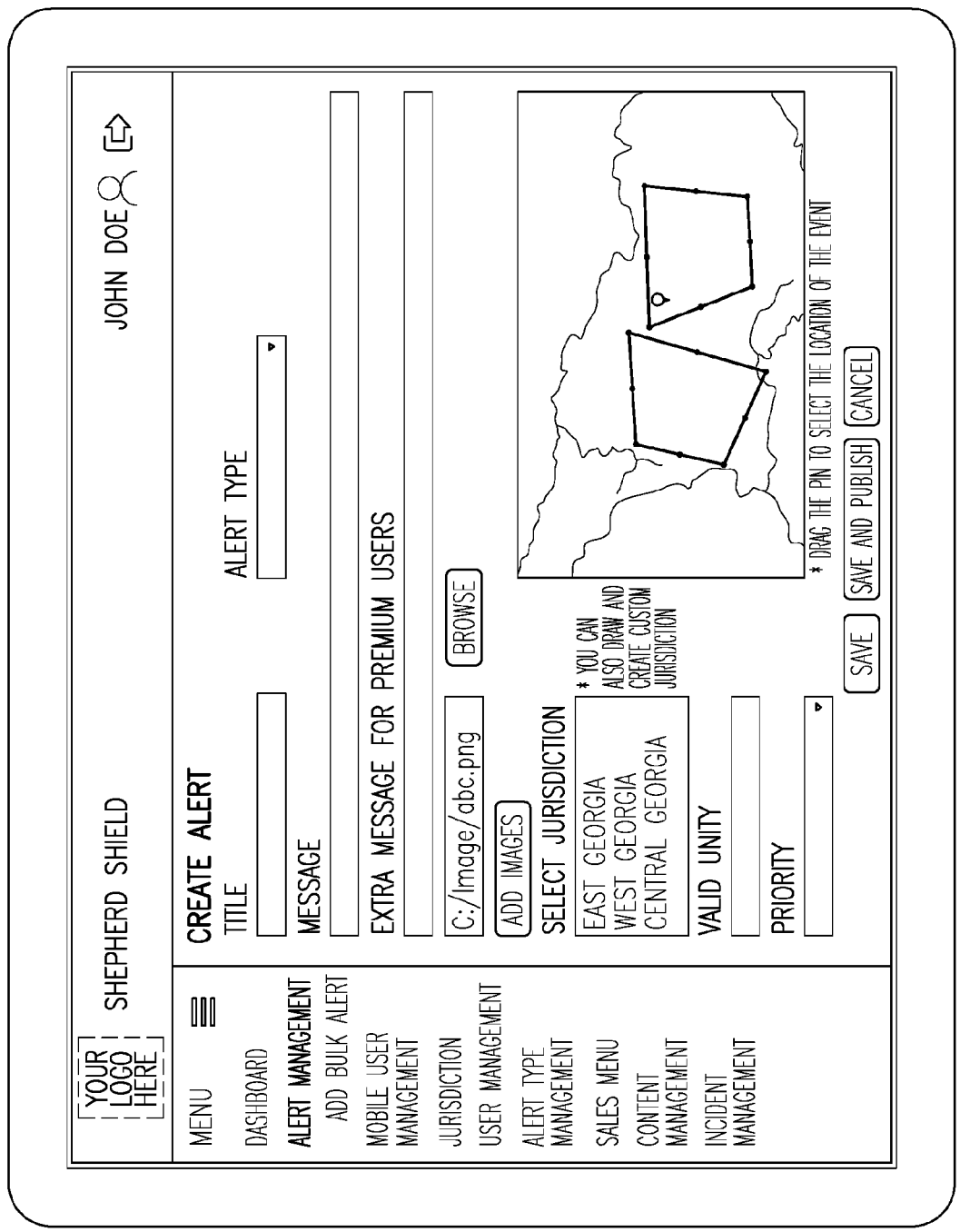
FIG. 16 is a user interface for an add active alert page of a web application of an alert system, according to one illustrated implementation.

FIG. 16 is a user interface for an add active alert page 1600 of a web application of an alert system, according to one illustrated implementation. An active alert can be created by providing the title, alert type, messages, any corresponding images, jurisdiction, expiry date and priority. The jurisdiction may be selected from an earlier created list or could dynamically create a custom location from the map. The user could either save the created alert as draft or publish the alert.

Figure 17:
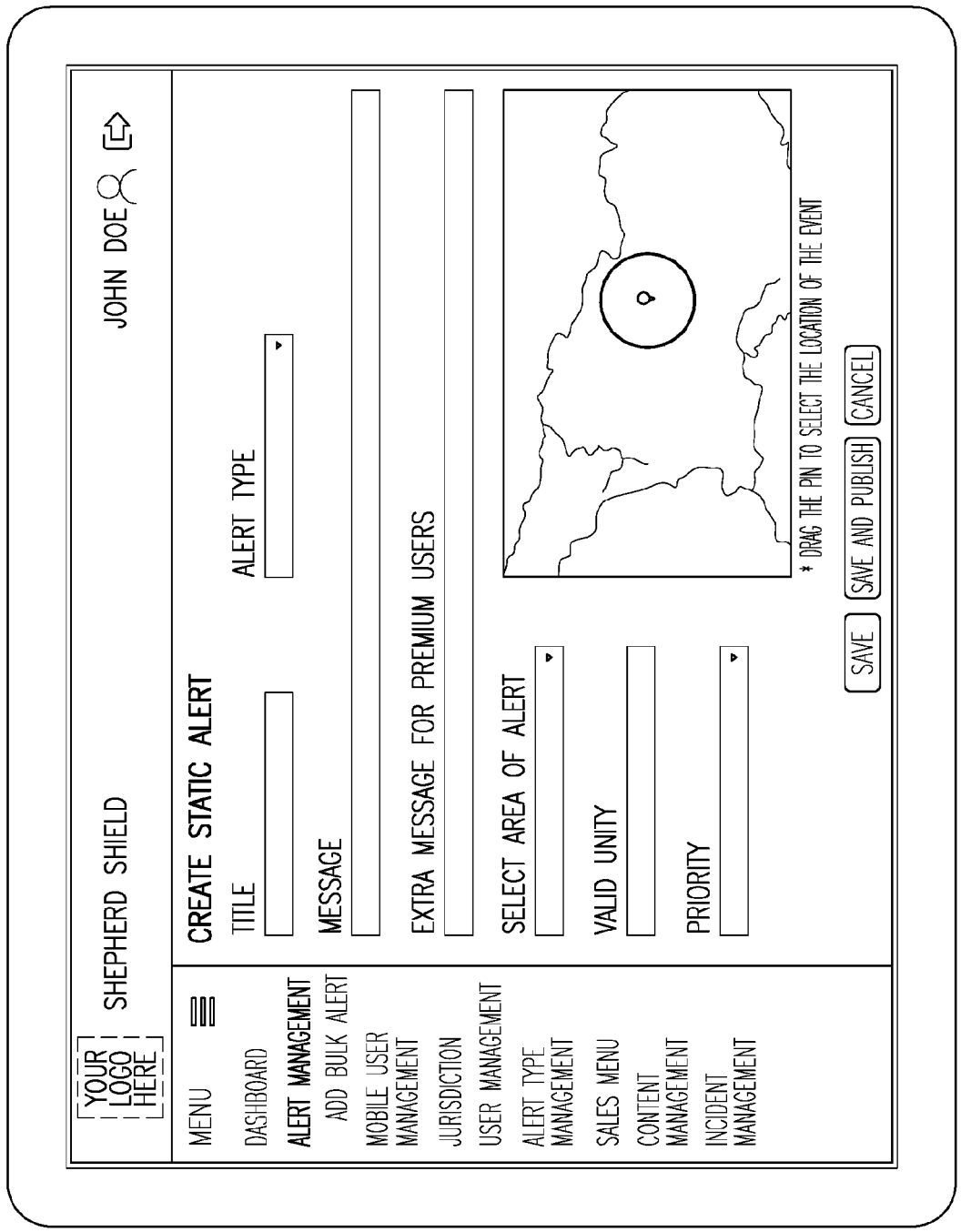
FIG. 17 is a user interface for an add static alert page of a web application of an alert system, according to one illustrated implementation.

FIG. 17 is a user interface for an add static alert page 1700 of a web application of an alert system, according to one illustrated implementation. On the page 1700 the user can create a static alert in the same way as active alert. Here, the user may select a location from the radius around the location in which alerts need to be sent, for example.

Figure 18:
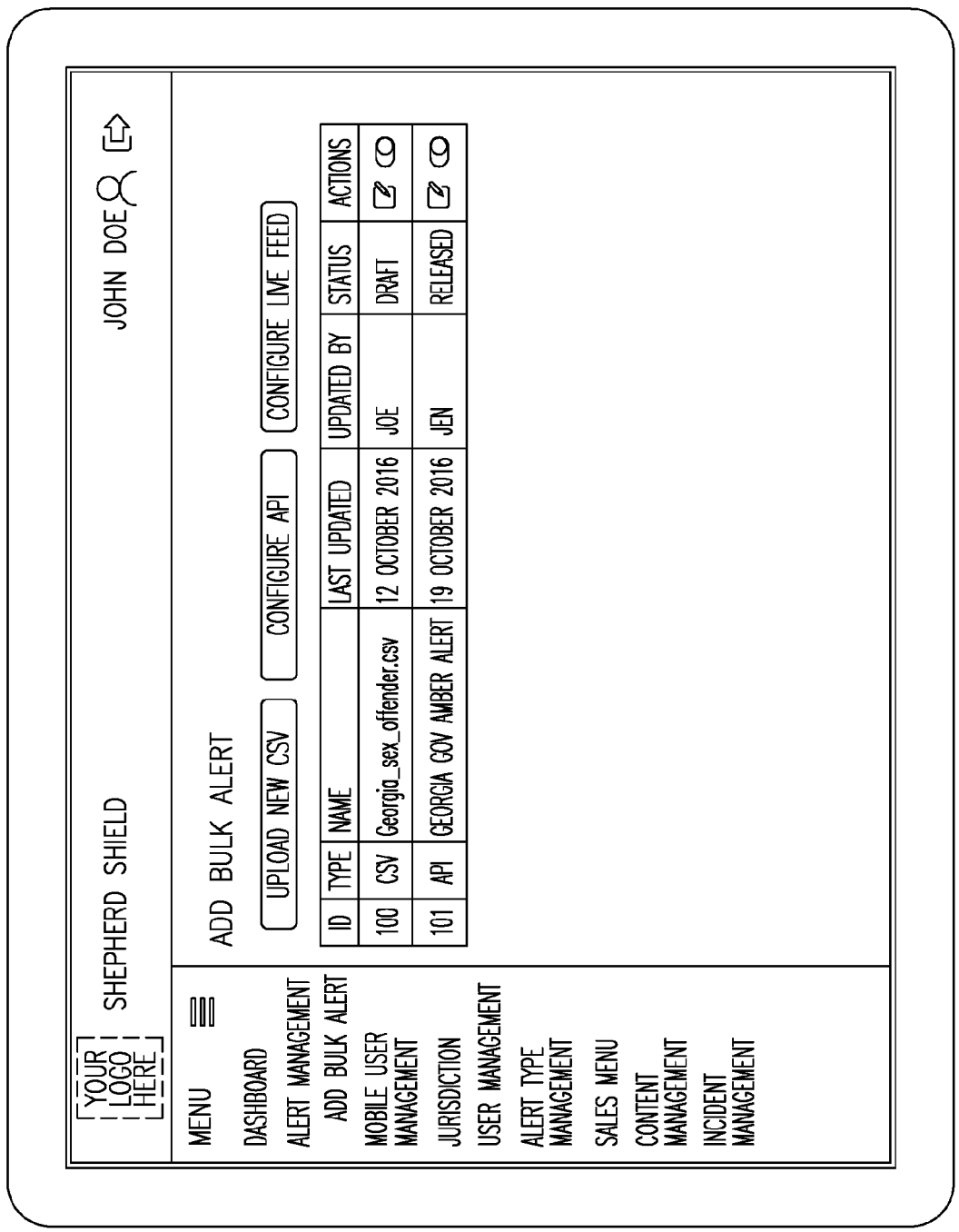
FIG. 18 is a user interface for a bulk alerts listing page of a web application of an alert system, according to one illustrated implementation.

FIG. 18 is a user interface for a bulk alerts listing page 1800 of a web application of an alert system, according to one illustrated implementation. As shown, the page 1800 lists the bulk entry of alerts. From the page 1800 alerts may be added/configured to the system in bulk by uploading a document (e.g., CSV file), or configuring an API or a Live Feed, as discussed above.

Figure 19:
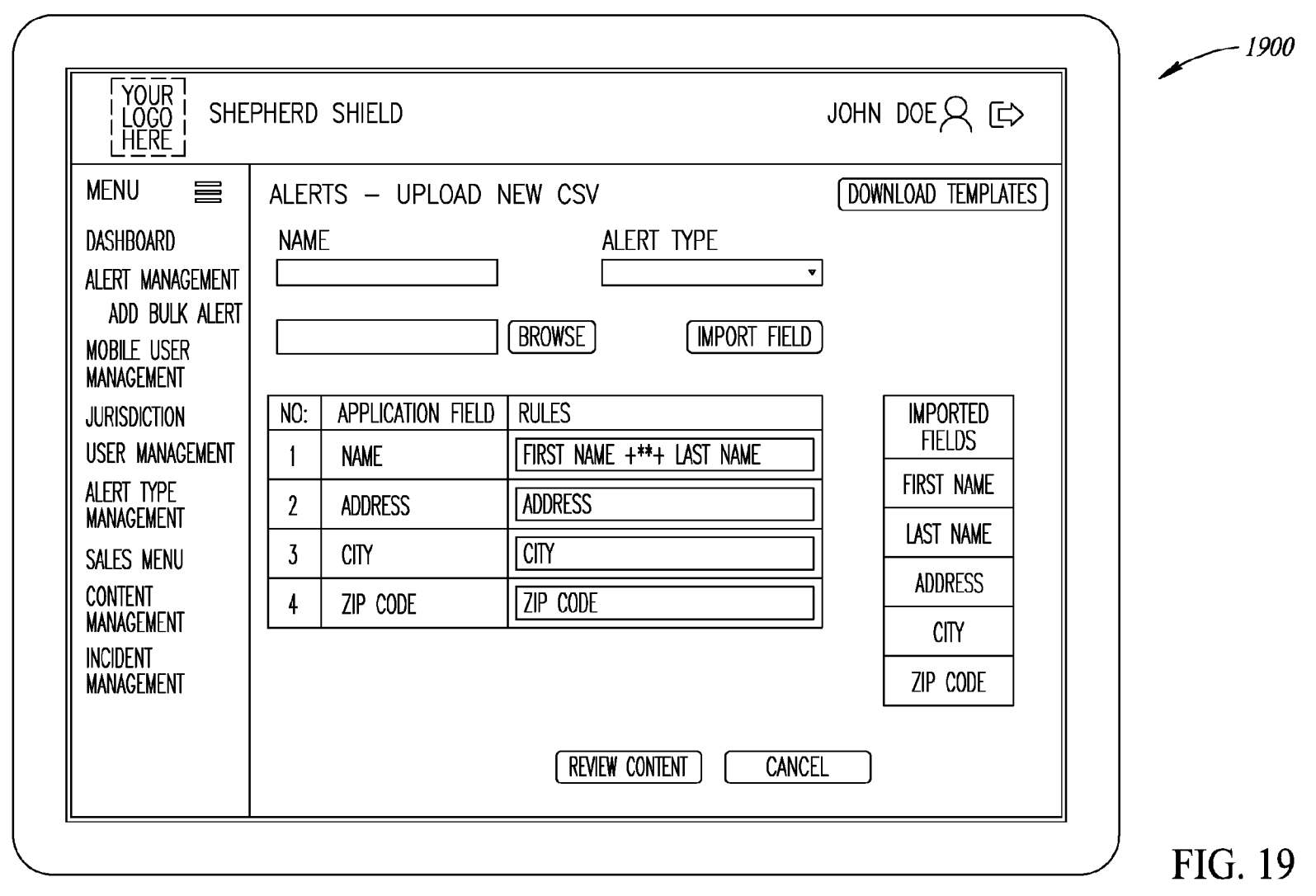

FIG. 19 is a user interface for an upload new CSV file page 1900 of a web application of an alert system, according to one illustrated implementation. On the page 1900 a user may upload a CSV file with the list of all alert entries to the system. A predefined template may be downloaded for easy mapping of fields. The user may need to provide a name to this entry and to select the CSV file to be uploaded and the alert type. The user can then click on the button "Import Fields" to import the fields of the CSV file to the system. For this reason, the first row of the sheet may be the column title. Then the user may map the fields imported to the fields required in the system to create the alert. The user can either directly map the fields or use rules like concatenation of multiple fields, adding special character, etc. Once the mapping is complete, the user can review the actual content on a review uploaded content page (not shown). The data present in the CSV file may be uploaded to the system following the mapping rules. The user could edit the content and select the alert type and priority before publishing the alerts.

FIG. 20 is a user interface for a configure application program interface (API) page 2000 of a web application of an alert system, according to one illustrated implementation. The API configuration is done the page 2000. The user provides a name for this configuration and selects the alert type. Further the user may need to provide API details, such as API method, web link, parameters and header and retrieves the schema of the API. Then, the fields retrieved from the API may be mapped to the fields in the application. The user may also provide a time duration for triggering the API. The user can then publish the API configuration.

FIG. 21 is a user interface for a configure live feed page 2100 of a web application of an alert system, according to one illustrated implementation. The Live Feed configuration is done the page 2100. The user provides a name for this configuration and selects the alert type. Further the user may provide the Live Feed details, such as web link, parameters and header and retrieves the Schema of the API. Then, the fields retrieved from the Live Feed may be mapped to the fields in the application. The user can then publish the Live Feed configuration.

All of the mobile users that are using the mobile application of the alert system may be listed in a mobile user's list page. The technical details of the mobile devices in which the mobile app is installed may also be available. The details are stored to enable Push Notification to the mobile devices.

The web application may also include a page which provides the details of information regarding the mobile users, such as current location, saved location, alert preference and reception log.

Figure 22:
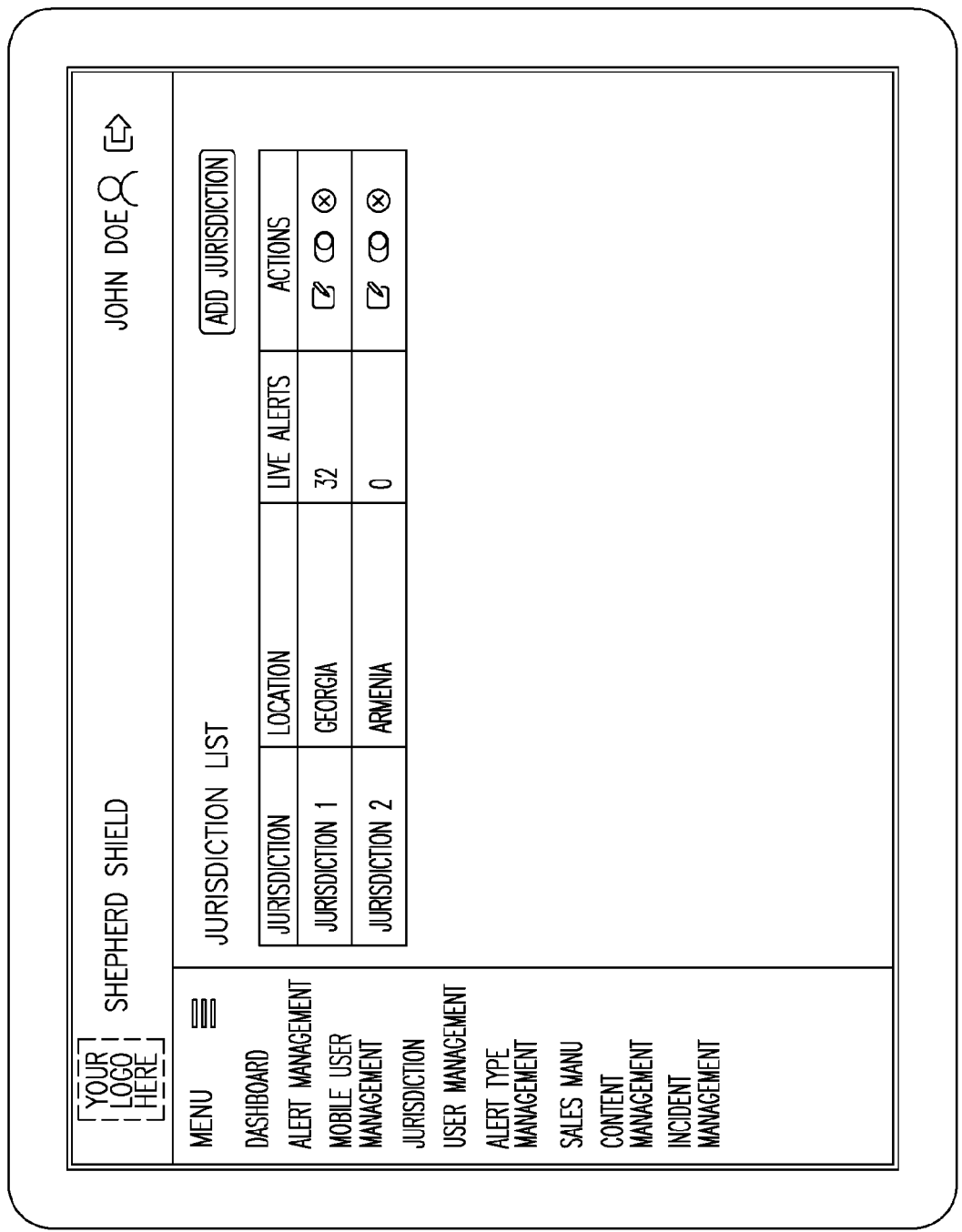
FIG. 22 is a user interface for a jurisdiction listing page of a web application of an alert system, according to one illustrated implementation.

FIG. 22 is a user interface for a jurisdiction listing page 2200 of a web application of an alert system, according to one illustrated implementation. The page 2200 may list all the Jurisdictions created in the system. As discussed above, Jurisdiction is a predefined area mapped in the map that can be used to send location-specific alerts or to restrict an admin user and the users under the admin user to have a jurisdiction on which they could send alerts.

Figure 23:
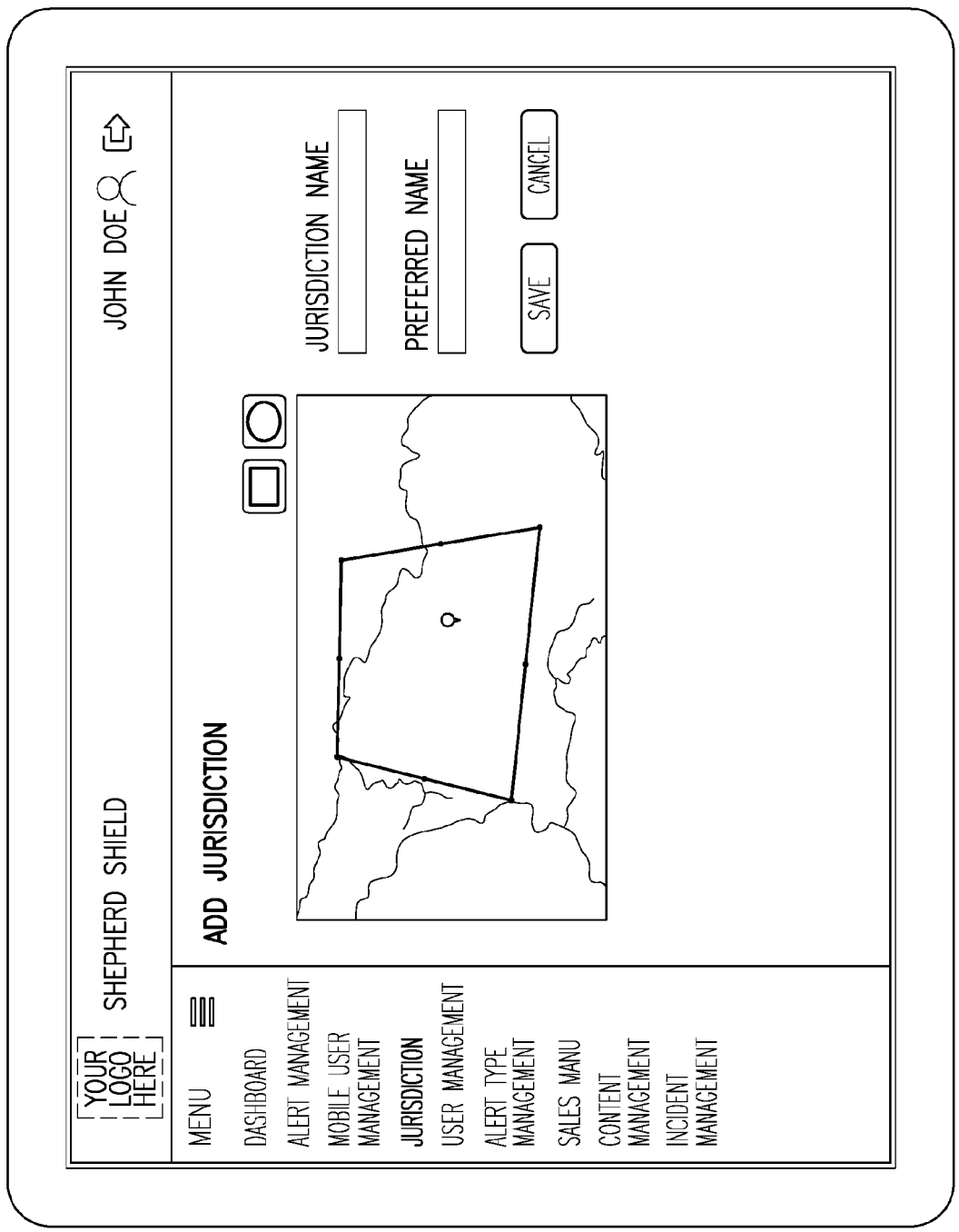
FIG. 23 is a user interface for an add jurisdiction page of a web application of an alert system, according to one illustrated implementation.

FIG. 23 is a user interface for an add jurisdiction page 2300 of a web application of an alert system, according to one illustrated implementation. As shown, using the page 2300 a user may create a new Jurisdiction by drawing an area in the map, for example.

FIG. 24 is a user interface for a security tool list page 2400 of a web application of an alert system, according to one illustrated implementation. As shown, the page 2400 lists all of the security tool items, vendor list, and the display order for each security tool item. The position in the security tool list determines the position of the security tools displayed in the mobile application. In the display order, the user may designate a vendor as a premium vendor for each sales item or service. The user may also select the display order and validity of the premium. All the non-premium vendors may have a display position designated as 0, for example, which means that those vendors may be displayed based on the proximity of the mobile users.

An admin can create a new security tools that may be displayed in the mobile application. The position of the menu item, display name, predefined icons and vendors may need to be provided to create a new security tool menu item.

Figure 25:
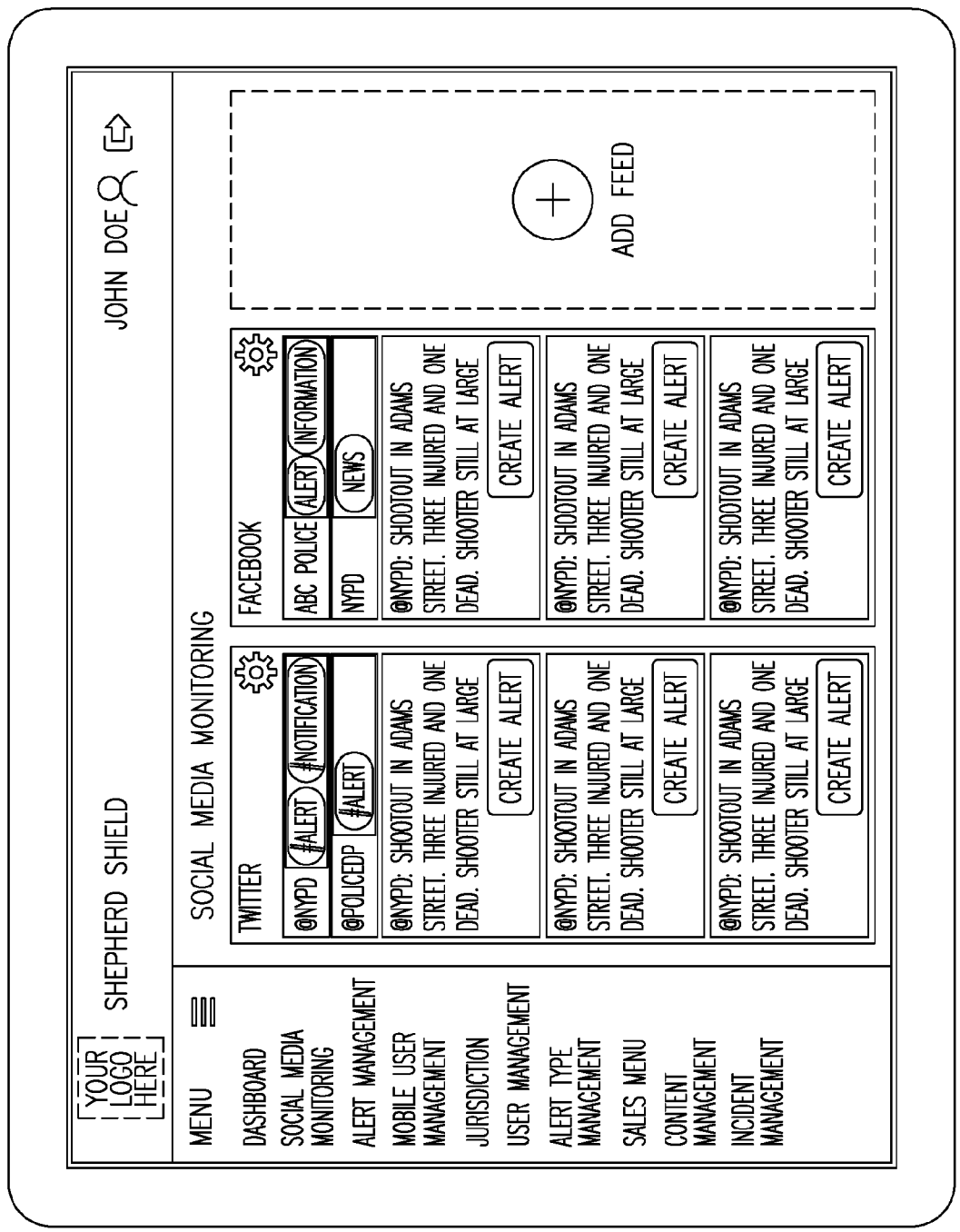
FIG. 25 is a user interface for a social media monitoring page of a web application of an alert system, according to one illustrated implementation.

FIG. 25 is a user interface for a social media monitoring page 2500 of a web application of an alert system, according to one illustrated implementation. On the page 2500 the user can monitor social media (e.g., Twitter, Facebook, news feeds) by adding one or more accounts to the page. The user can add a Twitter handle along with hash tags for monitoring one or more Twitter accounts. For Facebook, the user can add the user name along with filters to filter out the posts. The user can also provide the news feed link, for example.

FIGS. 26-32 show various example user interfaces for a mobile application of an alert system of the present disclosure, according to one illustrated implementation.

Figure 26:
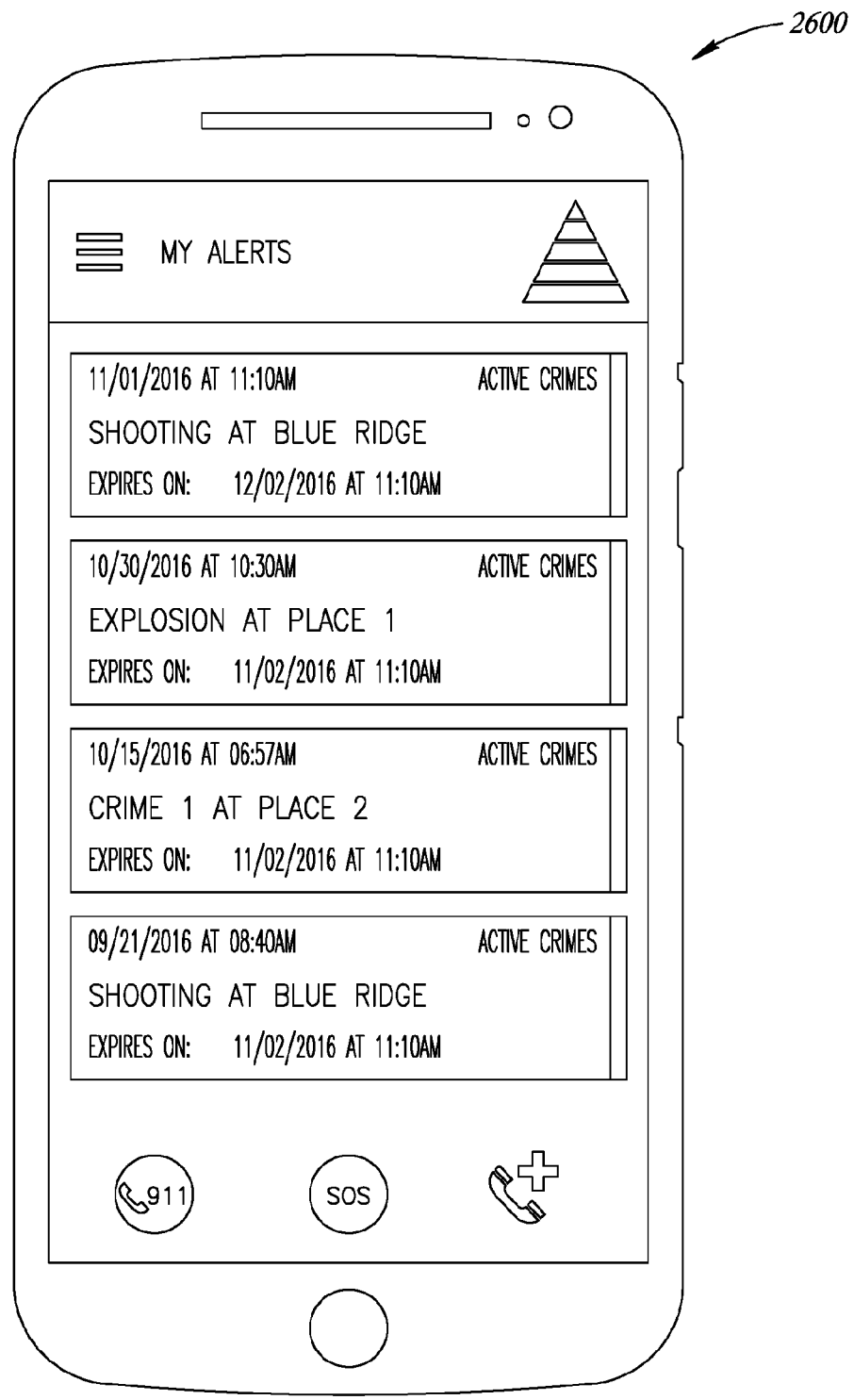
FIG. 26 is a user interface for an alerts list landing screen of a mobile application of an alert system, according to one illustrated implementation.

In particular, FIG. 26 is a user interface for an alerts list landing screen 2600 of a mobile application of an alert system, according to one illustrated implementation. On the screen 2600, all of the live alerts received in the mobile application may be displayed with the relevant priorities. Both static and live alerts may be listed in the screen 2600. There may be an option to call 911, signal an SOS to the alert system control center, or call the emergency contacts stored in the application.

Figure 27:
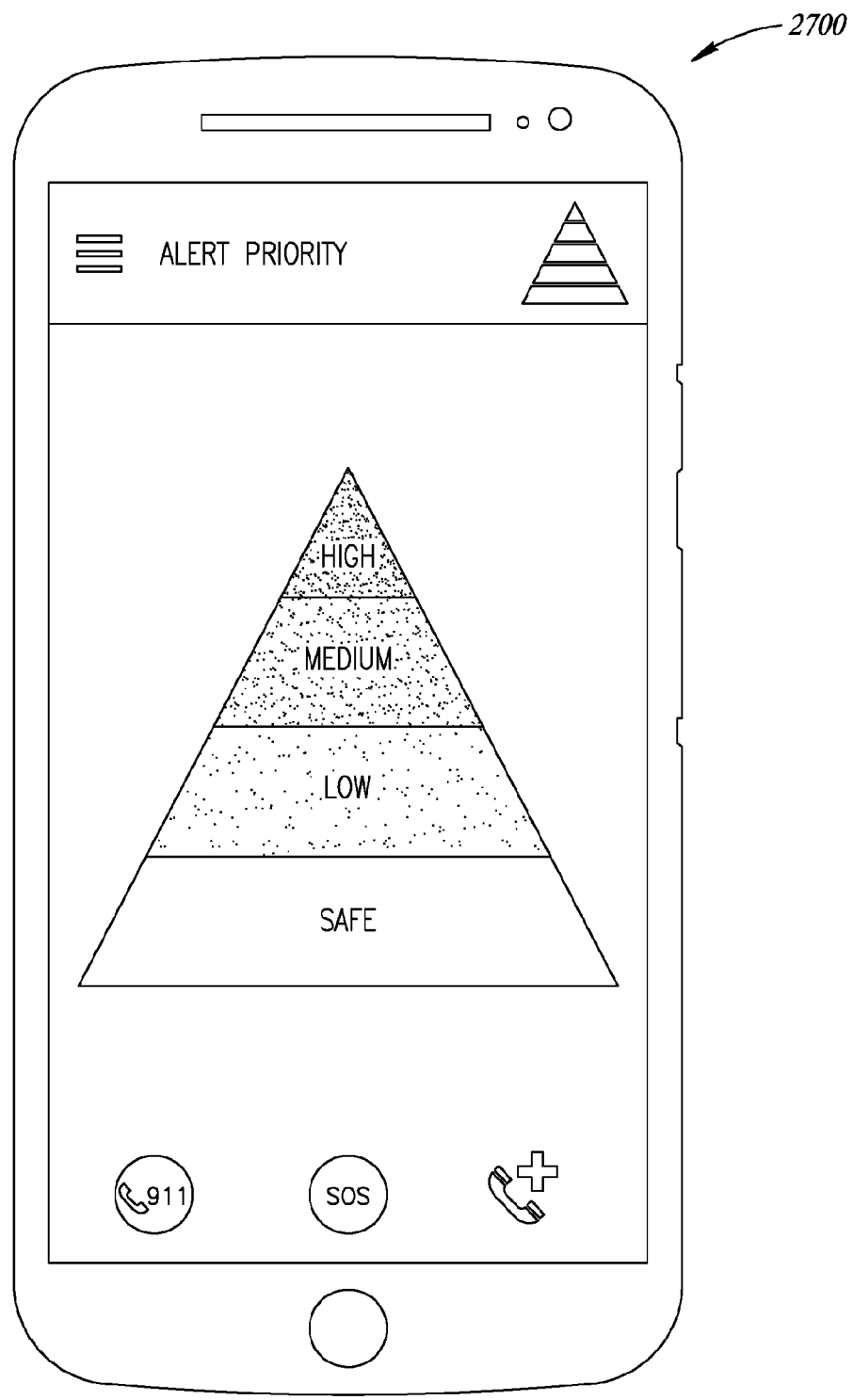
FIG. 27 is a user interface for an alert filtering screen of a mobile application of an alert system, according to one illustrated implementation.

FIG. 27 is a user interface for an alert filtering screen 2700 of a mobile application of an alert system, according to one illustrated implementation. On the screen 2700 a user can filter the alerts based on priority (e.g., high, medium, low, safe).

Figure 28:
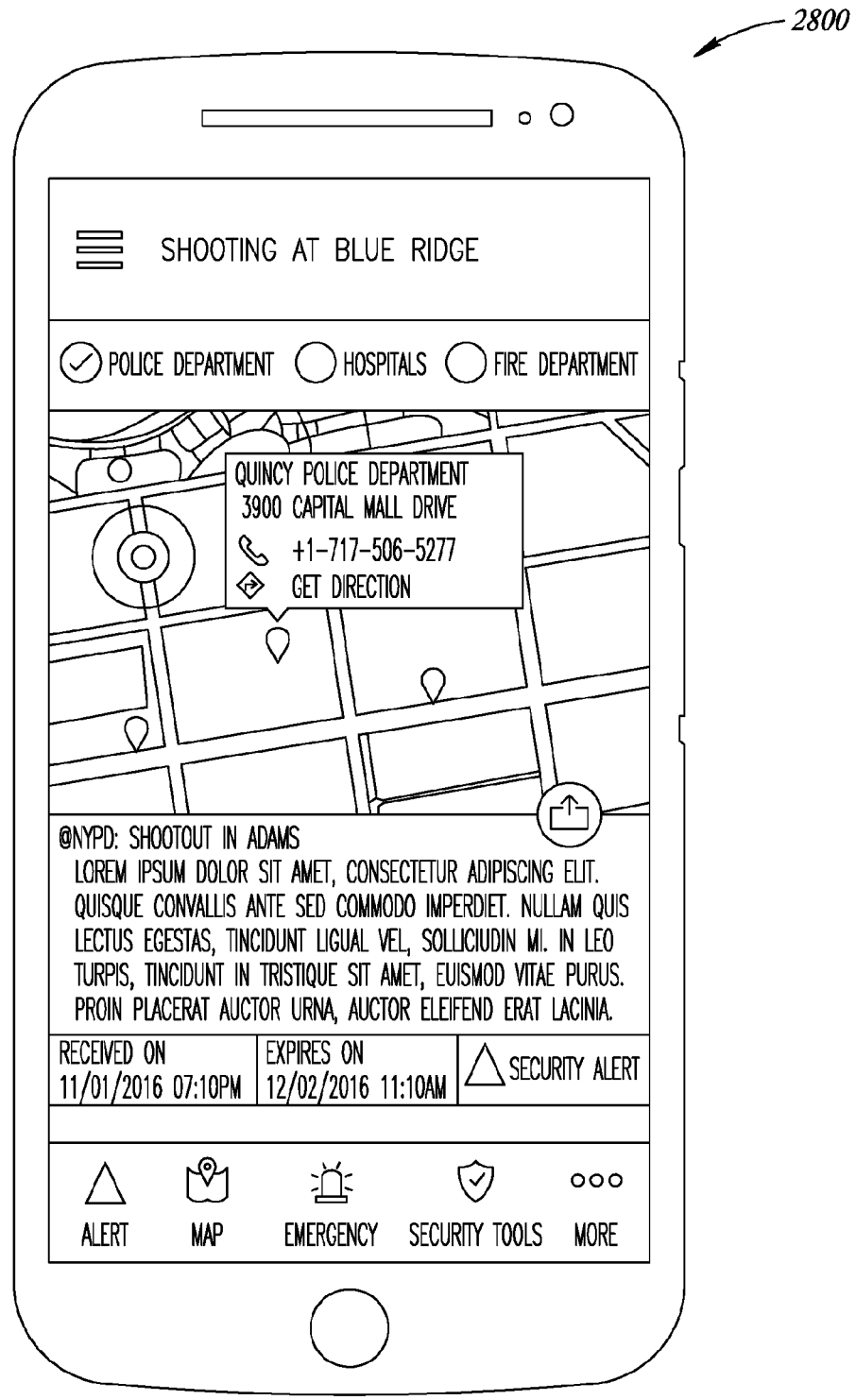
FIG. 28 is a user interface for an alert details screen of a mobile application of an alert system, according to one illustrated implementation.

FIG. 28 is a user interface for an alert details screen 2800 of a mobile application of an alert system, according to one illustrated implementation. The details of the alert may include the title, detailed message, creation date and time, images, expiration date and time, location, and an option to view the nearby police department, hospitals or fire department. The screen 2800 may also include an option to share the alert (e.g., email, text message, social media networks). The user can also mute this alert for a duration. This may not restrict a user from receiving similar alerts at the location when a person revisits the location at a later time.

Figure 29:
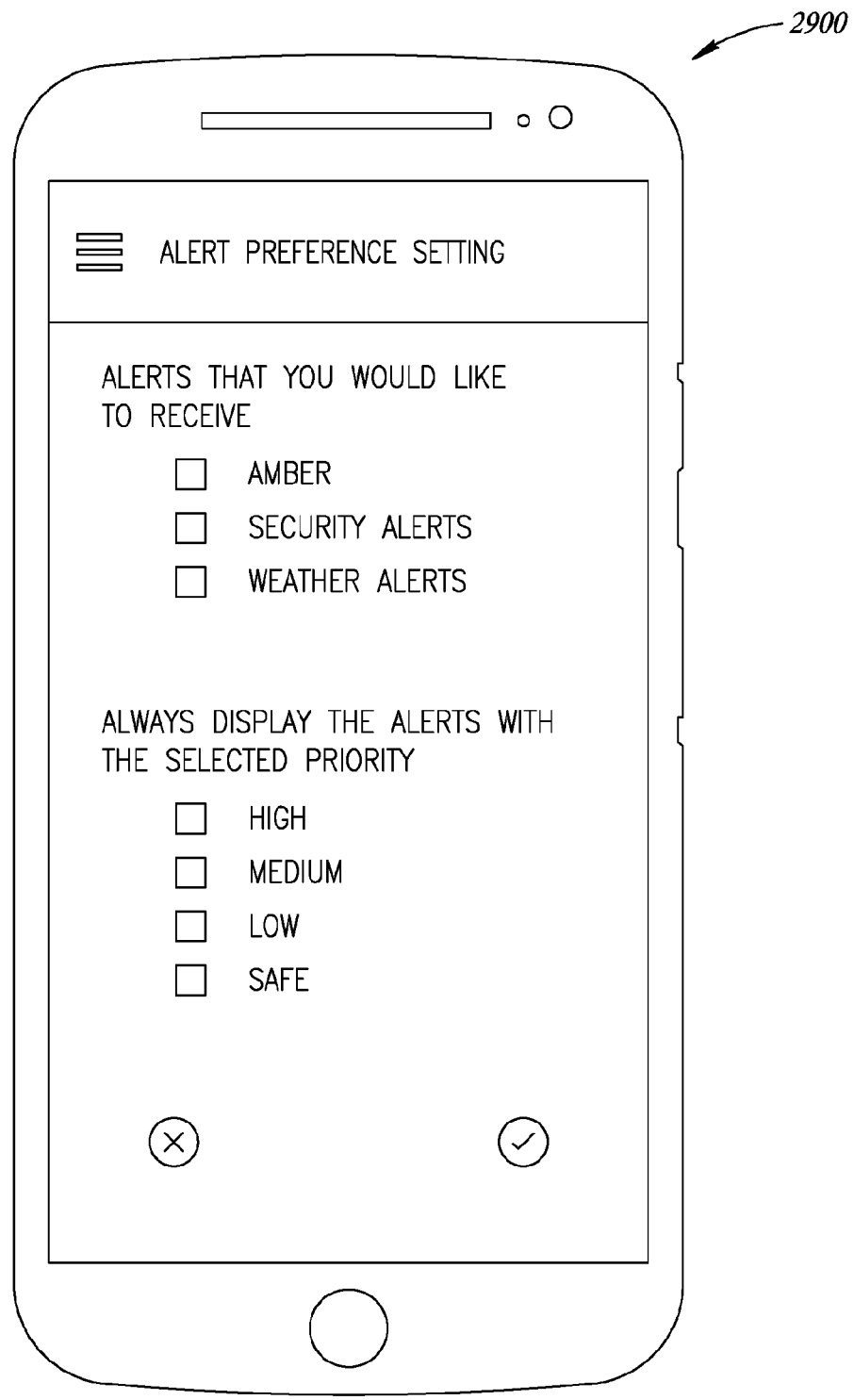
FIG. 29 is a user interface for an alert preference screen of a mobile application of an alert system, according to one illustrated implementation.

FIG. 29 is a user interface for an alert preference screen 2900 of a mobile application of an alert system, according to one illustrated implementation. On the screen 2900 the user can set a preference on the alerts that the user wishes to receive. Once this preference is set, the user may only receive those alerts from the selected preferred alert types.

Figure 30:
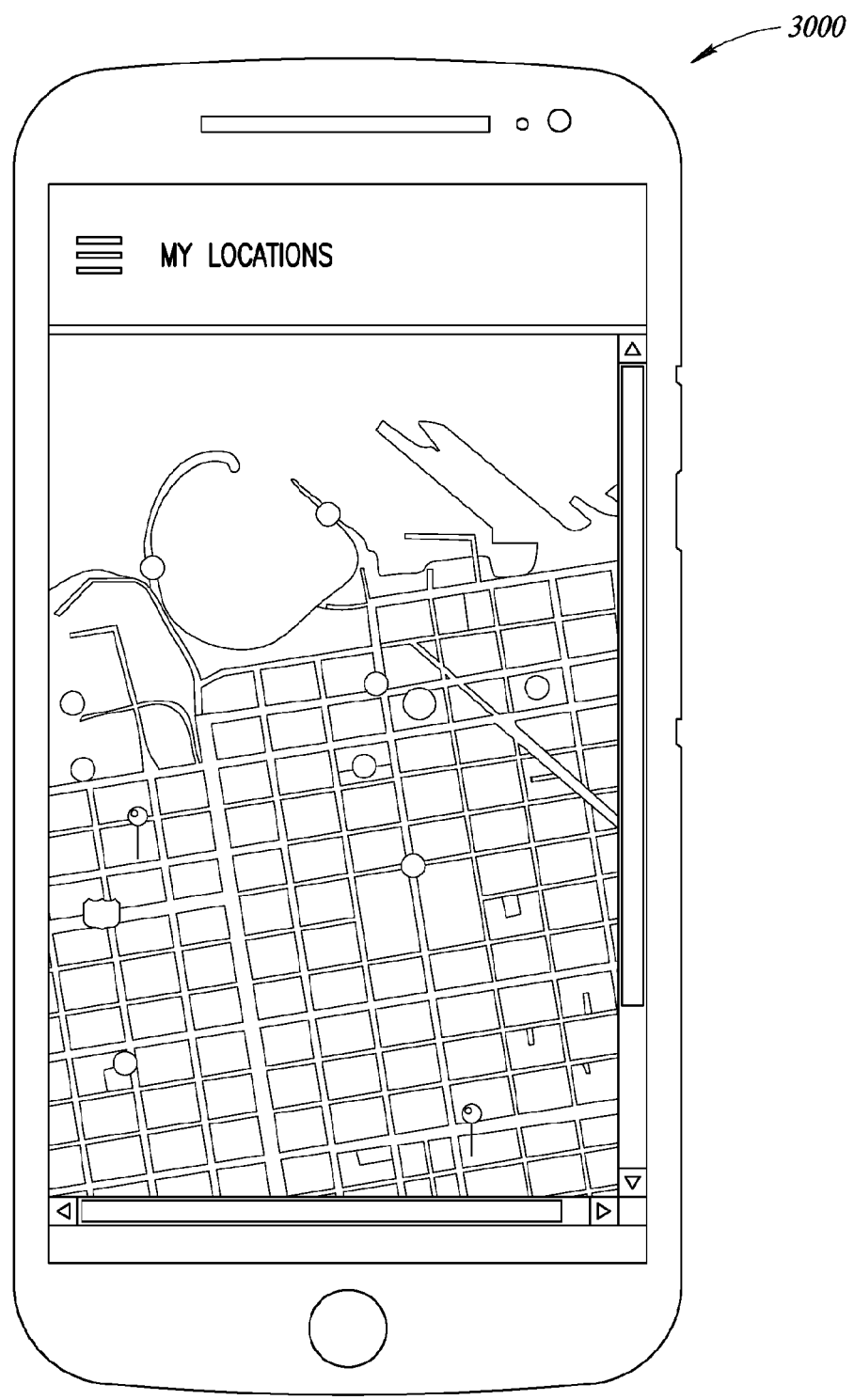
FIG. 30 is a user interface for my location map screen of a mobile application of an alert system, according to one illustrated implementation.

FIG. 30 is a user interface for my location map screen 3000 of a mobile application of an alert system, according to one illustrated implementation. On the screen 3000 the user can select a number (e.g., up to 5) of preferred locations and the user may receive location-based alerts for the selected one or more locations. These alerts may be additional to the alerts for the current location of the user.

Figure 31:
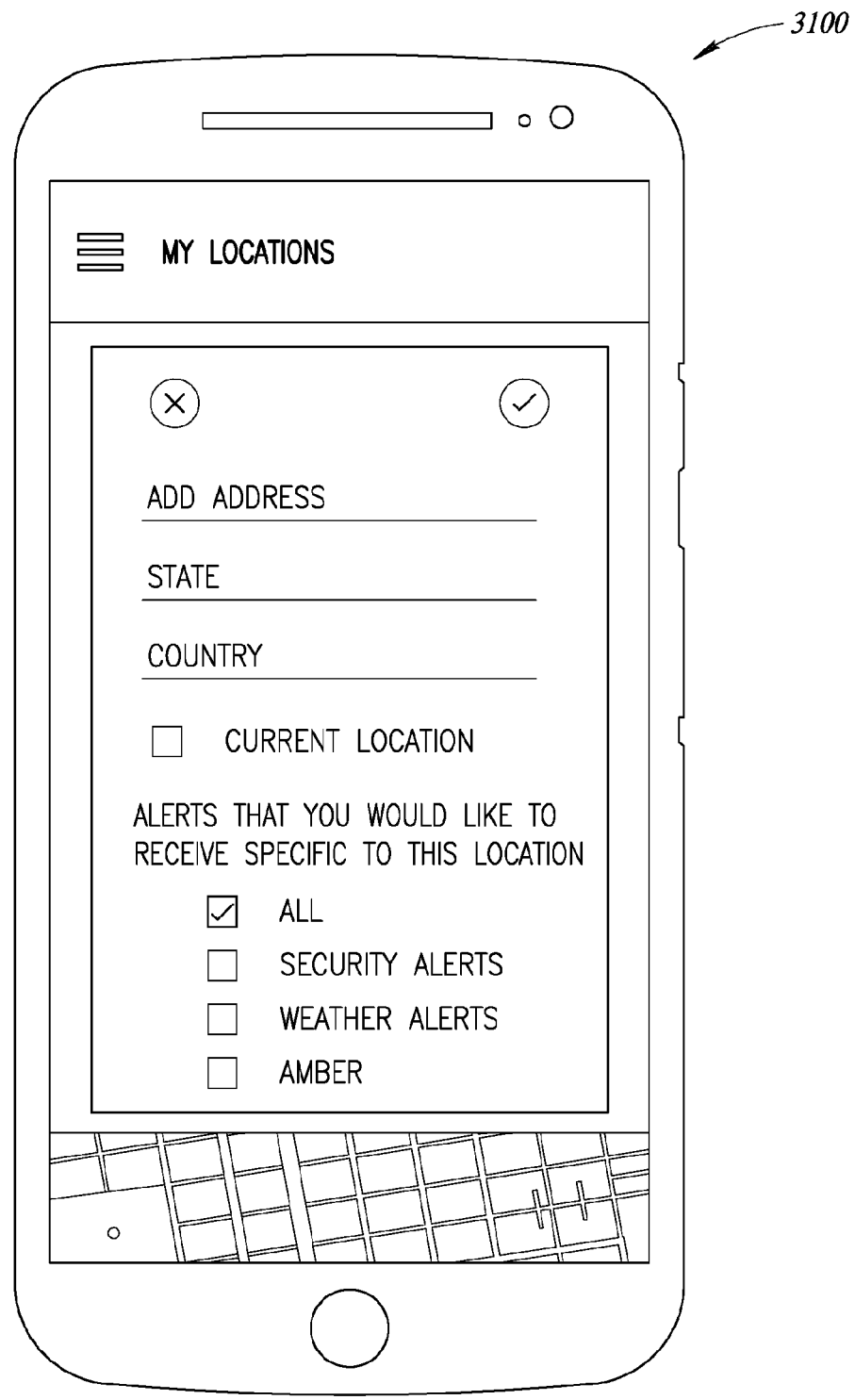
FIG. 31 is a user interface for an add location screen of a mobile application of an alert system, according to one illustrated implementation.

FIG. 31 is a user interface for an add location screen 3100 of a mobile application of an alert system, according to one illustrated implementation. On the screen 3100 the user may mark a location in the map either by setting a marker in the map or by searching the location or choosing the current location. The user may also select the alert type preference for the selected location.

As discussed above with reference to FIGS. 7 and 8, the mobile application may display a list of available security tools that are available to the user (e.g., for purchase). On clicking a security tool, the vendors supplying this item may be displayed based on the proximity of the user's location. As discussed above, there may be a provision to display one or more sponsored vendor names first, thereby bypassing the proximity.

Figure 32:
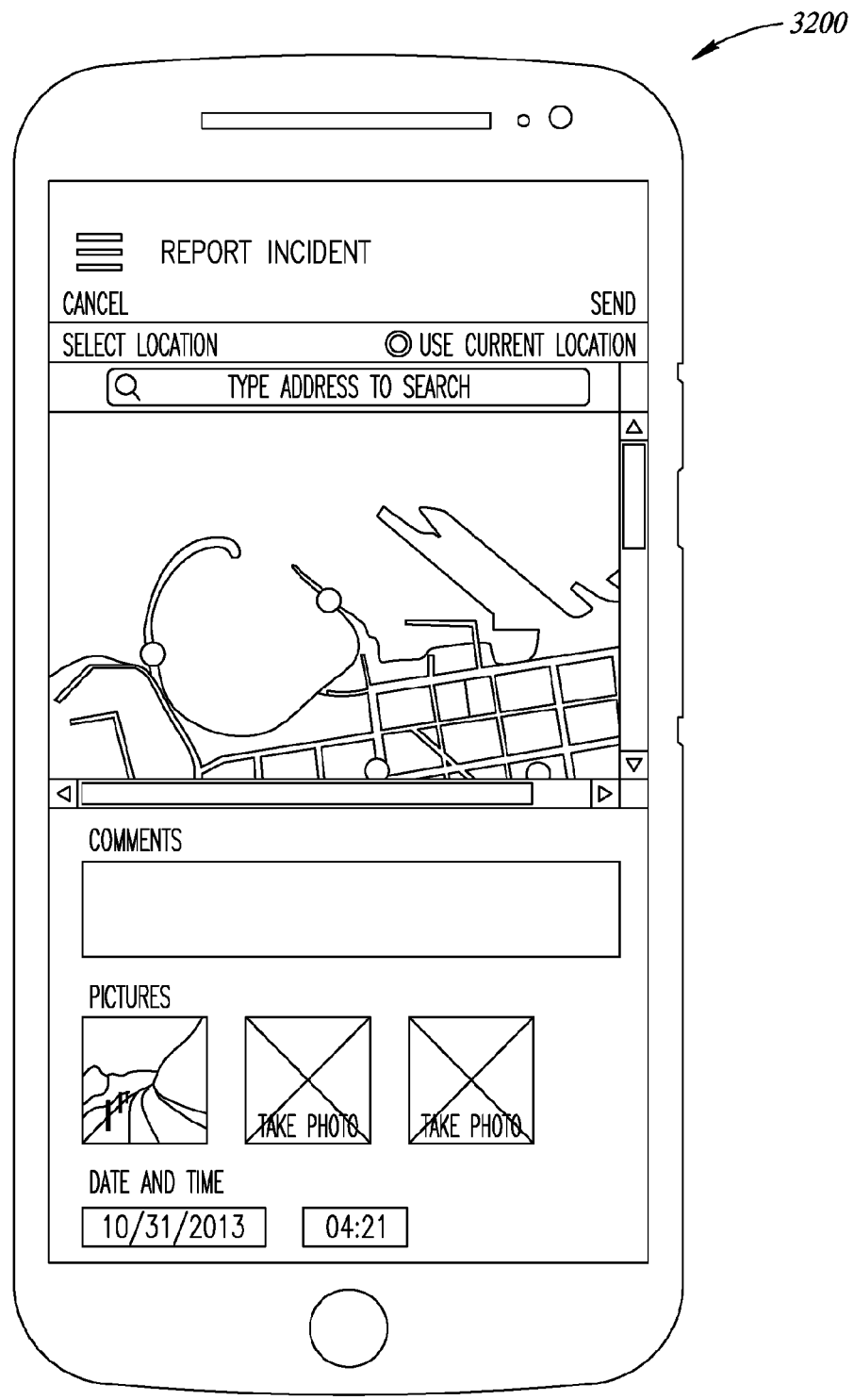
FIG. 32 is a user interface for a create report or "report it" screen of a mobile application of an alert system, according to one illustrated implementation.

FIG. 32 is a user interface for a create report or "report it" screen 3200 of a mobile application of an alert system, according to one illustrated implementation. Using the screen 3200 the user may report an incident to the alert system control center. As an example, the user may select a location, provide notes, attach one or more images, provide a priority, and select an alert type. The operator may determine the authenticity of the incident and may create an alert based on the created report.

Additionally or alternatively to being specifically programmed to operate, act, perform, function, or achieve as a special purpose computer that operates, acts, performs, functions, or achieves any result(s) explained herein with regard to the first networked subscriber device 102, the first networked subscriber device 102 may be specifically programmed to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. Additionally or alternatively to being specifically programmed to operate, act, perform, function, or achieve as a special purpose computer that operates, acts, performs, functions, or achieves any result(s) explained herein with regard to the second networked subscriber device 110, the second networked subscriber device 110 may be specifically programmed to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. Additionally or alternatively to being specifically programmed to operate, act, perform, function, or achieve as a special purpose computer that operates, acts, performs, functions, or achieves any result(s) explained herein with regard to the third networked subscriber device 114, the third networked subscriber device 114 may be specifically programmed to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. Additionally or alternatively to being specifically programmed to operate, act, perform, function, or achieve as a special purpose computer that operates, acts, performs, functions, or achieves any result(s) explained herein with regard to the networked device 112 external to the threat management system 104, the networked device 112 external to the threat management system 104 may be specifically programmed to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc. Additionally or alternatively to being specifically programmed to operate, act, perform, function, or achieve as a special purpose computer that operates, acts, performs, functions, or achieves any result(s) explained herein with regard to the threat management system 104, the threat management system 104 may be specifically programmed to operate, act, perform, function, or achieve as a special purpose computer that operates, acts, performs, functions, or achieves any result(s) explained herein with regard to, for example, one or more of the first networked subscriber device 102, the second networked subscriber device 110, the third networked subscriber device 114, the networked device 112 external to the threat management system 104, the threat management system 104, etc.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually one or more thereof.

Those of skill in the art will recognize that many of the methods or algorithms set out herein may be executed via distributed computing. For example, the threat management system 104 may cause the networked subscriber device 306 to operate, act, perform, function, or achieve any operations, acts, performances, functions, achievements, or result(s) explained herein with regard to the threat management system 104 by pushing data or files to the networked subscriber device 306, thereby permitting the networked subscriber device 306 to operate offline without presently active communication with the threat management system 104. For example, the threat management system 104 may push data or files pertaining to the threat at the threat location 106 to the networked subscriber device 306 regardless of whether the target location of the networked subscriber device 306 coincides with the threat location 106. The data or files may include one or more of the following: the threat characteristic of the threat at the threat location 106, the dimensions of the target location of the networked subscriber device 306, the position of the target location of the networked subscriber device 306, the dimensions of the threat location 106, the position of the threat location 106, the threat report, the set of threat assessment data, any other information explained herein, any other data explained herein, any other files explained herein, etc. Such push may cause the networked subscriber device 306 to warn the user of the networked subscriber device 306 responsive to detecting that the target location of the networked subscriber device 306 coincides with the threat location 106 at any time subsequent to such push. Accordingly, the threat management system 104 or the networked subscriber device 306 may rely on geofencing with or without presently active cooperation of the other.

Additionally or alternatively, the threat management system 104 may push updates of such data or files to the networked subscriber device 306 responsive to a change to data or files at the threat management system 104. For example, the threat management system 104 may push updates to the networked subscriber device 306 responsive to a change in one or more of the following: the threat characteristic of the threat at the threat location 106, the dimensions of the target location of the networked subscriber device 306, the position of the target location of the networked subscriber device 306, the dimensions of the threat location 106, the position of the threat location 106, the threat report, the set of threat assessment data, etc. Such push may cause the networked subscriber device 306 to warn the user of the networked subscriber device 306 responsive to detecting that the target location of the networked subscriber device 306 coincides with the threat location 106 at any time subsequent to such push.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. All of the U.S. patents, U.S. patent application publications, U.S. patent applications, foreign patents, foreign patent applications and non-patent publications referred to in this specification and/or listed in the Application Data Sheet and the teachings of U.S. provisional patent application Ser. No. 62/292,548, filed Feb. 8, 2016 are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation for a threat management system having at least one network connectivity device and at least one application server, the method comprising:
   generating, by the at least one application server of the threat management system, at least one threat characteristic indicator;
   generating, by the at least one application server of the threat management system, at least one threat location indicator;
   responsive to the generating of one or more of the at least one threat characteristic indicator or the at least one threat location indicator, creating, by the at least one application server of the threat management system, at least one threat alert;
   responsive to the creating of the at least one threat alert, converting, by the at least one network connectivity device of the threat management system, the at least one threat alert to at least one threat alert signal;
   responsive to the at least one threat alert signal, generating, by the at least one application server of the threat management system, at least one list of threat solution providers offering at least one threat solution, the threat solution comprising at least one opportunity to engage in one or more of purchasing, renting, subscribing, or hiring one or more of the following: at least one alarm system, at least one alarm monitoring subscription, at least one camera system, at least one person tracking subscription or system, at least one security officer, at least one unarmed security officer, at least one armed security officer, at least one counter assault team, at least one anti-terrorism team, at least one security patrol, at least one armored car service, at least one vault, at least one body guard, at least one private investigator, at least one self-defense training lesson, at least one firearm training session, or at least one firearm;
   identifying, by the at least one application server of the threat management system, respective prioritization indicators of the threat solution providers, the respective prioritization indicators comprising one or more of the following: at least one user review of at least one threat solution provider or at least one popularity rating of at least one threat solution provider;
   responsive to the identifying of the respective prioritization indicators, prioritizing, by the at least one application server of the threat management system, the threat solution providers;
   responsive to the prioritizing of the threat solution providers, pushing the list of threat solution providers to at least one networked subscriber device external to the threat management system, thereby causing the at least one networked subscriber device to notify the at least one respective user of the at least one list of threat solution providers, the at least one respective user having at least one opportunity, after the threat has passed, to obtain a threat solution from at least one of the threat solution providers; and
   responsive to the at least one threat alert signal, pushing, by the at least one network connectivity device of the threat management system, the at least one threat alert signal to at least one networked subscriber device external to the threat management system, thereby causing the at least one networked subscriber device to:
      emit at least one humanly perceptible alarm that warns at least one respective user of the at least one networked subscriber device that at least one respective target location of the at least one networked subscriber device coincides with at least one threat location; and
      notify the at least one respective user of at least one threat characteristic.

2. The method of claim 1 wherein pushing the at least one threat alert signal to at least one networked subscriber device external to the threat management system further comprises:
   pushing, by the at least one network connectivity device of the threat management system, the at least one threat alert signal to at least one networked subscriber device external to the threat management system, thereby causing the at least one networked subscriber device to notify the at least one respective user of at least one respective threat solution.

3. The method of claim 2 wherein notifying the at least one respective user of at least one respective threat solution further comprises:
   notifying the at least one respective user of at least one escape path to at least one rally point outside the at least one threat location.

4. The method of claim 3 wherein notifying the at least one respective user of at least one escape path to at least one rally point outside the at least one threat location further comprises:
   instructing the at least one respective user to travel at least one path having at least one reduced or minimized threat level as compared to at least one other escape path.

5. The method of claim 2 wherein notifying the at least one respective user of at least one respective threat solution further comprises:
   notifying the at least one respective user of at least one escape path to one or more of the following: at least one police station, at least one fire station, at least one hospital, at least one previously user selected rally point, or at least one previously user selected address.

6. The method of claim 5 wherein notifying the at least one respective user of at least one escape path further comprises:
   instructing the at least one respective user to travel at least one path having at least one reduced or minimized threat level as compared to at least one other escape path.

7. The method of claim 1 wherein emitting at least one humanly perceptible alarm that warns at least one respective user of the at least one networked subscriber device that at least one respective target location of the at least one networked subscriber device coincides with at least one threat location further comprises:
   warning the at least one respective user of the at least one networked subscriber device that the at least one threat location coincides with at least one respective target location that includes at least a first travel path that includes one or more of the following: at least one user selected or defined travel path or at least one travel path to a user selected or defined destination.

8. The method of claim 7 wherein pushing the at least one threat alert signal to at least one networked subscriber device external to the threat management system further comprises:
pushing, by the at least one network connectivity device of the threat management system, the at least one threat alert signal to at least one networked subscriber device external to the threat management system, thereby causing the at least one networked subscriber device to notify the at least one respective user of at least one respective threat solution that includes at least one adjusted travel path having at least one reduced or minimized threat level as compared to at least the first travel path.

9. The method of claim 1 wherein pushing the at least one threat alert signal to at least one networked subscriber device further comprises:
pushing, by the at least one network connectivity device of the threat management system, the at least one threat alert signal to at least one networked subscriber device external to the threat management system, thereby causing the at least one networked subscriber device to notify the at least one respective user of at least one threat solution provider.

10. The method of claim 1 wherein pushing the at least one threat alert signal to at least one networked subscriber device further comprises:
pushing, by the at least one network connectivity device of the threat management system, the at least one threat alert signal to at least one networked subscriber device external to the threat management system, thereby causing the at least one networked subscriber device to notify the at least one respective user of at least one prioritized threat solution provider.

11. The method of claim 1 wherein identifying respective prioritization indicators of the threat solution providers further comprises:
identifying, by the at least one application server of the threat management system, one or more of the following: at least one subscription by at least one threat solution provider or at least one bid by at least one threat solution provider.

12. The method of claim 1 wherein generating at least one threat characteristic indicator and at least one threat location indicator further comprises:
obtaining, by the at least one network connectivity device of the threat management system, at least one threat report signal from at least one networked device external to the threat management system;
responsive to the obtaining of the at least one threat report signal, converting, by the at least one network connectivity device of the threat management system, the at least one threat report signal to at least one threat report;
responsive to the at least one threat report, generating, by the at least one application server of the threat management system, the at least one threat characteristic indicator; and
responsive to the at least one threat report, generating, by the at least one application server of the threat management system, the at least one threat location indicator.

13. The method of claim 12 wherein obtaining at least one threat report signal from at least one networked device external to the threat management system further comprises:
obtaining, by the at least one network connectivity device of the threat management system, at least one threat report signal from one or more of the following: at least one mobile device, at least one social media server, at least one news report server, at least one news broadcast device, at least one government server, at least one law enforcement server, at least one military server, or at least one law enforcement radio scanner.

14. The method of claim 12 wherein obtaining at least one threat report signal from at least one networked device external to the threat management system further comprises:
obtaining, by the at least one network connectivity device of the threat management system, at least one threat report signal from at least one non-transitory computer readable medium that stores one or more of the following: at least one location of at least one reported crime, at least one location of at least one reported criminal, at least one location of at least one reported sex offender, at least one location of at least one reported terrorist, at least one location of at least one reported violent act, at least one location of at least one reported gang activity, at least one location of at least one reported act of sex solicitation, at least one location of at least one reported act of prostitution, at least one location of at least one reported act of sex trafficking, at least one location of at least one reported drug use, at least one location of at least one reported drug sale, at least one location of at least one reported drug trafficking, at least one location of at least one reported disease outbreak, at least one location of at least one reported gunshot, at least one location of at least one reported riot, at least one location of at least one reported act of police brutality, at least one location of at least one reported hate crime, or at least one location of at least one reported dangerous animal.

15. The method of claim 12 wherein obtaining at least one threat report signal from at least one networked device external to the threat management system further comprises:
obtaining, by the at least one network connectivity device of the threat management system, at least one threat report signal from at least one non-transitory computer readable medium that stores at least one location of one or more of the following: at least one reported impending earthquake, at least one reported presently active earthquake, at least one reported impending tornado, at least one reported presently active tornado, at least one reported impending hurricane, at least one reported presently active hurricane, at least one reported impending flood, at least one reported presently active flood, at least one reported impending high tide, at least one reported presently active high tide, at least one reported impending low tide, at least one reported presently active low tide, at least one reported impending wildfire, at least one reported presently active wildfire, at least one reported impending tsunami, at least one reported presently active tsunami, at least one reported impending volcanic activity, at least one reported presently active volcanic activity, at least one reported geological fault line, at least one reported impending natural disaster, at least one reported presently active natural disaster, at least one reported impending power outage, at least one reported presently active power outage, at least one reported impending power shortage, at least one reported presently active power shortage, at least one reported impending fuel shortage, at least one reported presently active fuel shortage, at least one reported impending fresh water shortage, at least one reported presently active fresh water shortage, at least one reported impending food shortage, or at least one reported presently active food shortage.

16. The method of claim 1 wherein generating at least one threat characteristic indicator further comprises:
generating, by the at least one application server of the threat management system, at least one threat assessment score of the at least one threat location; and
responsive to the generating of the at least one threat assessment score, generating, by the at least one application server of the threat management system, the at least one threat characteristic indicator.

17. The method of claim 16 wherein generating at least one threat assessment score of the at least one threat location further comprises:
generating, by the at least one application server of the threat management system, at least one threat assessment score that indicates at least one level of one or more of the following: crime, theft, vehicle prowling, automobile theft, burglary, murder, sex offense, sex trafficking, prostitution, hate crime, violent crime, non-violent crime, piracy, drug trafficking, drug sales, drug use, gang activity, gang members, injunctions against gangs, injunctions against individuals, terrorist activity, outstanding warrants, sex offenders, criminals, police brutality, injunctions against police, corrupt politicians, unemployment, education, per capita income, household income, disease, life-threatening disease, dangerous animals, or riots.

18. The method of claim 16 wherein generating at least one threat assessment score of the at least one threat location further comprises:
generating, by the at least one application server of the threat management system, at least one threat assessment score that indicates at least one level of one or more of the following: earthquakes, tornados, hurricanes, floods, high tides, low tides, wildfires, tsunamis, volcanic activity, natural disasters, power outages, fuel shortages, power shortages, fresh water shortages, or food shortages.

19. The method of claim 16 wherein generating at least one threat assessment score of the at least one threat location further comprises:
obtaining, by the at least one network connectivity device of the threat management system, at least one threat assessment data signal from at least one networked device external to the threat management system;
responsive to the obtaining of the threat assessment data signal, converting, by the at least one network connectivity device of the threat management system, the at least one threat assessment data signal to at least one set of threat assessment data; and
responsive to the at least one set of threat assessment data, generating, by the at least one application server of the threat management system, the at least one threat assessment score of the at least one threat location.

20. The method of claim 19 wherein obtaining at least one threat assessment data signal from at least one networked device external to the threat management system further comprises:
obtaining, by the at least one network connectivity device of the threat management system, at least one threat assessment data signal from at least one non-transitory computer readable medium that stores one or more of the following: crime statistics, theft statistics, vehicle prowling statistics, automobile theft statistics, burglary statistics, murder statistics, at least one sex offense statistics, sex trafficking statistics, prostitution statistics, hate crime statistics, violent crime statistics, non-violent crime statistics, piracy statistics, drug trafficking statistics, drug sale statistics, drug use statistics, gang activity statistics, gang member statistics, injunction statistics, sex offender statistics, criminal statistics, police brutality statistics, corrupt politician statistics, unemployment statistics, education statistics, per capita income statistics, household income statistics, disease statistics, life-threatening disease statistics, terrorist activity statistics, outstanding warrant statistics, dangerous animal statistics, or riot statistics.

21. The method of claim 19 wherein obtaining at least one threat assessment data signal from at least one networked device external to the threat management system further comprises:
obtaining, by the at least one network connectivity device of the threat management system, at least one threat assessment data signal from at least one non-transitory computer readable medium that stores one or more of the following: earthquake statistics, tornado statistics, hurricane statistics, flood statistics, high tide statistics, low tide statistics, wildfire statistics, tsunami statistics, volcanic activity statistics, natural disaster statistics, power outage statistics, fuel shortage statistics, power shortage statistics, fresh water shortage statistics, or food shortage statistics.

22. The method of claim 1 wherein emitting at least one humanly perceptible alarm that warns at least one respective user of the at least one networked subscriber device that at least one respective target location of the at least one networked subscriber device coincides with at least one threat location further comprises:
warning the at least one respective user of the at least one networked subscriber device that the at least one threat location coincides with at least one respective target location that includes at least one respective user selected or defined location.

23. The method of claim 1 wherein emitting at least one humanly perceptible alarm that warns at least one respective user of the at least one networked subscriber device that at least one respective target location of the at least one networked subscriber device coincides with at least one threat location further comprises:
warning the at least one respective user of the at least one networked subscriber device that the at least one threat location coincides with at least one respective target location that includes at least one respective present location of the at least one networked subscriber device.

24. The method of claim 23 wherein warning the at least one respective user of the at least one networked subscriber device that the at least one threat location coincides with at least one respective target location that includes at least one respective present location of the at least one networked subscriber device further comprises:
warning the at least one respective user of the at least one networked subscriber device that at least a portion of the at least one threat location coincides with at least a portion of at least one respective geographical area that surrounds the respective present location of the at least one networked subscriber device, the at least one respective geographical area defined by at least one respective particular distance from the at least one networked subscriber device; or warning the at least one respective user of the at least one networked subscriber device that at least a portion of the respective present location of the at least one networked subscriber device coincides with at least a portion of at least one threat location defined by at least one particular dimension.

25. The method of claim 23 wherein warning the at least one respective user of the at least one networked subscriber device that the at least one threat location coincides with at least one respective target location that includes at least one respective present location of the at least one networked subscriber device further comprises:
   warning the at least one respective user of the at least one networked subscriber device that at least a portion of the at least one threat location coincides with at least a portion of at least one respective geographical area that surrounds the respective present location of the at least one networked subscriber device, the at least one respective geographical area defined by at least one respective user selected or defined distance from the at least one networked subscriber device; or
   warning the at least one respective user of the at least one networked subscriber device that at least a portion of the respective present location of the at least one networked subscriber device coincides with at least a portion of at least one threat location defined by at least one respective user selected or defined dimension.

26. The method of claim 23 wherein warning the at least one respective user of the at least one networked subscriber device that the at least one threat location coincides with at least one respective target location that includes at least one respective present location of the at least one networked subscriber device further comprises:
   warning the at least one respective user of the at least one networked subscriber device that at least a portion of the at least one threat location coincides with at least a portion of at least one respective geographical area that surrounds the respective present location of the at least one networked subscriber device, the at least one respective geographical area defined by at least one respective particular distance from the at least one networked subscriber device, the at least one respective particular distance varying responsive to the at least one threat characteristic; or
   warning the at least one respective user of the at least one networked subscriber device that at least a portion of the respective present location of the at least one networked subscriber device coincides with at least a portion of at least one threat location defined by at least one respective particular dimension, the at least one respective particular dimension varying responsive to the at least one threat characteristic.

27. The method of claim 1 wherein notifying the at least one respective user of at least one threat characteristic further comprises:
   notifying the at least one respective user of at least one particular threat type;
   notifying the at least one respective user of at least one particular type of imminent threat;
   notifying the at least one respective user of at least one particular type of presently active threat;
   notifying the at least one respective user of at least one particular type of permanent or semi-permanent threat; or
   notifying the at least one respective user of at least one threat level that indicates at least one level of threat seriousness or that indicates at least one level of threat danger.

28. A threat management system, comprising:
   at least one application server;
   at least one nontransitory computer-readable medium communicably coupled to the at least one application server, the at least one nontransitory computer-readable medium stores processor-executable instructions that specifically program the at least one application server to:
   generate at least one threat characteristic indicator;
   generate at least one threat location indicator; and
   responsive to the generation of one or more of the at least one threat characteristic indicator or the at least one threat location indicator, create at least one threat alert; and
   at least one network connectivity device communicably coupled to the at least one application server, the at least one network connectivity device:
   responsive to the creation of the at least one threat alert, converts the at least one threat alert to at least one threat alert signal;
   responsive to the creation of the at least one threat alert signal, generates at least one list of threat solution providers offering at least one threat solution, the threat solution comprising at least one opportunity to engage in one or more of purchasing, renting, subscribing, or hiring one or more of the following: at least one alarm system, at least one alarm monitoring subscription, at least one camera system, at least one person tracking subscription or system, at least one security officer, at least one unarmed security officer, at least one armed security officer, at least one counter assault team, at least one anti-terrorism team, at least one security patrol, at least one armored car service, at least one vault, at least one body guard, at least one private investigator, at least one self-defense training lesson, at least one firearm training session, or at least one firearm;
   responsive to the generating the at least one list of threat solution providers, identifies respective prioritization indicators of the threat solution providers, wherein the respective prioritization indicators comprise one or more of the following: at least one user review of at least one threat solution provider or at least one popularity rating of at least one threat solution provider;
   responsive to the identification of the respective prioritization indicators, prioritizes the threat solution providers and modifies the at least one threat alert signal to include the list of threat solution providers;
   responsive to the prioritizing of the threat solution providers, pushes the at least one list of threat solution providers to at least on networked subscriber device external to the threat management system, thereby causing the at least one networked subscriber device to notify the at least one respective user of the at least one list of threat solution providers, the at least one respective user having at least one opportunity to obtain a threat solution from at least one of the threat solution providers; and
   responsive to the at least one threat alert signal, pushes the at least one threat alert signal to at least one networked subscriber device external to the threat management system, thereby causing the at least one networked subscriber device to:
emit at least one humanly perceptible alarm that warns at least one respective user of the at least one networked subscriber device that at least one respective target location of the at least one networked subscriber device coincides with at least one threat location; and
notify the at least one respective user of at least one threat characteristic.

* * * * *